US00RE49367E

(19) United States
(12) Reissued Patent
Cho

(10) Patent Number: US RE49,367 E
(45) Date of Reissued Patent: Jan. 10, 2023

(54) AUTOMATED GENERATION OF RECOMMENDED RESPONSE MESSAGES

(71) Applicant: SAMSUNG ELECTRONICS CO., LTD., Suwon-si (KR)

(72) Inventor: Sang-wook Cho, Suwon-si (KR)

(73) Assignee: SAMSUNG ELECTRONICS CO., LTD., Suwon-si (KR)

(21) Appl. No.: 16/410,575

(22) Filed: May 13, 2019

Related U.S. Patent Documents

Reissue of:
(64) Patent No.: 9,832,619
Issued: Nov. 28, 2017
Appl. No.: 14/815,420
Filed: Jul. 31, 2015

(30) Foreign Application Priority Data

Jul. 31, 2014 (KR) ..... 10-2014-0098634
Feb. 25, 2015 (KR) ..... 10-2015-0026750

(51) Int. Cl.
*H04M 1/72433* (2021.01)
*H04M 1/72436* (2021.01)

(52) U.S. Cl.
CPC ... *H04M 1/72433* (2021.01); *H04M 1/72436* (2021.01)

(58) Field of Classification Search
CPC ..... H04W 4/12; H04M 1/72433; H04M 1/72436; G06Q 30/0282; G06Q 30/02; G06Q 10/00
See application file for complete search history.

(56) References Cited

U.S. PATENT DOCUMENTS 6,631,183 B1 * 10/2003 Rautila ..... H04M 3/533 379/88.22
7,124,101 B1 * 10/2006 Mikurak ..... G06Q 10/06 705/35

(Continued)

FOREIGN PATENT DOCUMENTS

CN 102868977 A 1/2013
CN 103079008 A 5/2013

(Continued)

OTHER PUBLICATIONS

Communication dated Jul. 18, 2019, issued by the State Intellectual Property Office of P.R. China in counterpart Chinese Application No. 201580000958.3.

(Continued)

*Primary Examiner* — Catherine M Tarae
(74) *Attorney, Agent, or Firm* — Sughrue Mion, PLLC

(57) ABSTRACT

An electronic device providing a message service includes: a communication unit configured to exchange a message with another device; a display configured to display a message received from the another device, a message input by the electronic device, and at least one response message generated by the electronic device, all together on a message service screen of the display; and a processor configured to determine whether the received message includes an inquiry, and provide at least one piece of recommended content based on the inquiry in response to the received message being determined as including the inquiry, and transmit the (Continued)

at least one response message comprising the at least one piece of recommended content to the other device.

42 Claims, 87 Drawing Sheets

(56) References Cited

U.S. PATENT DOCUMENTS

| | | | | |
|---|---|---|---|---|
| 7,653,573 | B2 * | 1/2010 | Hayes, Jr. | G06Q 30/0633 705/26.43 |
| 8,201,139 | B2 * | 6/2012 | Chang | G10L 15/1815 717/104 |
| 8,249,627 | B2 * | 8/2012 | Olincy | H04W 4/16 455/456.3 |
| 8,346,563 | B1 * | 1/2013 | Hjelm | G10L 15/1822 704/275 |
| 8,560,400 | B1 | 10/2013 | Lee | |
| 8,775,526 | B2 * | 7/2014 | Lorch | H04L 51/10 709/206 |
| 8,849,356 | B2 | 9/2014 | Chi et al. | |
| 9,053,097 | B2 * | 6/2015 | Zivkovic | G06F 40/58 |
| 9,100,809 | B2 * | 8/2015 | Olincy | H04M 3/42365 |
| 9,154,456 | B2 * | 10/2015 | Molina | H04L 41/22 |
| 9,159,034 | B2 * | 10/2015 | Pinckney | G06N 5/04 |
| 9,171,066 | B2 * | 10/2015 | Hebert | G06F 16/3329 |
| 9,420,437 | B2 * | 8/2016 | Johnston | H04W 4/12 |
| 9,502,025 | B2 * | 11/2016 | Kennewick | G06Q 30/0601 |
| 9,646,260 | B1 * | 5/2017 | Tunstall-Pedoe | G06N 5/04 |
| 9,716,680 | B2 * | 7/2017 | Taler | H04L 51/046 |
| 10,264,113 | B2 * | 4/2019 | Celik | H04M 1/72552 |
| 2009/0164914 | A1 | 6/2009 | Chen | |
| 2010/0241713 | A1 | 9/2010 | Shimizu | |
| 2010/0332218 | A1 | 12/2010 | Liu et al. | |
| 2012/0094698 | A1 | 4/2012 | Casto | |
| 2012/0095862 | A1 | 4/2012 | Schiff et al. | |
| 2012/0260211 | A1 * | 10/2012 | Sathish | G06F 3/0485 715/784 |
| 2013/0185081 | A1 | 7/2013 | Cheyer et al. | |
| 2014/0068467 | A1 | 3/2014 | Van et al. | |
| 2014/0074879 | A1 | 3/2014 | Kwon et al. | |
| 2014/0207806 | A1 | 7/2014 | Sharma | |
| 2015/0113435 | A1 * | 4/2015 | Phillips | H04L 51/02 715/752 |
| 2015/0127724 | A1 | 5/2015 | Xue et al. | |
| 2015/0211866 | A1 * | 7/2015 | Tang | H04L 51/20 701/522 |

FOREIGN PATENT DOCUMENTS

| | | | |
|---|---|---|---|
| CN | 103546362 | A | 1/2014 |
| KR | 10-2012-0005638 | A | 1/2012 |
| KR | 10-1290977 | B1 | 7/2013 |

OTHER PUBLICATIONS

Communication dated Nov. 26, 2020 issued by the European Patent Office in European Application No. 20190685.6.

Communication dated Sep. 10, 2020 issued by the State Intellectual Property Office of P.R. China in Chinese Application No. 201580000958.3.

Communication dated Mar. 3, 2020 issued by the State intellectual Property Office of P.R. China in Chinese Application No. 201580000958.3.

International Search Report and Written Opinion dated Nov. 12, 2015, issued by International Searching Authority in counterpart International Application No. PCT/KR2015/008015. (PCT/ISA/220, PCT/ISA/210 & PCT/ISA/237).

Communication dated Mar. 3, 2022 issued by the State Intellectual Property Office of P.R. China in counterpart Chinese application No. 201911163405.6.

Communication dated Feb. 17, 2022 issued by the Indian Patent Office in counterpart Indian Application No. 202125012379.

Communication dated May 12, 2022 by the European Patent Office for European Patent Application No. 20190685.6.

Communication dated Jul. 11, 2022 by the China National Intellectual Property Administration for Chinese Patent Application No. 201911163405.6.

Communication dated Oct. 10, 2022 by the State Intellectual Property Office of P.R. China in counterpart Chinese Application No. 201911163405.6.

Communication dated Dec. 4, 2015, issued by the European Patent Office in counterpart European Application No. 15179143.1.

* cited by examiner

① Mike Send

② John Response

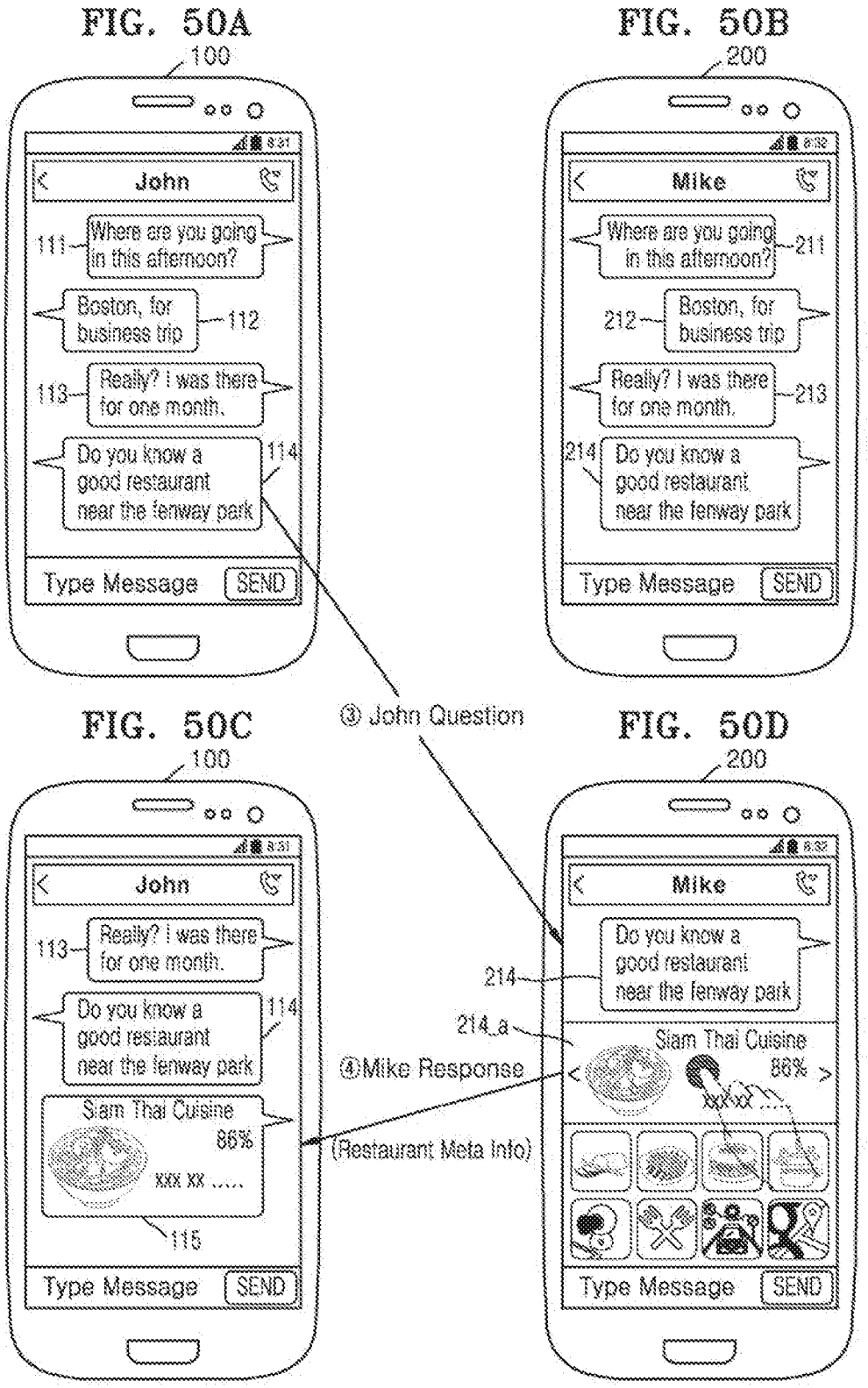
FIG. 50A
100
John
111
Where are you going in this afternoon?
Boston, for business trip
112
113
Really? I was there for one month.
Do you know a good restaurant near the fenway park
114
Type Message
SEND
FIG. 50B
200
Mike
Where are you going in this afternoon?
211
212
Boston, for business trip
Really? I was there for one month.
213
214
Do you know a good restaurant near the fenway park
Type Message
SEND
③ John Question
FIG. 50C
100
John
113
Really? I was there for one month.
Do you know a good restaurant near the fenway park
114
Siam Thai Cuisine
86%
xxx xx .....
115
Type Message
SEND
④Mike Response
(Restaurant Meta Info)
FIG. 50D
200
Mike
Do you know a good restaurant near the fenway park
214
214_a
Siam Thai Cuisine
86%
xxxxx...
Type Message
SEND ⑤ John Request ⑥ Mike Response (Restaurant's Image)

⑦ Mike Question

⑧ John's Response
(GPS Sensing Info in Map)

FIG. 53A
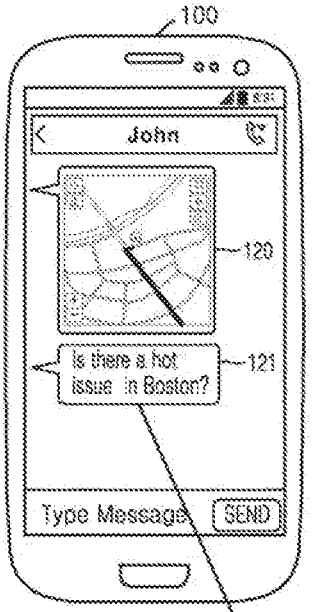
FIG. 53B
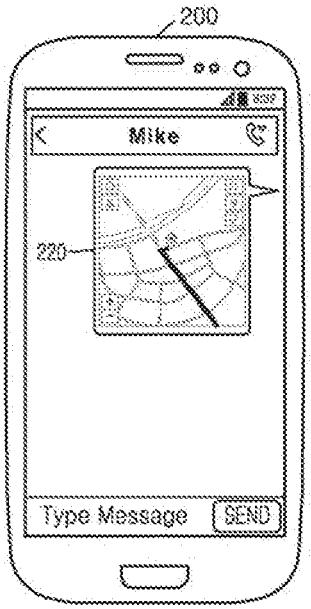
⑤ John Question
FIG. 53C
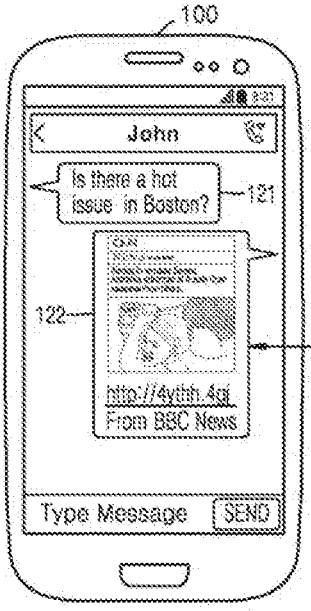
⑥ Mike Response (info supported App)
FIG. 53D1
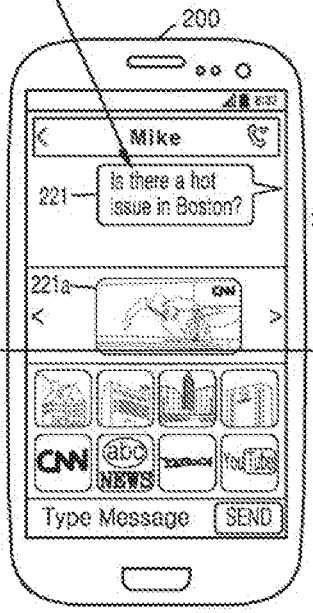
FIG. 53D2
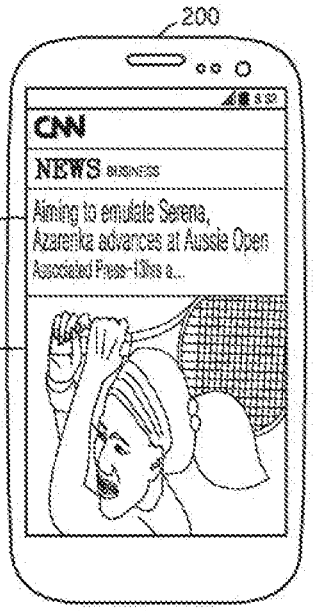

AUTOMATED GENERATION OF RECOMMENDED RESPONSE MESSAGES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This is a reissue application of U.S. Pat. No. 9,832,619, which was filed as U.S. patent application Ser. No. 14/815,420 on Jul. 31, 2015 and issued on Nov. 28, 2017, the disclosure of which is incorporated herein by reference in its entirety.*

CROSS-REFERENCE TO RELATED APPLICATIONS

This application claims priority from Korean Patent Application No. 10-2015-0026750, filed on Feb. 25, 2015, and 10-2014-0098634, filed on Jul. 31, 2014 in the Korean Intellectual Property Office, the disclosures of which are incorporated herein in their entireties by reference.

BACKGROUND

1. Field

Apparatuses and methods consistent with exemplary embodiments relate to providing content to a user during a conversation by using an electronic device.

2. Description of the Related Art

As the distribution rate of portable terminals has been rapidly increased in recent times, portable terminals have become a daily necessity for contemporary people. The portable terminals provide various functions including not only a voice call service, which is its primary function, but also various kinds of additional services, such as data transferring, etc.

In particular, communication between users has been actively performed by using a smart terminal. With this trend, various technologies configured to provide more convenient environments for such communication have been developed.

SUMMARY

One or more exemplary embodiments provide a method of providing convenient communication environments by using various electronic devices.

According to an aspect of an exemplary embodiment, there is provided an electronic device providing a message service including: a communication unit configured to exchange a message with another device; a display configured to display a message received from the another device, a message input by the electronic device, and at least one response message generated by the electronic device, all together on a message service screen of the display; and a processor configured to determine whether the received message includes an inquiry, and provide at least one piece of recommended content based on the inquiry in response to the received message being determined as including the inquiry, and transmit the at least one response message comprising the at least one piece of recommended content to the other device.

The processor may be further configured to determine whether the electronic device stores data used to generate the at least one piece of recommended comment, and obtain the data based on a result of the determination.

The processor may be further configured to determine a keyword associated with the at least one piece of recommended content, and obtain content corresponding to the keyword.

The processor may be further configured to obtain the at least one piece of recommended content based on relational data between a user of the other device and a user of the electronic device.

The relational data may include at least one of data stored in the electronic device, data stored in a server communicating with the electronic device, and data stored in the other device.

The display may be further configured to display the at least one piece of recommended content based on a user input requesting the at least one piece of recommended content in response to a settings menu being set to manually recommend the at least one piece of recommended content, display the at least one piece of recommended content based on a user input indicated in the received message in response to the settings menu being set to semi-automatically recommend the at least one piece of recommended content, and display the at least one piece of recommended content without a user input when the electronic device obtains the at least one piece of content by recognizing the received message in response to the settings menu being set to automatically recommend the at least one piece of recommended content.

The processor may be further configured to obtain the at least one piece of recommended content based on types of words included in the message, relations among the words, and meanings of the words.

The processor may be further configured to obtain the at least one piece of recommended content based on a relation between a user of the electronic device and a user of the other device, which is set based on a user input.

The at least one piece of recommended content may be obtained from an application installed in the electronic device.

The processor may be further configured to extract at least one keyword from the received message to determine whether the received message includes an inquiry.

According to an aspect of another exemplary embodiment, there is provided a method of providing content to another device, via an electronic device providing a message service including: receiving a message from the other device; displaying the received message on a message service screen; determining whether the received message includes an inquiry; providing at least one piece of recommended content based on the received message; and transmitting a response message comprising the at least one piece of recommended content to the other device.

The providing the at least one piece of recommended content may include determining whether the electronic device stores data used to generate the at least one piece of recommended comment, and obtaining the data based on a result of the determination.

The providing the at least one piece of recommended content may include determining a keyword associated with the at least one piece of recommended content and obtaining content corresponding to the keyword.

The providing the at least one piece of recommended content may include obtaining the at least one piece of recommended content based on relational data between a user of the electronic device and a user of the other device.

The relational data may include at least one of data stored in the electronic device, data stored in a server communicating with the electronic device, and data stored in the other device.

The providing the at least one piece of recommended content may include: displaying the at least one piece of recommended content based on a user input requesting the at least one piece of content in response to a settings menu being set to manually recommend the at least one piece of recommended content; displaying the at least one piece of recommended content based on a user input indicated in the received message in response to the settings menu being set to semi-automatically recommend the at least one piece of recommended content; and displaying the at least one piece of recommended content without a user input when the electronic device obtains the at least one piece of content by recognizing the received message in response to the settings menu being set to automatically recommend the at least one piece of recommended content.

The providing the at least one piece of recommended content may include obtaining the at least one piece of recommended content based on types of words included in the message, relations among the words, and meanings of the words.

The providing the at least one piece of recommended content may include obtaining the at least one piece of recommended content based on a relation between a user of the electronic device and a user of the other device, which is set based on a user input.

The at least one piece of recommended content may be obtained from an application installed in the electronic device.

The providing the at least one piece of recommended content includes: extracting at least one keyword from the received message to determine whether the received message includes an inquiry.

According to an aspect of an exemplary embodiment, there is provided a method of providing a social networking service by a server including: displaying a message posted by a first device through an application or a website; recognizing a user input from a second device that activates an input field displayed on the application or the website; determining whether the posted message includes an inquiry; generating a recommended response based on information of relationship between a user of the first device and a user of the second device in response to the posted message including the inquiry; and providing the recommended response to the second device.

The determining whether the posted message may include the inquiry includes determining whether a sentence of the message starts with an interrogative adverb, determining whether a subject and a verb of the sentence are inversed, and determining whether the sentence includes a question mark.

The recommended response may include a plurality of contents that belong to at least two different categories, and the at least two different categories include an application and a picture.

The method may further include determining user preference of the at least two different categories based on the number of times that each of the categories is selected by the second device, and displaying the plurality of contents in the order of the user preference.

BRIEF DESCRIPTION OF THE DRAWINGS

The above and/or other aspects will be more apparent by describing certain exemplary embodiments, with reference to the accompanying drawings, in which:

FIGS. 50A through 50D, 51A through 51D, 52A through 52D, and 53A through 53C, 53D1, and 53D2 are views for describing an overall method of providing content according to an exemplary embodiment;

DETAILED DESCRIPTION

Figure 1:
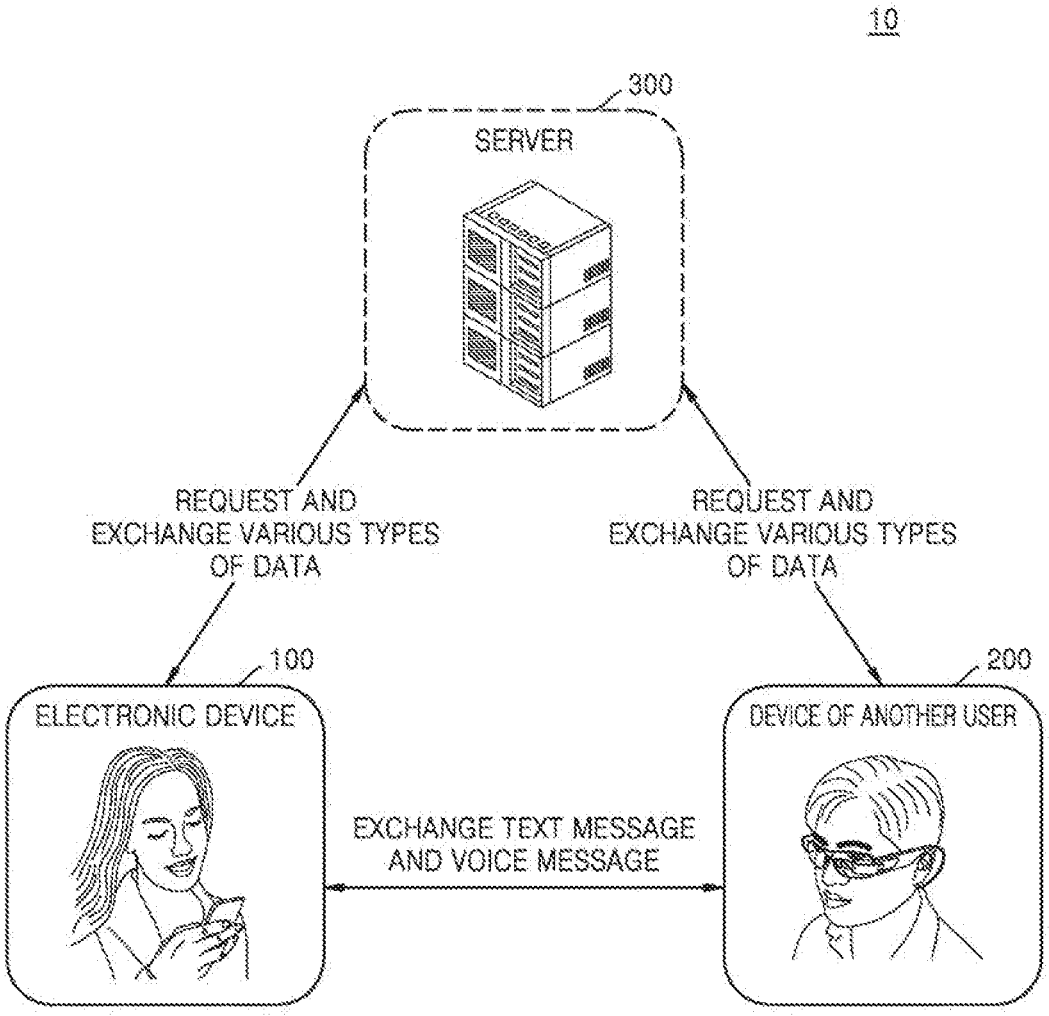
FIG. 1 is a diagram for describing a content providing system according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

When a part "includes" or "comprises" an element, unless there is a particular description contrary thereto, the part can further include other elements, not excluding the other elements. Throughout the specification, it will be understood that when an element is referred to as being "connected" to another element, it may be "directly connected" to the other element or "electrically connected" to the other element with intervening elements therebetween. In addition, terms such as " . . . unit," " . . . module," or the like refer to units that perform at least one function or operation, and the units may be implemented as hardware or software or as a combination of hardware and software.

Throughout the specification, a term such as "user" may refer to a user of an electronic device. Throughout the specification, a term such as "message service" may refer to a one to one, one to many, or many to many service via which users may easily exchange messages, such as a conversation of the users.

Throughout the specification, a term "application" refers to a set of a series of computer programs designed to execute specific tasks. The application in this specification may vary. The application may include a game application, a video playing application, a map application, a memo application, a calendar application, a phone book application, a broadcasting application, a sport support application, a payment application, a picture folder application, etc. However, the application is not limited thereto. The application may also be referred to as an App.

Expressions such as "at least one of," when preceding a list of elements, modify the entire list of elements and do not modify the individual elements of the list.

In this specification, a term "message" may refer to a group of text units or a group of sound units including at least one selected from one or more words, one or more phrases, and one or more clauses, as part of a conversation exchanged between users.

In this specification, a term "keyword" may refer to a word, a phrase, and a clause related to a meaning of a message, the meaning being obtained by performing a natural language analysis with respect to the message. The keyword may refer to not only the word, the phrase, and the clause included in the message, but also a word, a phrase, and a clause which are not included in the message.

In this specification, a term "content" may refer to data, files, software, and information including a video, a sound, and a text transferring information via an electronic device. For example, the image content may refer to image data transferred via the electronic device. For example, the content may include text responses including a two-dimensional image, a three-dimensional image, a two-dimensional video, a three-dimensional video, and various languages, and content related to various application services.

FIG. 1 is a diagram for describing a content providing system 10 according to an exemplary embodiment.

As illustrated in FIG. 1, the content providing system 10 may include an electronic device 100, a device of another user 200, and a server 300.

The electronic device 100 according to an exemplary embodiment may exchange a text message or a voice message with the device of another user 200. Also, the electronic device 100 may exchange the text message or the voice message with the device of another user 200 via the server 300.

In addition, the electronic device 100 may request and obtain various types of data from the server 300 and may transmit various types of data to the server 300. For example, the data that the electronic device 100 obtains from the server 300 may be data that is exchanged between the device of another user 200 and the server 300.

The content providing system 10 may be embodied by more or less components than the illustrated components. For example, according to another exemplary embodiment, the server 300 may not be included in the content providing system 10.

Hereinafter, the electronic device 100, the device of another user 200, and the server 300 will be described in greater detail.

The electronic device 100 according to an exemplary embodiment may exchange a message with the device of another user 200.

In this specification, the electronic device 100 may be realized as smart phones, tablets, personal computers (PCs), wearable devices, personal digital assistants (PDAs), laptop computers, cell phones, mobile phones, enterprise digital assistants (EDAs), portable multimedia players (PMPs), personal navigation devices or portable navigation devices (PNDs), handheld game consoles, mobile Internet devices (MIDs), or electronic books (e-books).

The wearable device may include a head mounted display (HMD) (hereinafter, referred to as "HMD") which may be worn at a head portion. For example, the HMD may include glasses, helmets, hats, etc., but it is not limited thereto. The wearable device may also be realized as a ring, a necklace, a bracelet, shoes, earrings, a hair band, clothes, gloves, a thimble, etc.

The device of another user 200 may be a device which receives a first message generated in the electronic device 100 and displays the first message in an output interface.

Also, the device of another user 200 may generate a second message according to a user input and transmit the second message to the electronic device 100.

According to an exemplary embodiment, the device of another user 200 may receive the first message from the electronic device 100 via the server 300, and may transmit the second message to the electronic device 100 via the server 300. According to another exemplary embodiment, the device of another user 200 may directly receive the first message from the electronic device 100 without the server 300, and may directly transmit the second message to the electronic device 100 without the server 300. According to another exemplary embodiment, the device of another user 200 may be a single device or a plurality of devices.

The device of another user 200 according to exemplary embodiments may be realized as various types. For example, the device of another user 200 may be realized as smart phones, tablet PCs, wearable devices, personal digital assistants (PDAs), laptop computers, cell phones, mobile phones, enterprise digital assistants (EDAs), portable multimedia players (PMPs), personal navigation devices or portable navigation devices (PNDs), handheld game consoles, mobile Internet devices (MIDs), or electronic books (e-books).

The server 300 may perform communication with the electronic device 100 or the device of another user 200. For example, the server 300 may receive the first message generated in the electronic device 100 from the electronic device 100, and may receive the second message generated in the device of another device 200 from the device of another device 200. Also, the server 300 may transmit the first message to the device of another user 200 and transmit the second message to the electronic device 100.

The server 300 may manage the message received from the electronic device 100 or the device of another user 200. For example, the server 300 may store the exchanged message in a message database (DB) of each device. Also, the server 300 may renew the message DB. The server 300 may renew the message DB according to a cycle time period, or may renew the message DB whenever a new message is received from the electronic device 100 or the device of another user 200.

Figure 2:
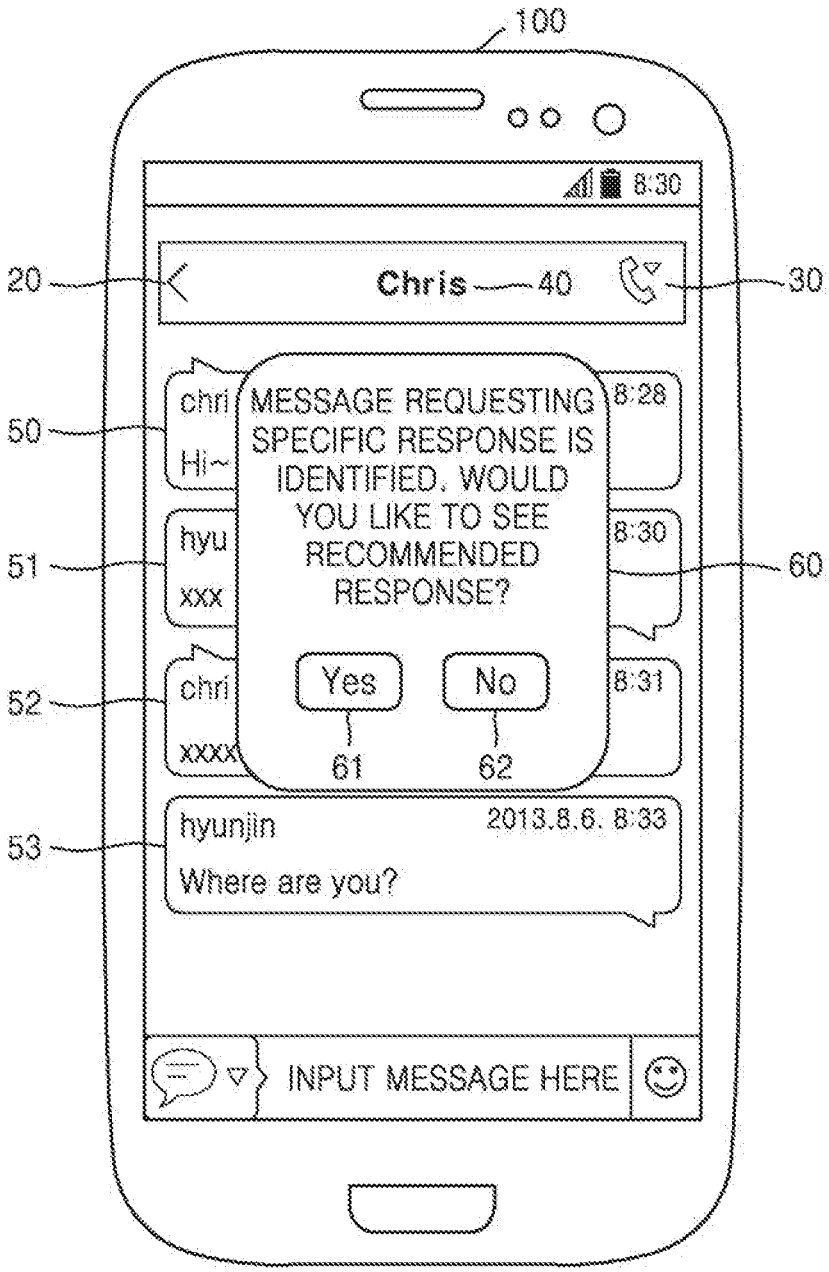
FIG. 2 is a view of a user interface (UI) of an electronic device, according to an exemplary embodiment.

FIG. 2 is a view illustrating a user interface (UI) of the electronic device 100 according to an exemplary embodiment.

Referring to FIG. 2, the electronic device 100 according to an exemplary embodiment may extract a keyword from the message received from the device of another user 200. Also, based on the keyword, the electronic device 100 may obtain at least one piece of content which may be used when responding to the message. Also, the electronic device 100 may display the at least one piece of content that is obtained.

The electronic device 100 may provide an interface, such as a conversation window including a back button 20, a call button 30, a user name box 40, and messages 50, 51, 52, and 53. The back button 20 and the call button 30 may be displayed on the user name box 40.

The user may touch or double tap the back button 20 to go back to a previous menu. The user may touch or double tap the call button 30 to execute a voice chatting or a voice call. The user name box 40 may display a name or a nickname of a conversation partner. Also, the user name box 40 may display a name or a nickname of the user of the electronic device 100. The conversation window may display the messages 50, 51, 52, and 53 exchanged between the user of the electronic device and the conversation partner.

The electronic device 100 may determine whether each message 50, 51, 52, or 53 is a question or not. The electronic device 100 may extract a keyword from the message 50, 51, 52, or 53, when any of the messages 50, 51, 52, 53 is a question. Based on the extracted keyword, the electronic device 100 may obtain the content which may be used when responding to the message.

Via a pop-up window 60, the electronic device 100 may receive a user input regarding whether to display the content obtained with respect to each keyword. The electronic device 100 may display the obtained content, when the user touches or taps a first response button 61. The electronic device 100 may not display the obtained content, when the user touches or taps a second response button 62.

When any of the messages 50, 51, 52, and 53 is a question, the electronic device 100 may obtain the content which may be used in responding to the question, before activating the pop-up window 60. Alternatively, when any of the messages 50, 51, 52, and 53 is a question, the electronic device 100 may obtain the content which may be used in responding to the question, after activating the pop-up window 60. Alternatively, when any of the messages 50, 51, 52, and 53 is a question, the electronic device 100 may obtain the content which may be used in responding to the message after the user touches the first response button 61, after the pop-up window 60 is activated.

Figure 3:
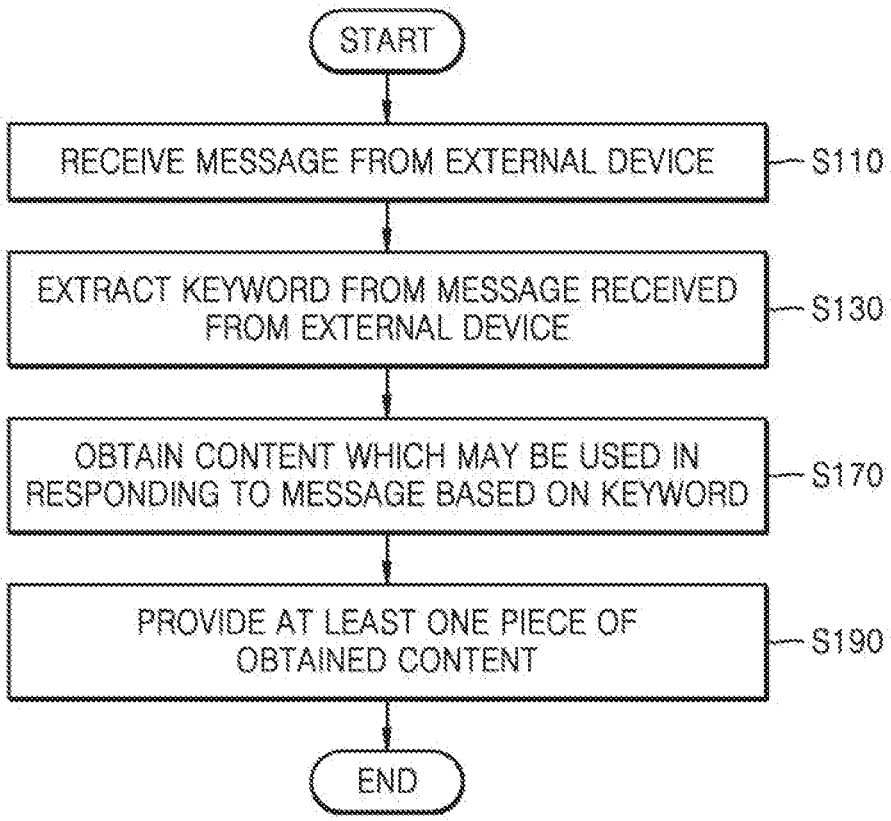
FIG. 3 is a flowchart for describing a method of providing content via an electronic device, according to an exemplary embodiment.

FIG. 3 is a flowchart for describing a method of providing content via the electronic device 100 according to an exemplary embodiment.

1.1. Message Reception

Referring to FIG. 3, the electronic device 100 may receive a message from the device of another user 200 in operation S110.

The electronic device 100 may receive the messages 50, 51, 52, and 53 from the device of another user 200. Alternatively, the electronic device 100 may receive the messages 50, 51, 52, and 53 from the device of another user 200 via the server 300.

The electronic device 100 may determine whether each of the messages 50, 51, 52, and 53 includes a question. The electronic device 100 may determine whether each of the messages 50, 51, 52, and 53 includes a question by using a semantic analysis method and a statistical analysis method which will be described later.

1.2. Keyword Extraction

The electronic device 100 may extract a keyword from the message received from the device of another user 200 in operation S130.

The electronic device 100 may extract the keyword from the message by using the semantic analysis method and the statistical analysis method.

The electronic device 100 may extract the keyword by using the semantic analysis. The electronic device 100 may determine whether a given sentence is demanding an answer or is providing some information. The electronic device 100 may analyze the sentence to determine whether the sentence starts with interrogative adverbs (e.g., who, what, when, where, why, which, how) or helping verb (e.g., is, are, can, could, did, does, or do, have, has, may, might, shall, should, will, would), whether the subject and the verb of the sentence are inversed, and whether the sentence includes a question mark to determine whether the sentence is an interrogative sentence.

For example, the electronic device 100 may receive the message 53 "where are you?" from the device of another user 200. The electronic device 100 may determine the meaning of the message 53 and extract "where" as the keyword. Also, the electronic device may extract "where" as the keyword by further considering conversation content between the users and user-related data. The user-related data may include at least one of content that is input by the user and recorded data regarding the user. The user-related data may denote content related to only one user or content related to two or more users.

The electronic device 100 may extract "where" as the keyword based on at least one selected from the meaning of the message, the content that is input by the user, and the recorded data regarding the user.

The electronic device 100 may perform a natural language analysis with respect to the meaning of the message to extract the keyword. For example, the electronic device 100 may extract "where" as the keyword. The electronic device 100 may analyze and determine the meaning of the message included in the conversation between the users, and may predict content for a response message, based on the meaning of the message. For example, the electronic device 100 may analyze the meaning of the message as a question that is put by the user of the device of another user 200 to ask about a location of the user of the electronic device 100. Based on this meaning, the electronic device 100 may predict that the user of the electronic device 100 may need to provide a response regarding his/her own location to the user of the device of another user 200, and may extract "where" as the keyword.

Also, when the electronic device 100 extracts the keyword based on the meaning of the message, the electronic device 100 may consider the content that is input by the user. For example, the content that is input by the user may include a home address of the user, a company address of the user, a movement path record of the user, and a place according to a schedule of the user. For example, when the user records a business trip plan via a scheduler application, and the content of the message exchanged with the device of another user 200 is related to a business trip location, the electronic device 100 may extract "where" as the keyword.

Also, when the electronic device 100 extracts the keyword based on the meaning of the message, the electronic device 100 may consider the recorded content regarding the user. For example, the recorded content regarding the user may denote a record about the user which is written in the electronic device 100 and the server 300. Also, the record about the user may include a record that is written by the user while the user uses the electronic device 100 and a record that is written in the server while the user users an App service. Also, the record about the user may include a record that is written indirectly rather than directly by the user while the user uses the electronic device 100 or the server 300.

For example, the record about the user may include content of a call of the user, content of payment of the user via a credit card, and content written by the user via a social network service (SNS).

The electronic device 100 may extract the keyword by figuring out the meaning of the message by the statistical analysis.

For example, the electronic device 100 may determine a priority order among predicted situations of the user. For example, the electronic device 100 may determine that any of one or more predicted situations is more likely to happen than the other situations. For example, the electronic device 100 may determine that any of one or more keywords is more likely to happen than the other keywords.

The electronic device may extract "where" as the keyword in the above-described method by the statistical analysis and the semantic analysis.

1.3. Content Obtainment

The electronic device 100 may obtain content which may be used in responding to the message, based on the extracted keyword, in operation S170.

The electronic device 100 may obtain the content by performing various searches based on the extracted keyword. The content that the electronic device 100 obtains may include a two-dimensional image, a three-dimensional image, a two-dimensional video, a three-dimensional video, a text reply formed of various languages, content of various fields, and content related to applications providing various services.

The electronic device 100 according to an exemplary embodiment may obtain the content related to the keyword from an external search server.

For example, the electronic device 100 may obtain the content related to the application service related to the keyword.

For example, when the received message is a question type message, the electronic device 100 may analyze the message and obtain the content related to a weather application service.

For example, when although the received message is not a question type, it is recognized as a result of the semantic analysis that the message requires a response, the electronic device 100 may obtain the content by using a matching table or a predetermined rule.

For example, the electronic device 100 may determine an application service which the user may use in responding to the message according to the keyword, by considering the conversation content and the user-related data.

For example, when the user is located in Korea, the electronic device 100 may select an application service related to maps which is provided by a service provider of Korean nationality. When the user is located in Japan, the electronic device 100 may select an application service related to maps which is provided by a service provider of Japanese nationality.

Also, for example, the electronic device 100 may select a map application service which is frequently used by the user of the electronic device 100, by referring to an application use frequency of the user.

Also, for example, the electronic device 100 may select an application service suitable to a current situation from among application services which are pre-selected by the user.

For example, the electronic device 100 may select a first application service suitable to the current situation of the user, from among first through fifth application services which are pre-selected by the user. For example, when there are first through fifth restaurant application services which are pre-selected by the user, the electronic device 100 may select at least one restaurant application service suitable to the current situation of the user, from among the first through fifth restaurant application services.

Also, the electronic device 100 may obtain the content by using an internet search service. For example, the electronic device 100 may obtain the content by performing various searches based on the keyword, after determining the interest search service. For example, the internet search service may be search services which are capable of being accessed by only authorized persons, such as a university library, a thesis search site, and a database of a research institute.

For example, the electronic device 100 may obtain a two-dimensional image corresponding to the keyword, through the search service. For example, the electronic device 100 may obtain the content of various fields by inputting the keyword in the search service as an input value.

According to another exemplary embodiment, the electronic device 100 may obtain the related content stored in the electronic device 100.

For example, the electronic device 100 may obtain a two-dimensional image, a three-dimensional image, a two-dimensional video, a three-dimensional video, a text reply formed of various languages, data about the content of various fields, which are stored in the electronic device 100.

1.4. Content Provision

The electronic device 100 may provide at least one piece of obtained content in operation S190.

The electronic device 100 may provide the content obtained based on the keyword to the user by various methods.

For example, the electronic device 100 may provide the obtained content to the user by using at least one of a sound, an image, and a text. For example, the method by which the electronic device 100 provides the obtained content may vary according to types of electronic devices 100. For example, the electronic device 100 may display the obtained content by a screen division method and a screen transformation method, and when the electronic device 100 is a wearable device such as a smart watch, the electronic device 100 may display the content by summarizing the content. For example, the electronic device 100 may display the content in a sound and an image via an avatar, and when the electronic device 100 is a wearable device such as a smart watch, the electronic device 100 may display the summary of the content.

For example, the electronic device 100 may obtain a two-dimensional image corresponding to the keyword, by using the search service. For example, the electronic device 100 may obtain the content of various fields by inputting the keyword in the search service as an input value.

2. Scenario 1

FIGS. 4 through 7 are views for describing a method of providing content according to an exemplary embodiment. FIGS. 4 through 7 are views of a user interface according to steps of a scenario in which the electronic device 100 provides a text chatting service and provides an image stored in the electronic device 100 to a user as response related content.

Figure 4:
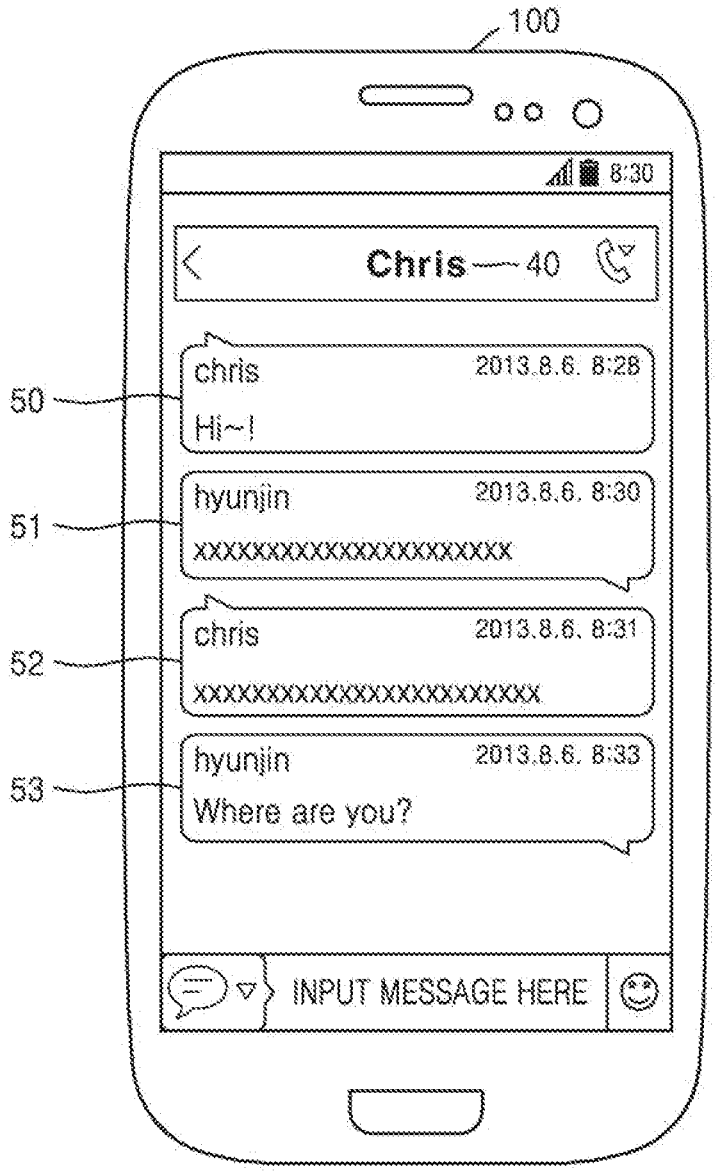
FIGS. 4 through 7 are views for describing a method of providing content according to an exemplary embodiment.

Referring to FIG. 4, Chris, the user of the electronic device 100 is performing a text chatting with Hyunjin, a user of the device of another user 200.

The electronic device 100 displays the name of the user of the electronic device 100 in the user name box 40. According to another exemplary embodiment, the electronic device 100 may display the name of the user of the device of another user 200 in the user name box 40.

The electronic device 100 receives the message 50 "Hi" from the device of another user 200 at 8:26 on Aug. 6, 2013. The electronic device 100 sends the message 51 to the device of another user 200 and receives the message 52 from the device of another user 200. The user of the electronic device 100 receives the message "where are you?" from Hyunjin.

The electronic device 100 may determine whether each of the messages 50, 51, 52, and 53 includes a question. For example, the electronic device 100 may determine that each of the messages 50, 51, and 52 is not a question, and the message 53 is a question.

For example, the electronic device 100 may mark the message which is determined as a question to distinguish the question message from the other messages. For example, the electronic device 100 may mark the message which the electronic device 100 determines as the question in a different color (for example, a fluorescent yellow color) so as to be distinguished from the other messages.

The electronic device 100 may extract a keyword with respect to the message 53. For example, the electronic device 100 may extract "a current location" as the keyword with respect to the message 53. Alternatively, for example, the electronic device 100 may extract "where are you?" and convert it to "where am I?" as the keyword with respect to the message 53. Alternatively, for example, the electronic device 100 may extract "England" or "Seoul" as the keyword with respect to the message 53 by further considering user-related data.

Figure 5:
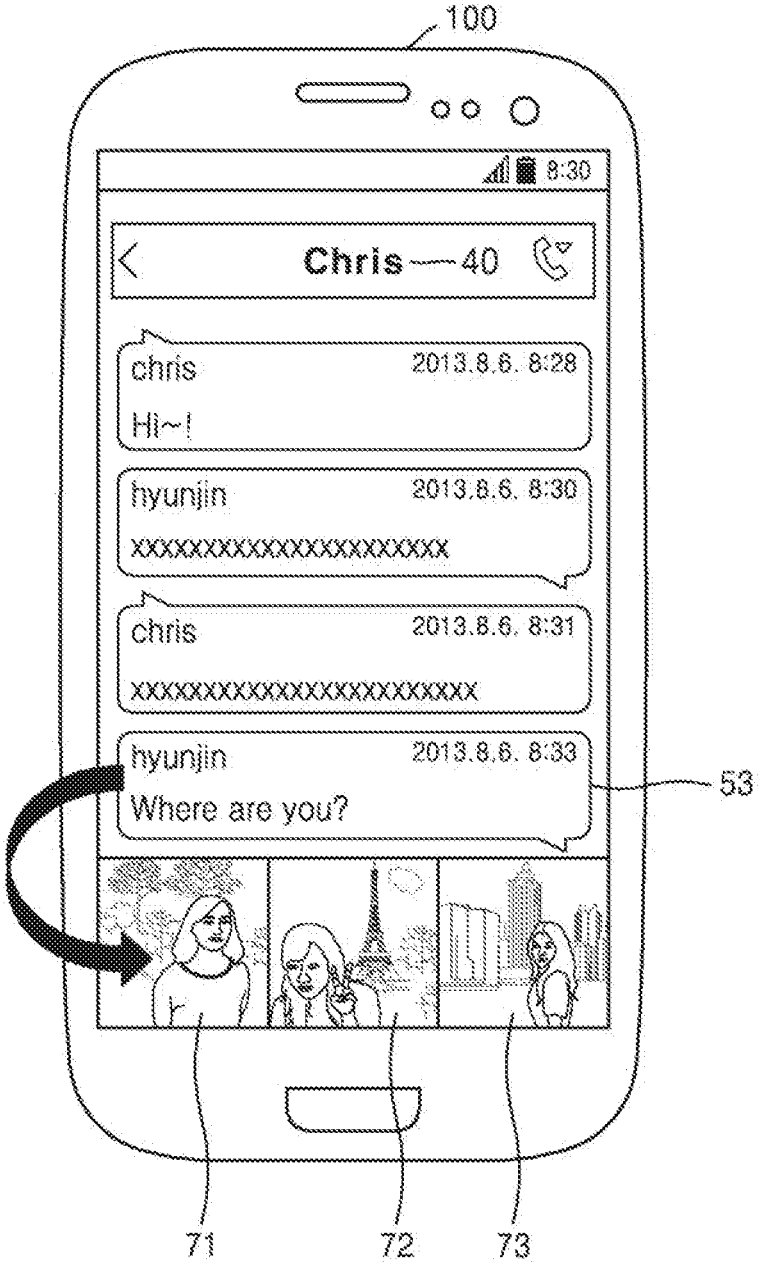

Referring to FIG. 5, the electronic device 100 may display images 71, 72, and 73 related to the message 53. The electronic device 100 may display the image stored in the electronic device 100 or the image stored in a server connected to the electronic device 100. When the electronic device 100 determines the message 53 as a question, the electronic device 100 may display the related images 71, 72, and 73 without an additional input of the user. Alternatively, when the electronic device 100 determines the message 53 as a question, the electronic device 100 may display the related images 71, 72, and 73 as the content which may be used in responding, by considering an input value of the user in the settings.

Figure 6:
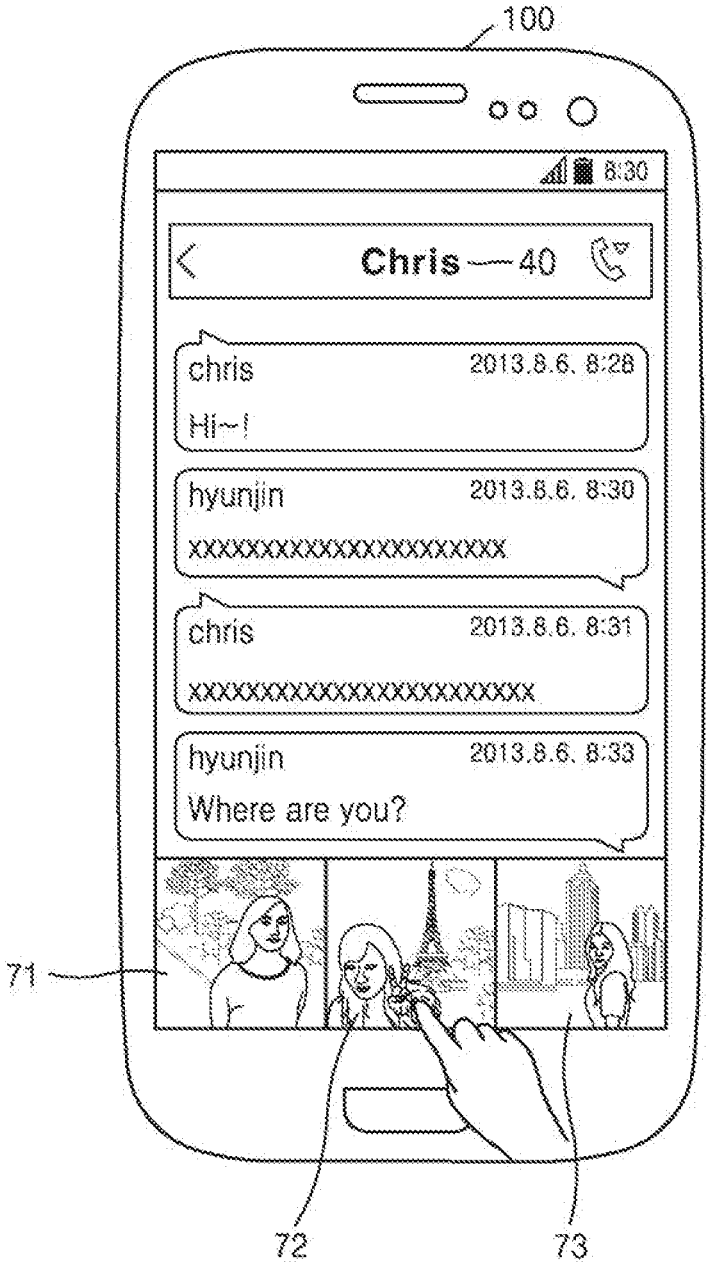

Referring to FIG. 6, the electronic device 100 may select one of the displayed images, by a user's touch input or tap input.

Figure 7:
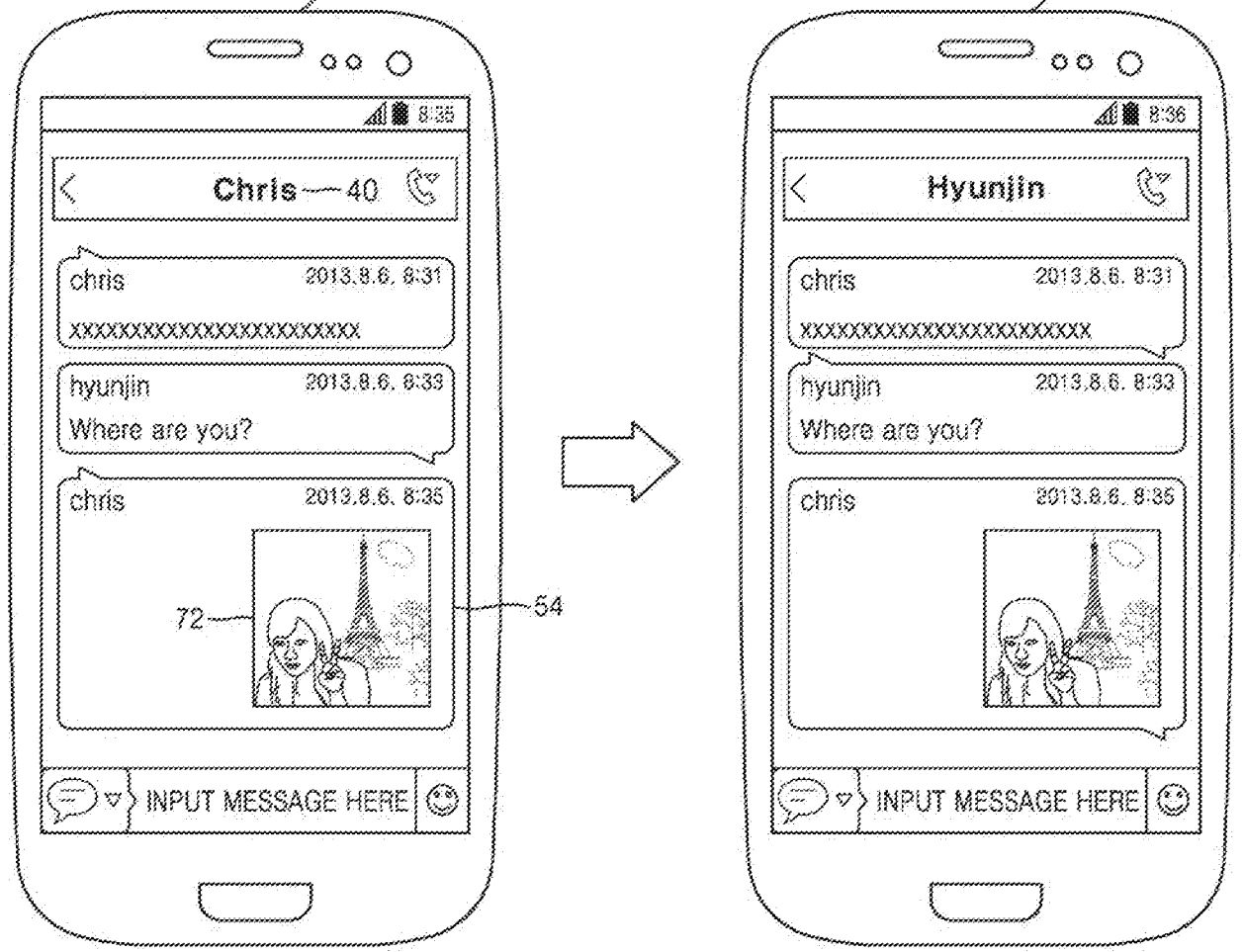

Referring to FIG. 7, the electronic device 100 may send as a response the image 72 selected by the user's touch or tap input, to the device of another user 200, via the message 54.

2.1. Device and Application Capable of Applying the Method

Figure 8:
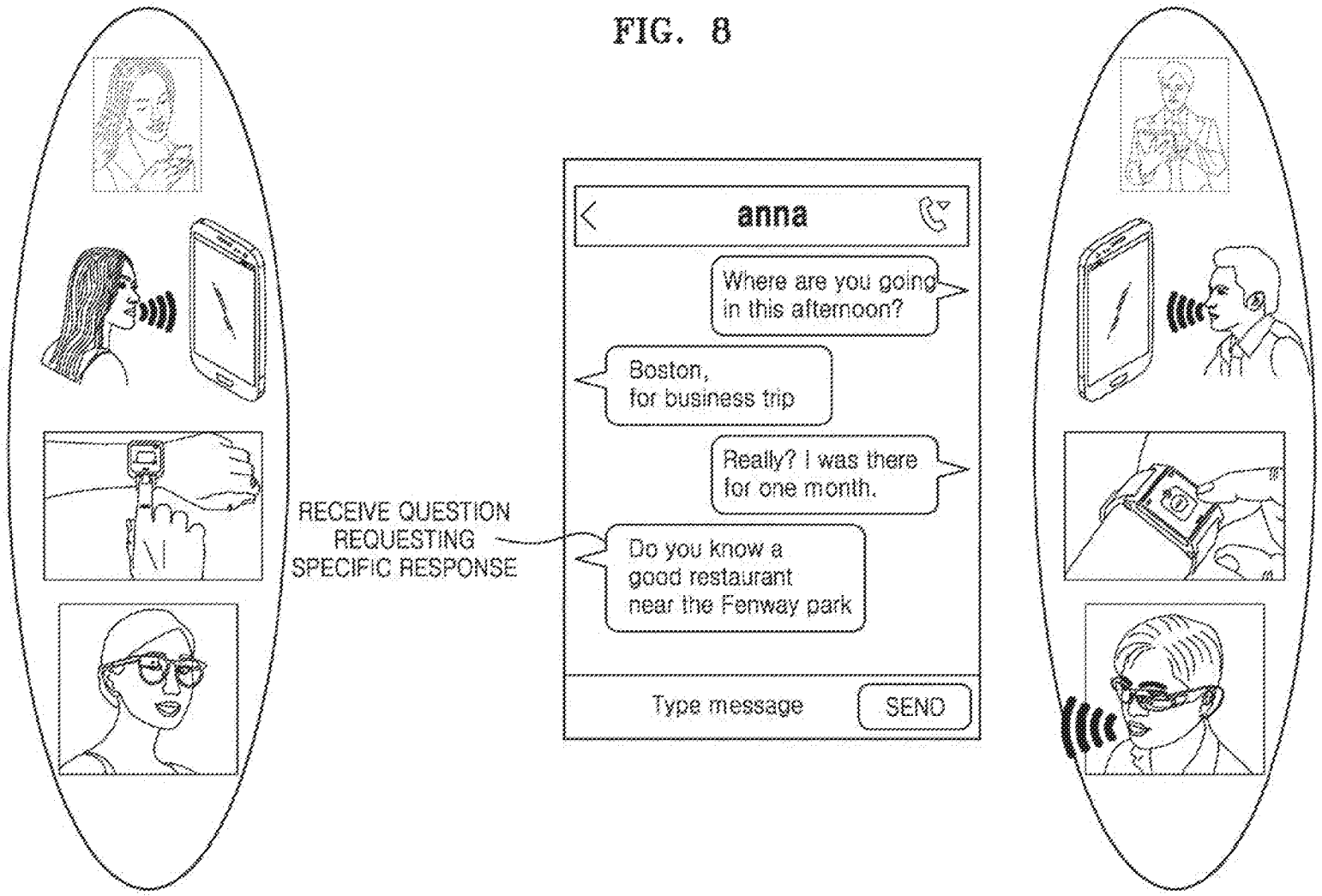
FIG. 8 is a view for describing various types of electronic devices and various chatting methods, which apply a method of providing content according to exemplary embodiments.

FIG. 8 is a view for describing various types of electronic devices and various chatting methods, which are capable of applying a method of providing content according to exemplary embodiments Referring to FIG. 8, the method of providing content according to exemplary embodiments may be performed during a communication process via a voice chatting or a text chatting between the electronic device 100 and the device of another user 200. Also, the method of providing content according to the exemplary embodiments may be performed during a communication process via a voice chatting accompanied by a speech to text (STT) function between the electronic device 100 and the device of another user 200. Also, the electronic device 100 may be realized as a smart phone, a tablet PC, a wearable device, etc. Also, even if it is not the types above, any electronic device that may realize a message service may apply the method of providing content according to the exemplary embodiments.

2.2. Specific Components of the Device

Figure 9A:
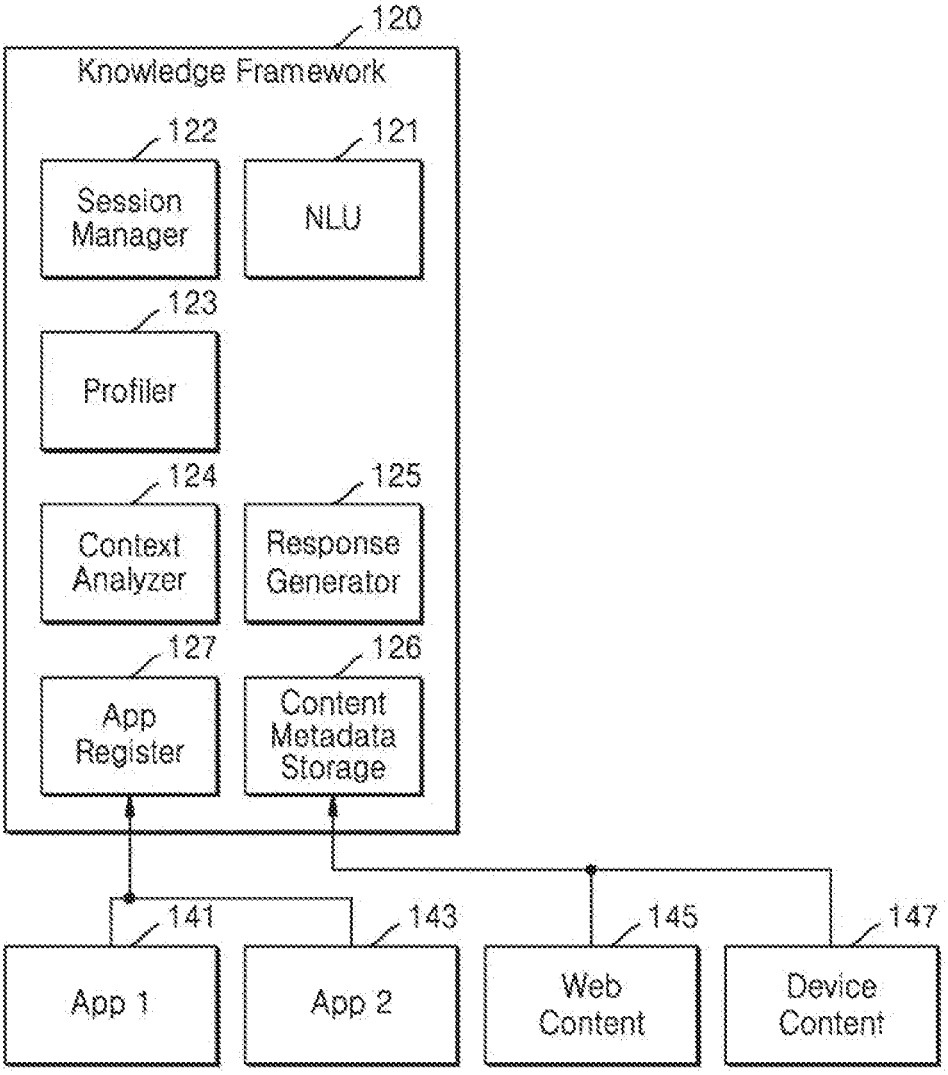
FIG. 9A is a view for describing a knowledge framework configured to provide response related content, which is included in an electronic device.

FIG. 9A is a view for describing a knowledge framework 120 configured to provide response related content, which is included in the electronic device 100.

The electronic device 100 may realize the knowledge framework 120, a first application 141, and a second application 143, and may store a web content list 145 and a device list 147.

The knowledge framework 120 may include a natural language processing unit (NLU) 121, a session manager 122, a profiler 123, a context analyzer 124, a response generator 125, a content metadata storage 126, and an App register 127.

The NLU 121 may analyze a meaning of each message received by the electronic device 100. The NLU 121 may analyze the meaning of each message by a statistical method. The NLU 121 may analyze each message by the statistical method and the semantic method and may transmit the analyzed message to the context analyzer 124.

The session manager 122 may check a conversation partner, conversation date and time, conversation content, and a conversation environment with respect to the messages exchanged by the electronic device 100 and may analyze the exchanged message in a group unit. The session manager 122 may analyze the one or more messages exchanged by the electronic device 100 to define the messages as a session.

The profiler 123 may collect and store content about the user of the electronic device or a user who exchanged messages with the user of the electronic device. The profiler 123 may keep, process, and store content written by the user of the electronic device or the user who exchanged messages with the user of the electronic device.

The context analyzer 124 may analyze and determine a meaning of each of messages exchanged by the electronic device, based on meanings of the messages exchanged by the electronic device. The context analyzer 124 may analyze and determine the meaning of each of messages exchanged by the electronic device in a unit of one or more message, the unit being defined by the session manager 122.

The response generator 125 may generate a response with respect to the message. The response generator 125 may generate the content which may be used in responding to the message. The response generator 125 may generate various possible responses and provide the generated responses to the user via an interface screen.

The content metadata storage 126 may include metadata about content. For example, the content metadata storage 126 may include content about an application. For example, the content metadata storage 126 may include the metadata regarding whether the application is a sport-related application or a movie-related application. Also, for example, the content metadata storage 126 may include the metadata about an image. The content metadata storage 126 may include content, such as names of persons appearing in the image, and a relation between the persons and the user of the electronic device.

For example, the content metadata storage 126 may continuously collect content about a web content list 145 on the internet. For example, the content metadata storage 126 may continuously collect data about a device content list 147 of the electronic device.

The App register 127 may include content about various applications. For example, the App register 127 may include data about applications included in the electronic device 100. For example, the App register 127 may include data about applications not included in the electronic device 100. The App register 127 may frequently update the data about applications. The response generator 125 may generate a response related to the applications by referring to the data about the applications of the App register 127.

For example, the App register 127 may store data about at least one of the first application 141 and the second application 142. For example, the first application 141 may be an application installed in the electronic device 100. For example, the second application 143 may be an application that is not installed in the electronic device 100.

Figure 9B:
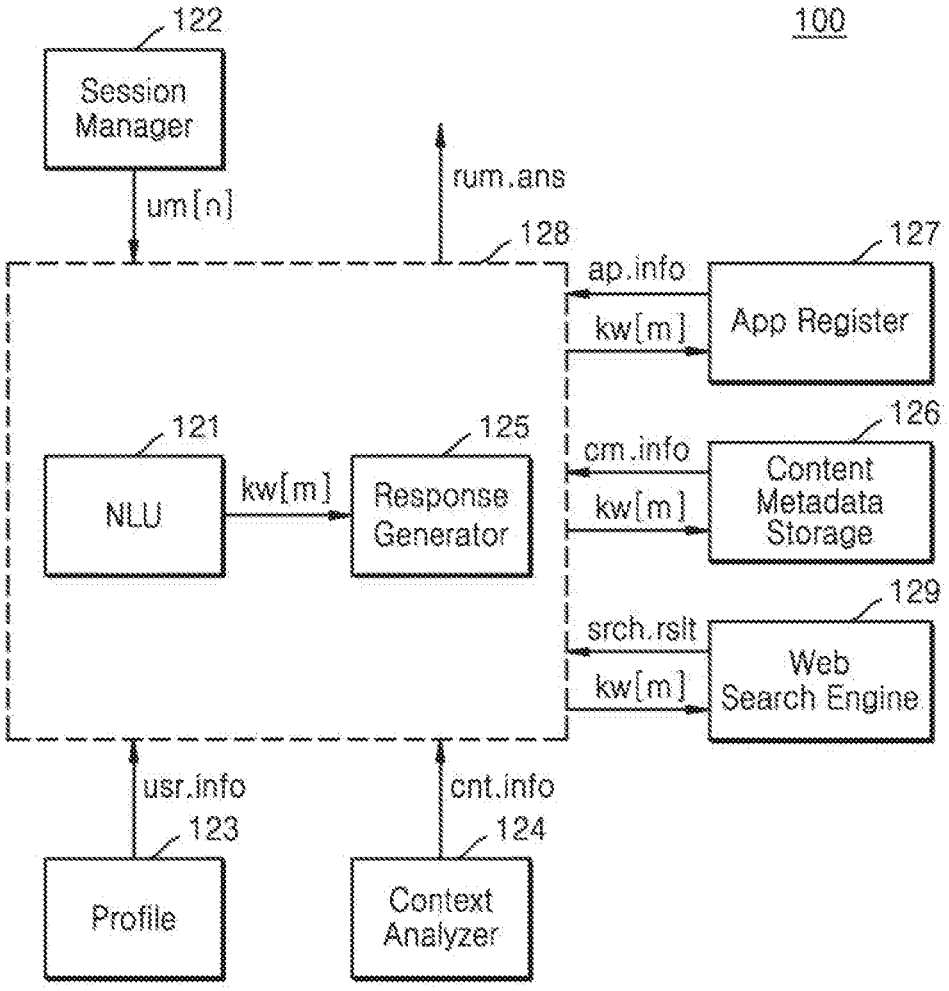
FIG. 9B is a view for describing an operation of each of components of an electronic device according to an exemplary embodiment.

FIG. 9B is a view for describing an operation of each of components of the electronic device 100, according to an exemplary embodiment.

Referring to FIG. 9B, the electronic device 100 may include the session manager 122, the profiler 123, the context analyzer 124, the content metadata storage 126, the App register 127, a response recommender 128, and a web search engine 129.

The response recommender 128 may include the natural language processing unit NLU 121 and the response generator 125.

The session manager 122 may transmit a message um[n] to the response recommender 128. The response recommender 128 may receive the message um[n] from the session manager 122 and the natural language processing unit 121 may generate a keyword kw[m] from the message um[n]. For example, the session manager 122 may transmit the message um[n] "where are you?" to the response recommender 128, and the natural language processing unit 121 may generate "location" or "information" as the keyword kw[m].

The response recommender 128 may receive user information usr.info from the profiler 123. For example, with respect to the message um[n] "where are you?", the response recommender 128 may receive user information in an external service account, information about a user's home or company or about a place that the user frequently visits, as the user information usr.info. When the response recommender 128 generates the keyword kw[m], the response recommender 128 may refer to the user information usr.info received from the profiler 123.

The response recommender 128 may receive context information cnt.info from the context analyzer 124. For example, the context information cnt.info about the message um[n] "where are you?" may include time information, global positioning system (GPS) information, weather information, analyzed user activity information, and recent logs.

For example, the user activity information may include information such as a fact that the user stayed in a restaurant for one hour, and a fact that the user continuously ran for one minute. For example, the recent logs may include networking information such as information of a base station accessed by the electronic device 100. The response recommender 128 may consider the context information cnt.info, when generating a recommended response rcm.ans by using the keyword kw[m].

The response recommender 128 may receive application related information ap.info by transmitting the keyword kw[m] to the App register 127. For example, the application related information ap.info may include metadata of applications or information about a map-related application.

The response recommender 128 may receive content information cm.info corresponding to the keyword kw[m] from the content metadata storage 126. For example, the content information cm.info may include specific information of an image. For example, the specific image information may include a location (latitude and longitude) in which the image is generated or tag information.

The response recommender 128 may receive a search result value srch.rst by transmitting the keyword kw[m] to the web search engine 129. For example, the search result value srch.rst may include an image of Boston, an address of a company, and a map application.

The response recommender 128 may receive at least one of the application related information ap.info, the content information cm.info, and the search result value srch.rst, and may generate the recommended response rcm.ans corresponding to the message um[n] by referring to the user information usr.info and the context information cnt.info.

2.3. Environment Settings

FIGS. 10A through 10D are views of an environment setting user interface which is provided by the electronic device 100 according to an exemplary embodiment.

A term "setting" may denote pre-determining an operation method of the electronic device 100 by a user's setting or a user's input to set a use environment of the electronic device 100.

Figure 10A:
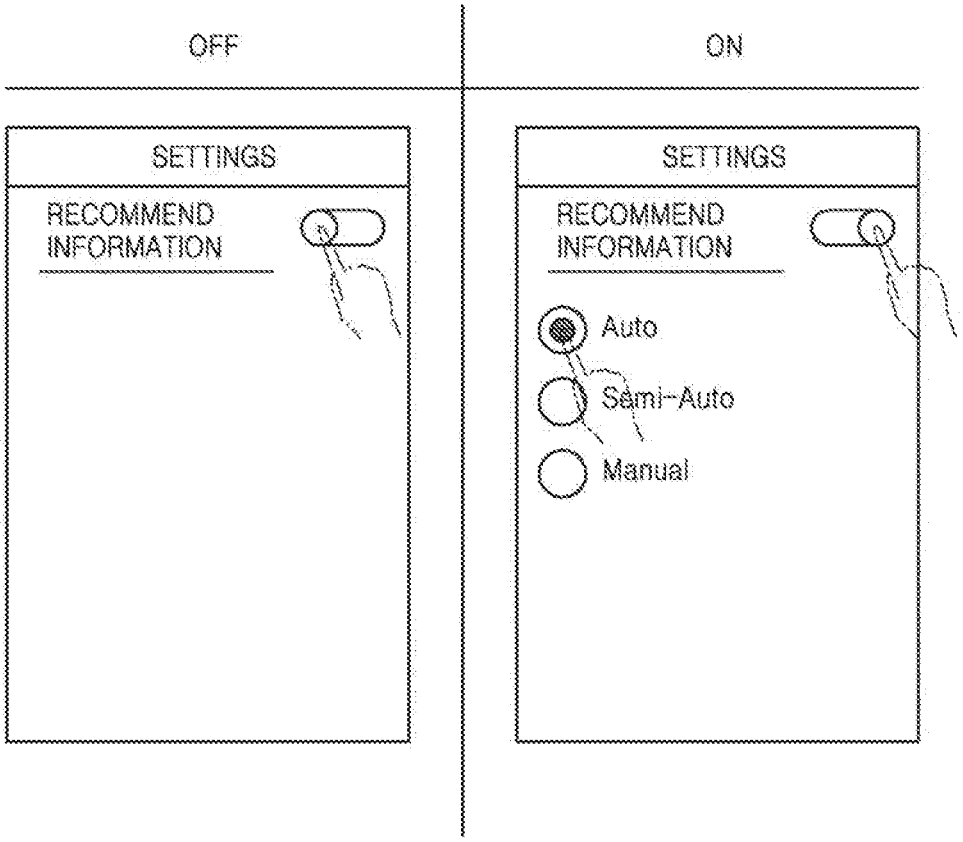
FIGS. 10A through 10D are views of an environment setting user interface which is provided by an electronic device according to an exemplary embodiment.

Referring to FIG. 10A, the electronic device 100 may not provide the response related content or may provide the response related content to the user visually or auditorily according to the settings. When the electronic device 100 provides the response related content according to the settings, the electronic device 100 may provide the response related content automatically, semi-automatically, and manually.

That the electronic device 100 provides the response related content automatically according to the settings may denote that when the electronic device 100 determines that an exchanged message includes a question, the electronic device 100 provides the response related content with respect to the message without receiving an additional user input.

That the electronic device 100 provides the response related content semi-automatically according to the settings may denote that when the electronic device 100 determines that an exchanged message includes a question, the electronic device 100 provides the response related content with respect to the message if the electronic device 100 receives a user's simple input (a touch or tap input) with respect to the message.

For example, when the electronic device 100 provides the response related content semi-automatically, the electronic device 100 may display the message corresponding to the question so as to be distinguished from other messages. For example, the electronic device 100 may display a background color of the message corresponding to the question differently from other messages. For example, the electronic device 100 may display the message corresponding to the question by using an underline and/or a conspicuous color so as to be distinguished from other messages.

The user of the electronic device 100 may receive the content by touching or tapping the message marked by using one of the above methods. The electronic device 100 may obtain the response related content by receiving the touch or tap input of the user. The electronic device 100 may obtain and store the content related to a predicted response before the electronic device 100 receives the touch or tap input of the user, and then, may provide the response related content when receiving the touch or tap input of the user.

When the electronic device 100 is set to manually provide the response related content, the electronic device 100 provides the response related content with respect to the message, if the electronic device 100 determines an exchanged message as a question and identifies whether the user will receive the response related content by using the user input indicating that the user will receive the response related content.

Figure 10B:
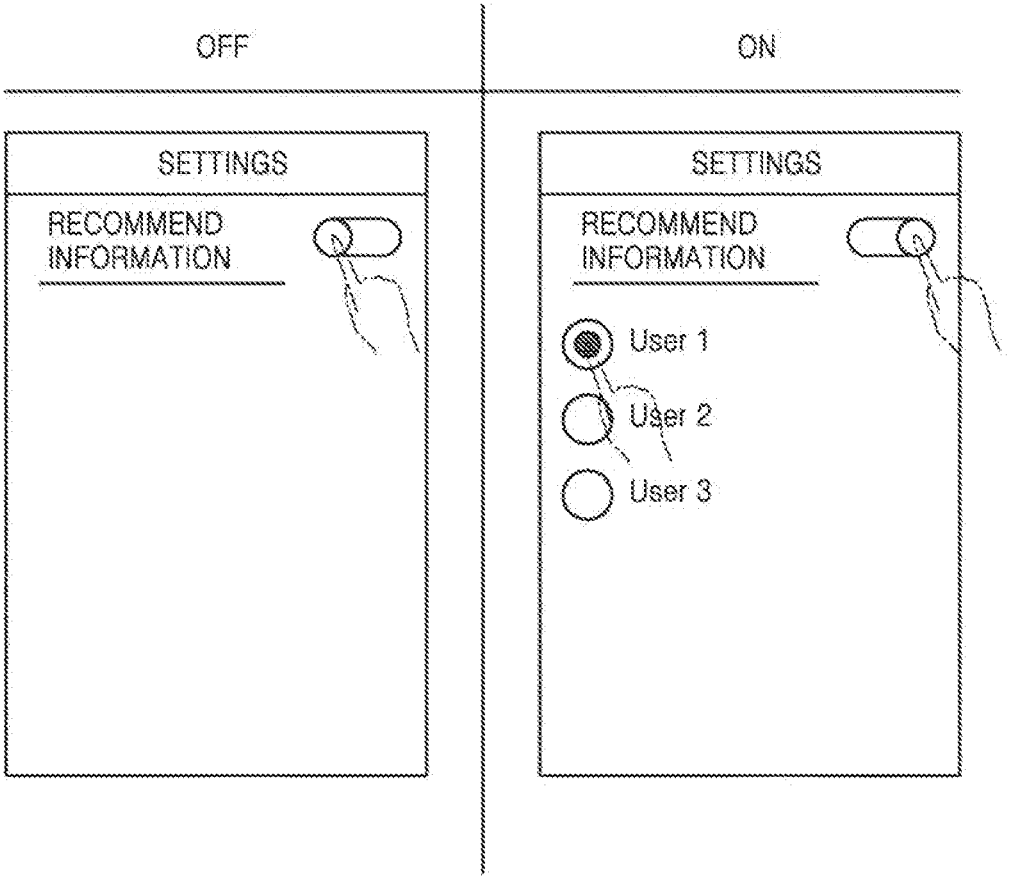

Referring to FIG. 10B, the electronic device 100 may provide the response related content by considering user-related conditions which are set in the settings.

For example, the electronic device 100 may provide the response related content by considering content related to a first user User1 set in the settings. Also, for example, the electronic device 100 may provide the response related content with respect to a message exchanged by a second user User2. Also, for example, the electronic device 100 may provide the response related content only with respect to a message input by a third user User3.

Figure 10C:
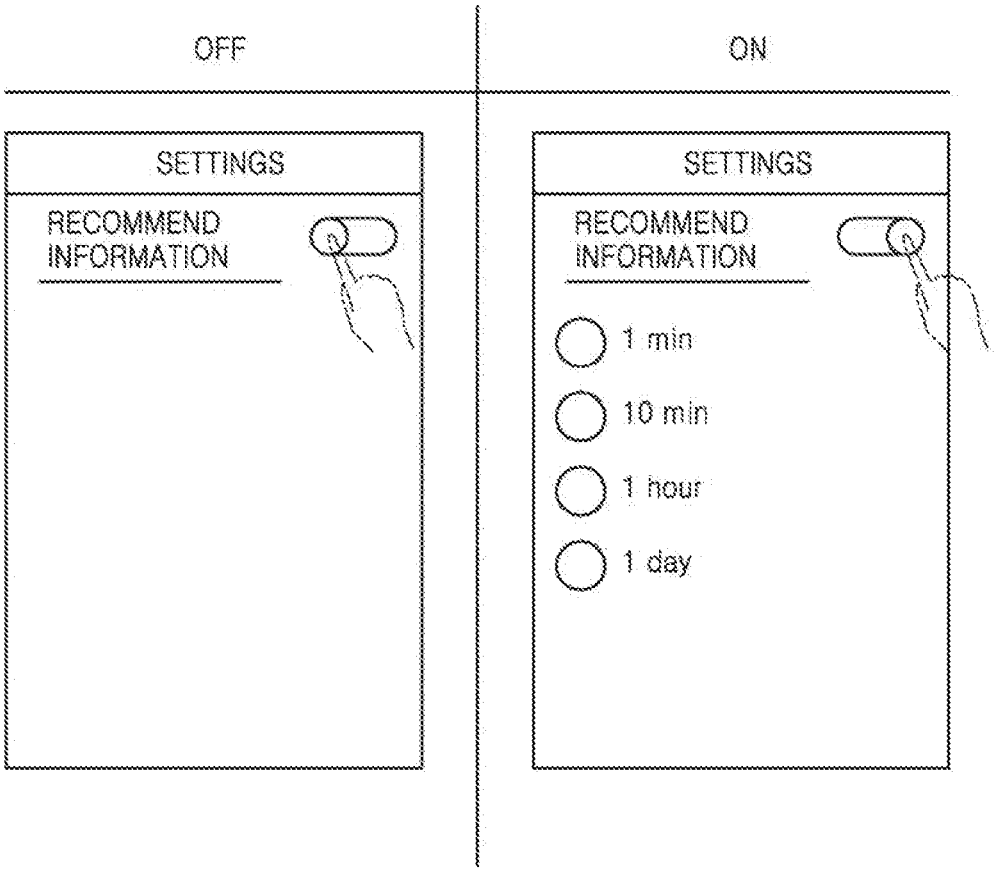

Referring to FIG. 10C, the electronic device 100 may provide the response related content by considering time related conditions which are set in the settings.

For example, when it is set in the settings to semi-automatically provide the response related content as illustrated in FIG. 10A, the electronic device 100 may restrict the time period in which the message corresponding to a question is displayed such that the message corresponding to a question is distinguished from other messages. For example, the electronic device 100 may restrict the time period in which the message corresponding to a question is displayed so as to be distinguished from other messages to 10 seconds, 20 seconds, 30 seconds, or 1 minute. When the time period exceeds, the electronic device 100 may not any more display the message corresponding to a question so as to be distinguished from other messages.

Figure 10D:
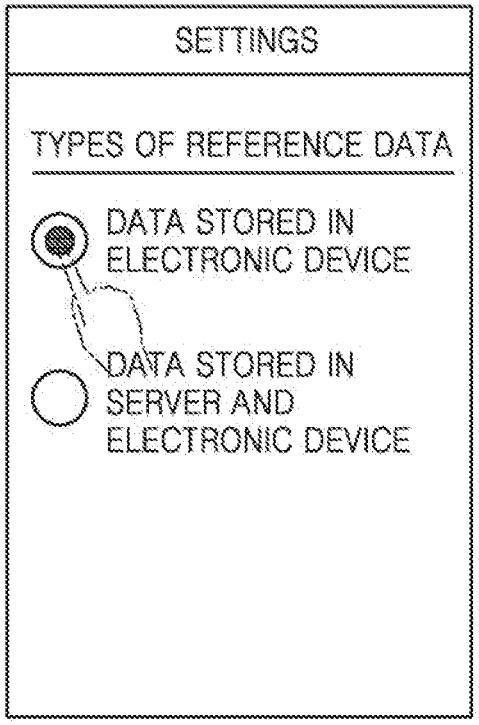

Referring to FIG. 10D, the electronic device 100 may provide the response related content by considering data conditions in the settings.

For example, the electronic device 100 may determine content of the question by referring to only data stored in the electronic device 100. For example, the electronic device 100 may determine the content of the question by referring to only data stored in the electronic device 100 and the server 300.

For example, the electronic device 100 may provide the response related content by referring to only the data stored in the electronic device 100. For example, the electronic device 100 may provide the response related content by referring to only the data stored in the electronic device 100 and the server 300.

In addition to the manners illustrated in FIGS. 10A through 10D, the electronic device 100 may operate in various manners, according to the settings. For example, the user of the electronic device 100 may set the settings such that the response related content is provided as a text, a sound, an image, etc. For example, the user of the electronic device 100 may set an interest area for which content needs to be provided. For example, the user of the electronic device 100 may set the interest area as items, such as sports, weather, politics, movies, economics, life, etc.

2.4. Service Provision Based on the Terminal

Figure 11A:
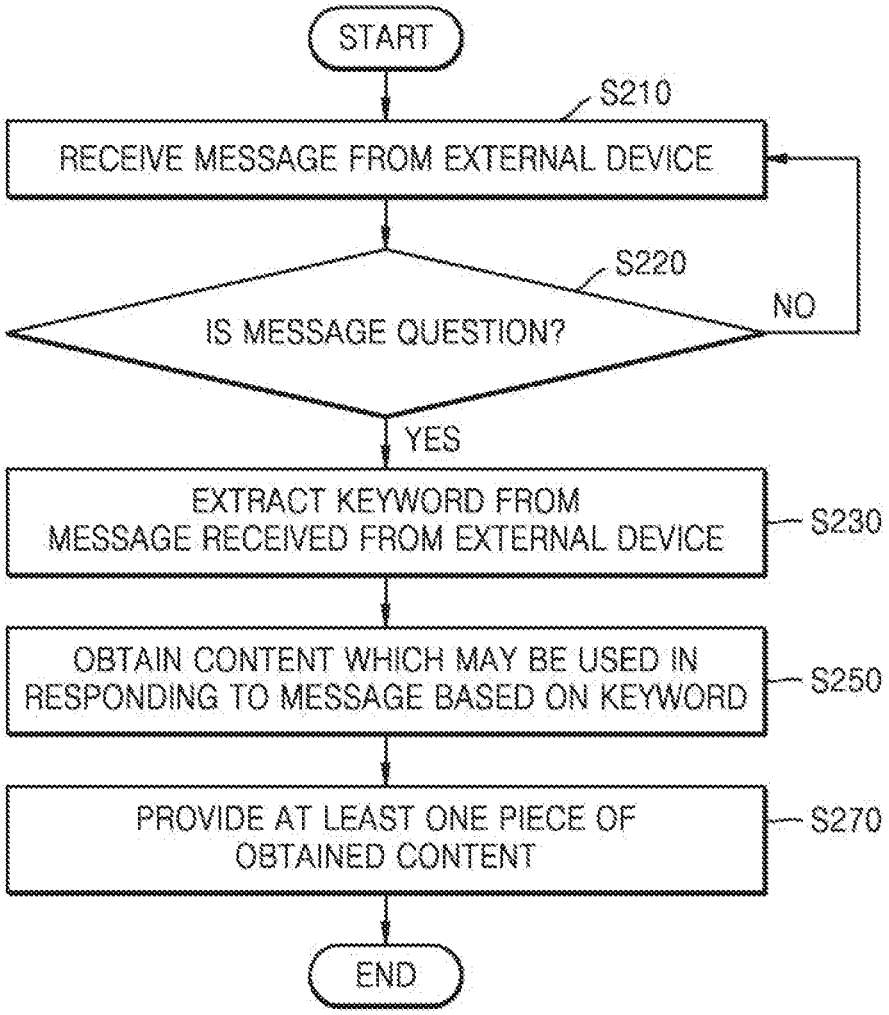
FIGS. 11A through 11D are views for describing a method of providing response related content via an electronic device.

FIG. 11A illustrates a method of providing the response related content via the electronic device 100.

Referring to FIG. 11A, the electronic device 100 may receive a message from the device of another user 200 in operation S210. The electronic device 100 may continuously receive the message from the device of another user 200. The electronic device 100 may receive the message from the device of another user 200 via the server 300.

The electronic device 100 may determine whether the message received from the device of another user 200 includes a question in operation S220. The electronic device 100 may divide a sentence used in the message into grammatical units and extract the relationship among the grammatical units. The electronic device 100 may determine whether the received message is a question based on a result of this operation.

The electronic device 100 may extract a keyword from the message received from the device of another user 200 in operation S230. The electronic device 100 may extract the keyword from the received message by performing a natural language analysis. When the electronic device 100 extracts the keyword, the electronic device 100 may extract the keyword by referring to data that is input by the user or recorded data regarding the user.

The electronic device 100 may obtain the content which may be used in responding to the message based on the keyword in operation S250. The electronic device 100 may obtain the content by performing various searches based on the extracted keyword. The content that the electronic device 100 obtains may include a two-dimensional image, a three-dimensional image, a two-dimensional video, a three-dimensional video, text replies including various languages, content of various fields, and content regarding application services providing various services.

The electronic device 100 may provide at least one piece of obtained content in operation S270. For example, the electronic device 100 may provide the at least one piece of obtained content to the user via at least one of a sound, an image, and a text.

Figure 11B:
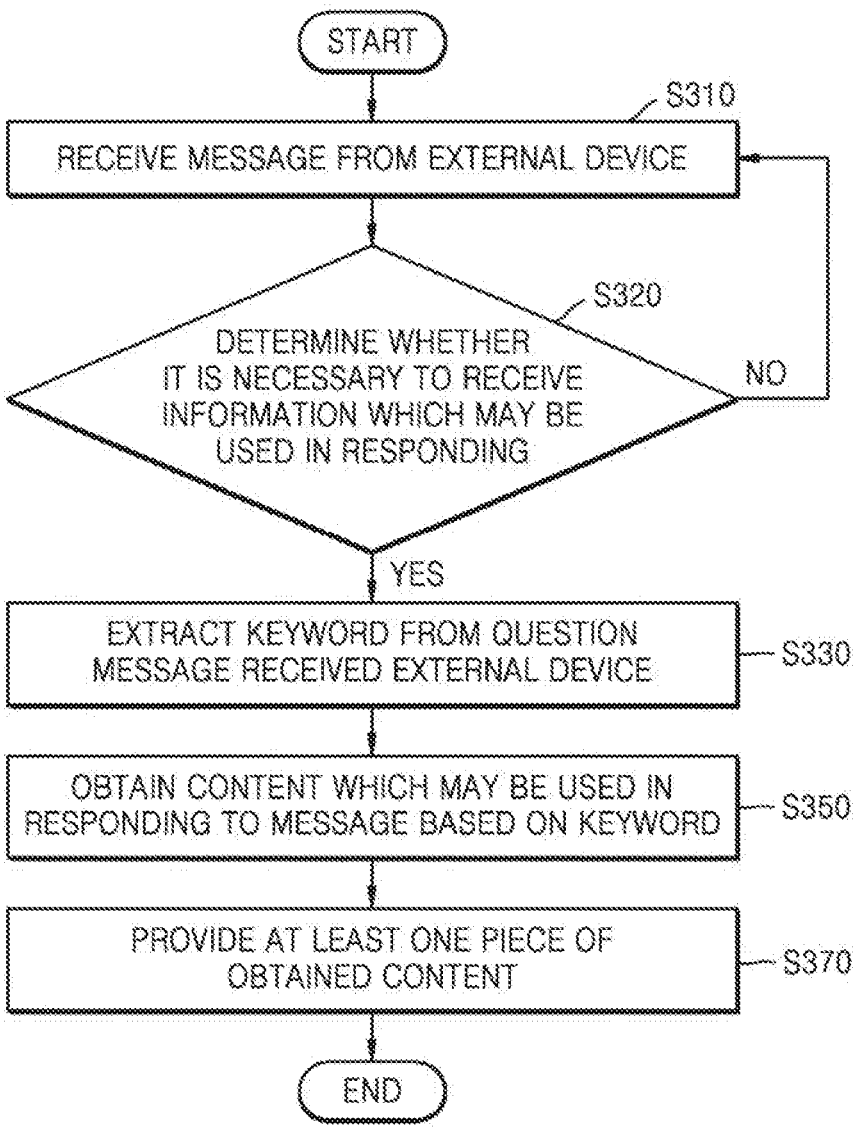

FIG. 11B illustrates a method of providing the response related content via the electronic device 100.

Referring to FIG. 11B, the electronic device 100 may receive a message from the device of another user 200 in operation S310.

The electronic device 100 may determine whether to receive the content which may be used in responding to the message received from the device of another user 200, in operation S320. For example, the electronic device 100 may determine whether to receive the content which may be used in responding to the received message, based on user configurations which are set via settings.

The electronic device 100 may extract a keyword from the message received from the device of another user 200 in operation S330. The electronic device 100 may extract the keyword by performing a natural language analysis to determine a meaning of the message.

The electronic device 100 may obtain the content which may be used in responding to the message, based on the keyword, in operation S350. The electronic device 100 may obtain the content related to the keyword from an external search server. The electronic device 100 may obtain the content via an Internet search service. The electronic device 100 may obtain the related content stored in the electronic device 100.

The electronic device 100 may provide a list of the obtained content in operation 5370. The electronic device 100 may provide the content obtained based on the keyword to the user via various methods.

Figure 11C:
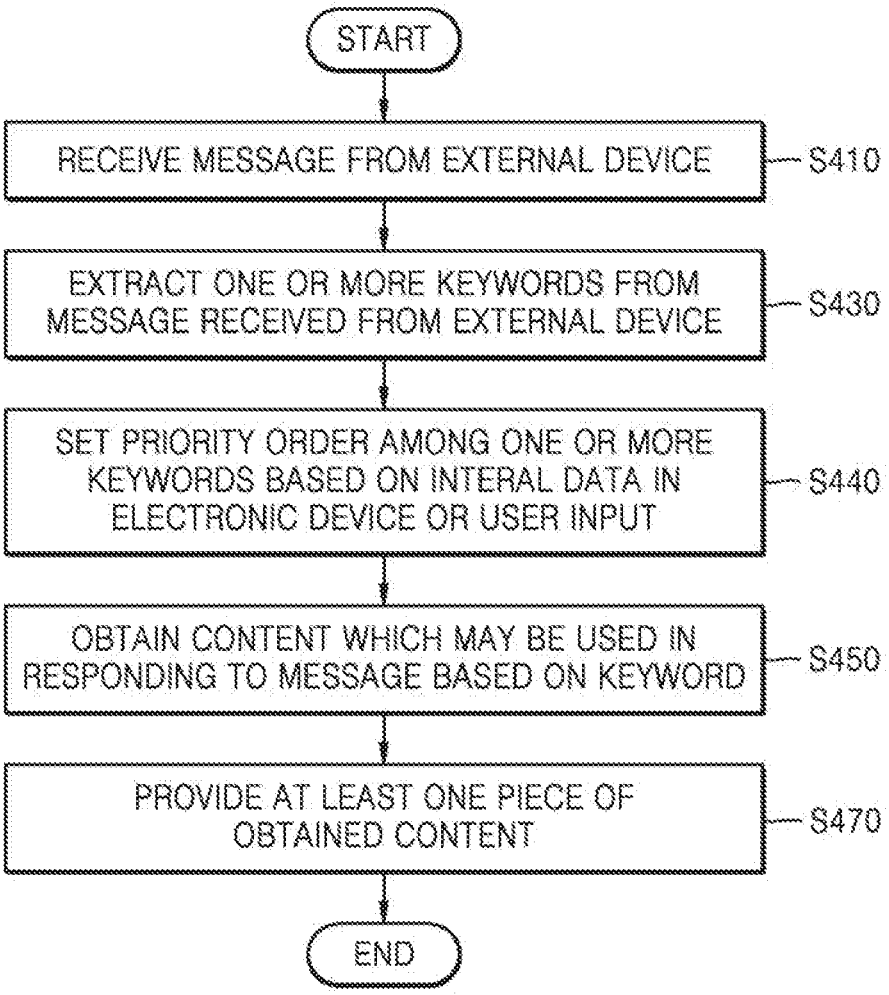

FIG. 11C illustrates a method of providing the response related content via the electronic device 100.

Referring to FIG. 11C, the electronic device 100 may receive a message from the device of another user 200 in operation S410. The electronic device 100 may extract one or more keywords from the message received from the device of another user 200 in operation S430.

The electronic device 100 may set a priority order among the one or more keywords based on internal data of the electronic device 100 or an input by the user, in operation S440. The electronic device 100 may set the priority order among the keywords, which may be referred to for obtaining the content. For example, when the electronic device 100 may obtain the content based on the plurality of keywords, the electronic device 100 may first obtain the content based on the keyword which has a high priority order, and may later obtain the content based on the keyword which has a low priority order. For example, when the electronic device 100 may obtain the content based on the plurality of keywords, the electronic device 100 may first display the content based on the keyword which has a high priority order, and may later display the content based on the keyword which has a low priority order.

The electronic device 100 may obtain the content which may be used in responding to the message, based on the keyword, in operation S450, and may provide at least one piece of content via one or more methods, in operation S470.

Figure 11D:
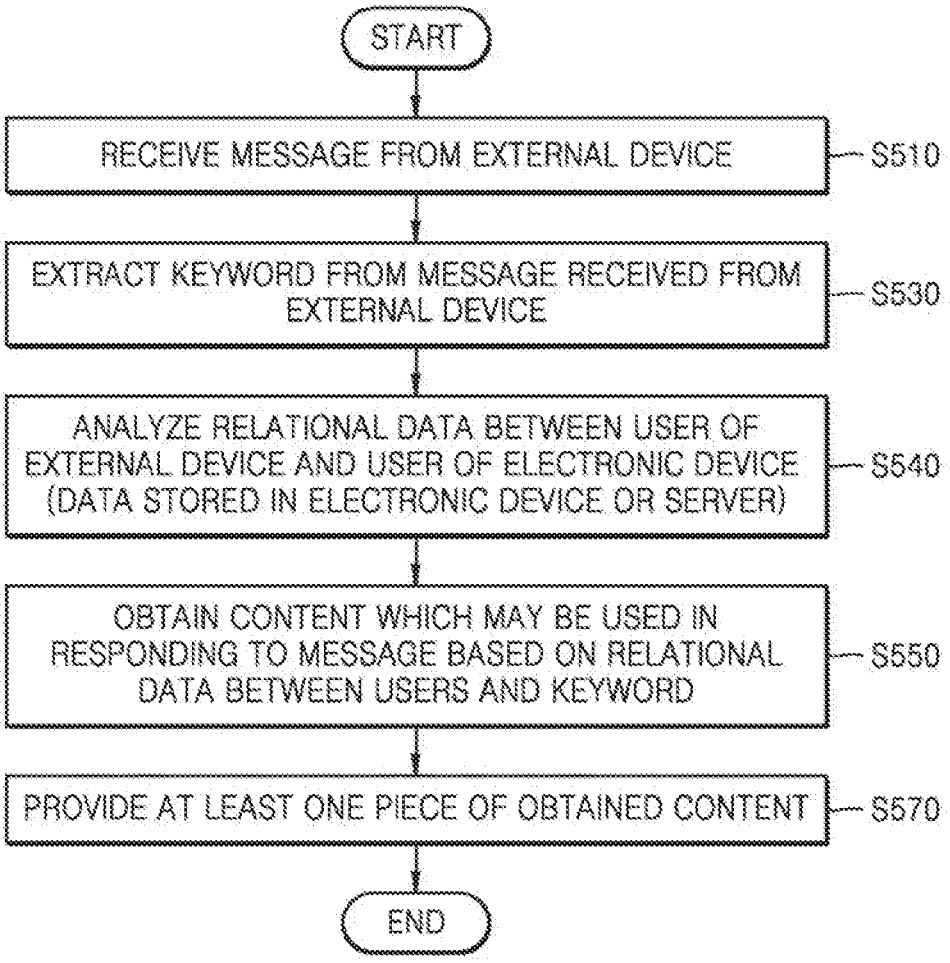

FIG. 11D illustrates a method of providing the response related content via the electronic device 100.

Referring to FIG. 11D, the electronic device 100 may receive a message from the device of another user 200 in operation S510.

The electronic device 100 may extract a keyword from the message received from the device of another user 200 in operation S530.

The electronic device 100 may analyze relational data between a user of the device of another user 200 and a user of the electronic device 100, in operation S540. The relational data between the user of the other device 200 and the user of the electronic device 100 may refer to data stored in the electronic device 100 or the server 300.

The electronic device 100 may obtain the content which may be used in responding to the message based on the analyzed relational data between the users or the keyword, in operation S550. Also, the electronic device 100 may provide at least one piece of content via one or more methods in operation S570.

Figure 12A:
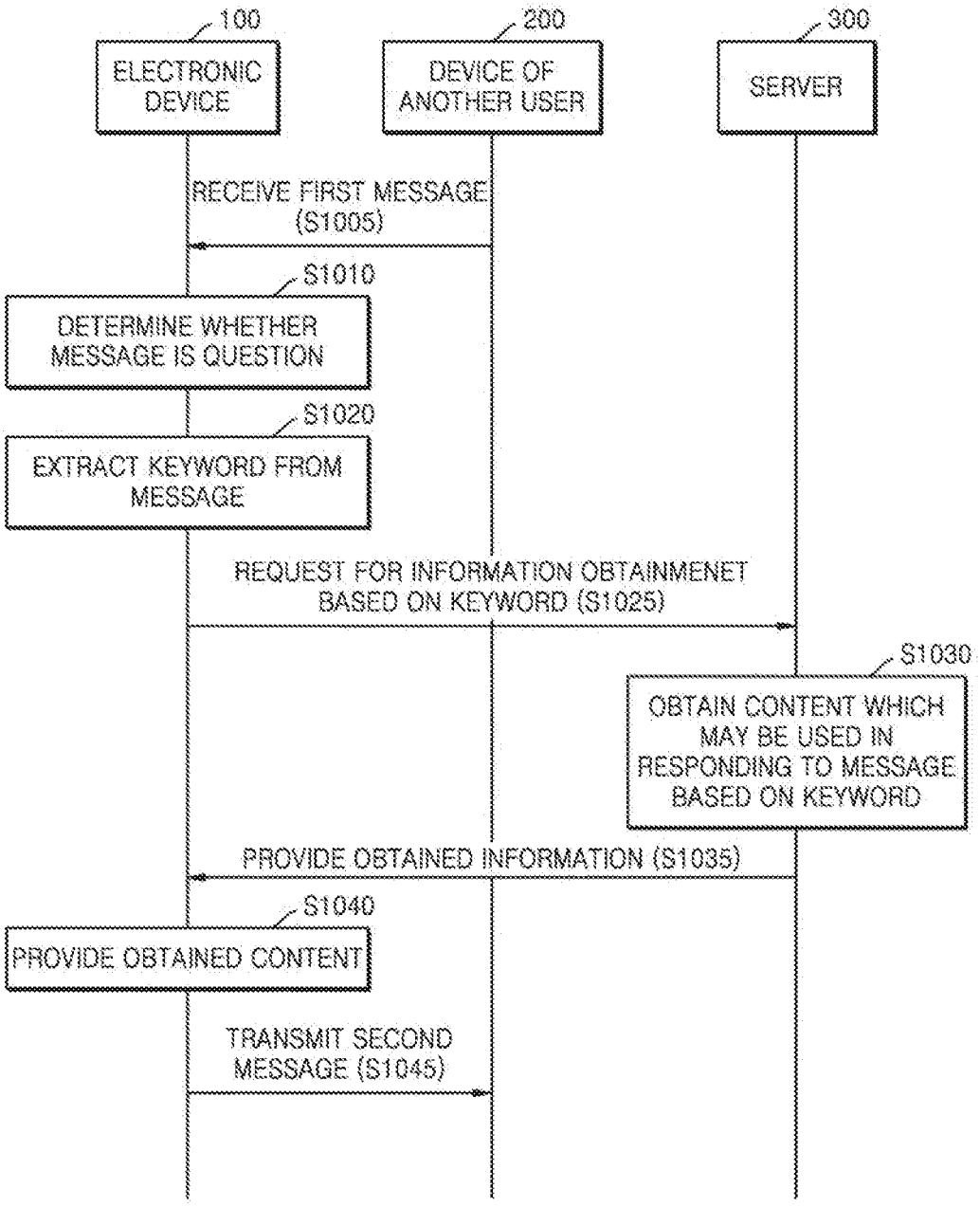
FIG. 12A is a flowchart for describing a method of providing response related content via an electronic device.

FIG. 12A is a flowchart for describing a method of providing the response related content via the electronic device 100.

The electronic device 100 may receive a first message from the device of another user 200 in operation S1005. The electronic device 100 may receive the first message from the device of another user 200 via the server 300.

The electronic device 100 may determine whether the first message received from the device of another user 200 includes a question in operation S1010. The electronic device 100 may determine whether the received first message includes a question by performing a natural language analysis.

When the received first message includes a question, the electronic device 100 may extract a keyword from the message in operation S1020.

The electronic device 100 may request the server 300 to obtain the content based on the keyword in operation S1020. The server 300 may obtain the content which may be used in responding to the message based on the keyword in operation S1030.

The server 300 may provide the content obtained based on the keyword to the electronic device 100 in operation S1035. The electronic device 100 may provide the obtained content in operation S1040.

The electronic device 100 may transmit a second message to the device of another user 200 in operation S1045. For example, the electronic device 100 may transmit the second message to the device of another user 200 by including at least one piece of the obtained content in the second message.

Figure 12B:
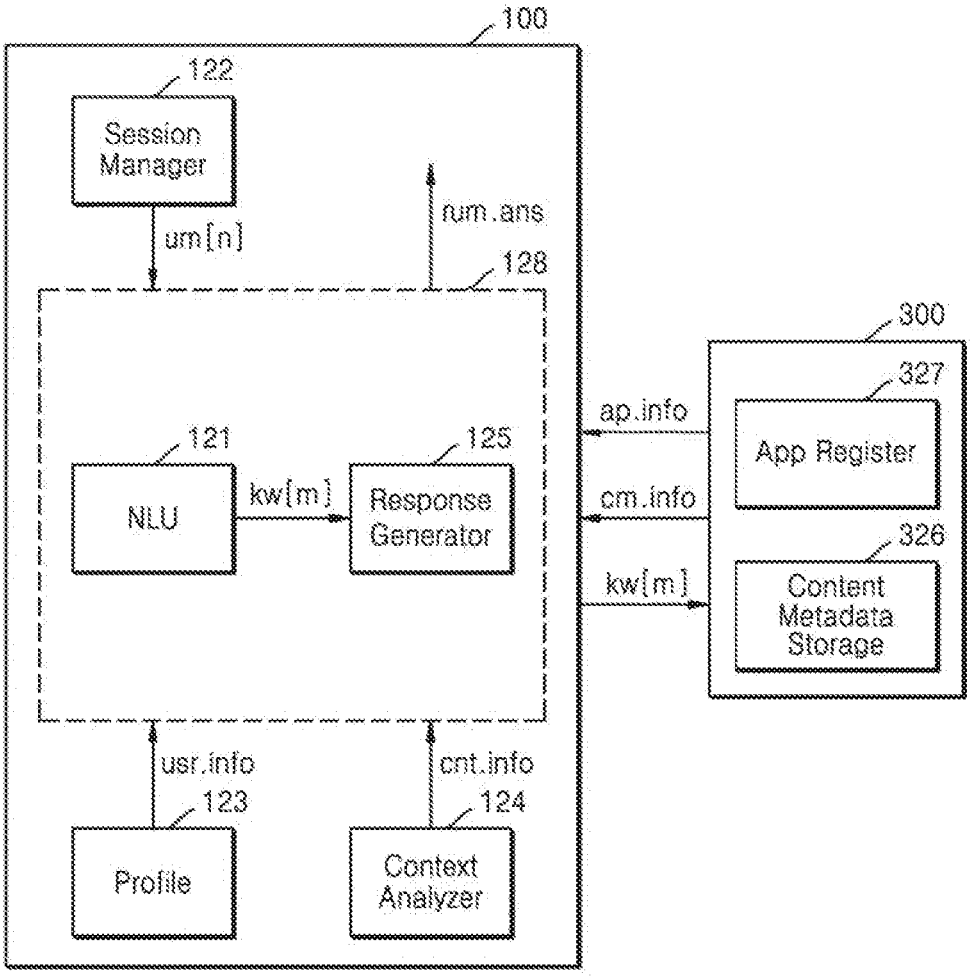
FIG. 12B is a view of a module included in each of an electronic device and a server.

FIG. 12B is a view of a module included in each of the electronic device 100 and the server 300.

FIG. 12B is an exemplary view for describing a method of obtaining the response related content via the electronic device 100. Specific components included in the electronic device 100 and specific components included in the server 300 may be adjusted in one or more ways.

Referring to FIG. 12B, the electronic device 100 may include the session manager 122, the profiler 123, the context analyzer 124, and the response recommender 128. The response recommender 128 may include the natural language processing unit (NLU) 121 and the response generator 125.

The server 300 may include a content metadata storage 326 and an App register 327.

The NLU 121 may analyze a meaning of the message received by the electronic device 100. The NLU 121 may analyze the message via a statistical analysis method and a semantic analysis method, and transmit the analyzed message to the context analyzer 124.

The session manager 122 may analyze the messages exchanged by the electronic device 100 in a group unit by checking and using a conversation partner, date and time at which the conversation takes place, conversation content, and a conversation environment with respect to the exchanged messages. The session manager 122 may group one or more messages exchanged by the electronic device 100 and define the group as a session. For example, the session manager 122 may transmit, for example, a message um[n] "where are you going in this afternoon?" to the response recommender 128.

The response recommender 128 may receive the message um[n] from the session manager 122, and the NLU 121 may generate a keyword kw[m] from the message um[n]. For example, the session manager 12 may transmit the message "where are you going in this afternoon?" to the response recommender 128, and the NLU 121 may generate a schedule, an event, a location, a destination, or time as the keyword kw[m].

The profiler 123 may continuously collect, process, and store content regarding the user of the electronic device 100 and persons related to the user of the electronic device 100. When the keyword kw[m] is generated, the response recommender 128 may receive user information usr.info related to the keyword kw[m] from the profiler 123 and refer to the user information usr.info. For example, the user information usr.info with respect to the message um[n] "where are you going in this afternoon?" may include the user information in an external service accountant and information about a user's home or company or places frequently visited by the user.

The context analyzer 124 may determine a meaning of each of messages exchanged by the electronic device 100, based on meanings of the messages exchanged by the electronic device 100. The context analyzer 124 may determine the meaning of each of messages exchanged by the electronic device 100 in a unit of one or more messages, the unit being defined by the session manager 122. The response recommender 128 may receive the context information cnt.info from the context analyzer 124.

For example, the context information cnt.info regarding the message um[n] "where are you going in this afternoon?" may include time information, GPS information, analyzed user schedule information, and recent logs. For example, the response recommender 128 may consider the context information cnt.info when the response recommender 128 generates a recommended response rcm.ans by using the keyword kw[m].

The electronic device 100 may receive application related information ap.info by transmitting the keyword kw[m] to the App register 327. For example, the application related information ap.info with respect to the message um[n] "where are you going in this afternoon?" may include scheduler application related information, social network service application related information, and chatting application related information. For example, a first application may be a weather-related application installed in the electronic device 100. For example, a second application may be a news related application which is not installed in the electronic device 100.

The electronic device 100 may receive content information cm.info by transmitting the keyword kw[m] to the content metadata storage 326. For example, the response recommender 128 may receive data about the weather related application and the news related application from the content metadata storage 326. For example, the content information cm.info regarding the message um[n] "where are you going in this afternoon?" may include image specific information or schedule related information. For example, the image specific information may include a location (latitude, longitude) in which an image is generated.

The response recommender 128 of the electronic device 100 may receive at least one of the application related information ap.info and the content information cm.info from the server 300 and refer to the user information usr.info and the context information cnt.info to generate the recommended response rcm.ans corresponding to the message um[n].

The response generator 125 may generate the response related content with respect to the message. The response generator 125 may generate the content which may be used in responding to the message. The response generator 125 may provide the generated content to the user via an interface screen.

2.5. Service Provision Based on the Server

Figure 13A:
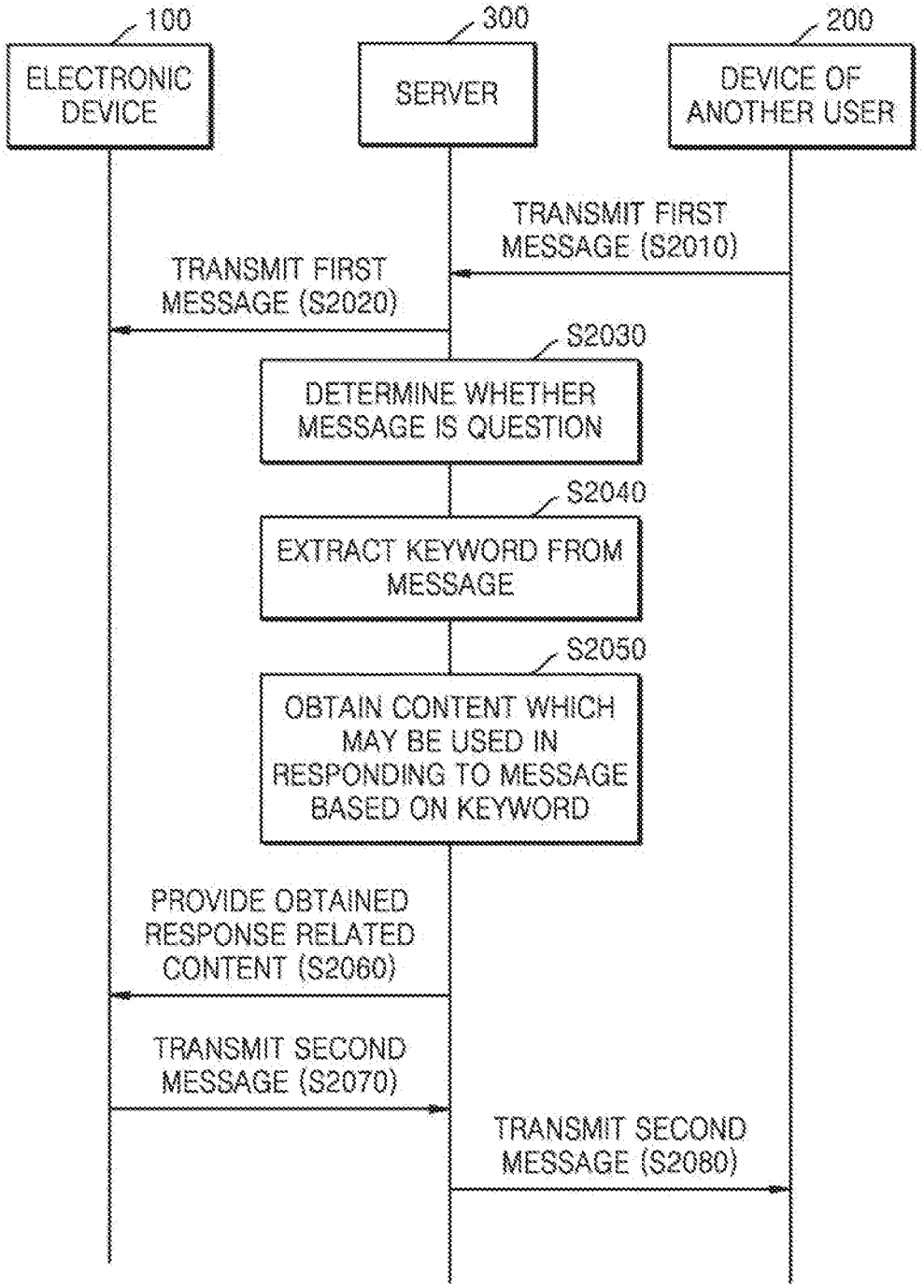
FIG. 13A is a flowchart for describing a method of providing response related content via an electronic device.

FIG. 13A is a flowchart for describing a method of providing the response related content via the electronic device 100.

The server 300 may receive a first message from the device of another user 200 in operation S2010. The server 300 may transmit the first message received from the device of another user 200 to the electronic device 100 in operation S2020.

The server 300 may determine whether the first message received from the device of another user 200 includes a question in operation S2030.

When the received first message includes a question, the server 300 may extract a keyword from the message in operation S2040.

The server 300 may obtain the content which may be used in responding to the message, based on the keyword, in operation S2050.

The server 300 may provide the content obtained based on the keyword to the electronic device 100. The electronic device 100 may provide the obtained content in operation S2060.

The electronic device 100 may transmit a second message to the server 300 in operation S2070. For example, the electronic device 100 may transmit the second message to the server 300 by including at least one piece of obtained content in the second message. The server 300 may transmit the second message to the device of another user 200 in operation S2080.

In FIG. 13A, operations S2030, S2040, and S2050 are illustrated as being performed after the first message is transmitted to the electronic device 100 through operation S2020. However, the present embodiment is not limited thereto, and operations S2030, S2040, and S2050 may be performed before the server 200 transmits the first message to the electronic device 100. For example, the first message may be transmitted together with the content obtained in operation 2050, Alternatively, the device of anther user 200 may directly transmit the first message to the electronic device 100 before, at, or after the device of another user 200 transmits the first message to the server 300. In that case, the server 200 may omit operation S2020.

According to another exemplary embodiment, the server 300 may provide online social networking services through a website or a mobile application. In that case, the server 300 may display the first message received from the device of another user 200 on the website or the mobile application rather than directly forwarding the first message to the electronic device 100 (operation S2020). The first message may be one of threaded comments posted by the device of another user 200 and/or other users. When the user of the electronic device 100 activates a comment input field by placing a cursor in the input field or touching the input field with his/her finger, the server 300 may perform operations S2030, S2040, and S2050 with one of the comments posted on the website or the mobile application. For example, the server 300 may perform operations S2030, S2040, and S2050 on comments which are posted most recently or selected by a user input.

Figure 13B:
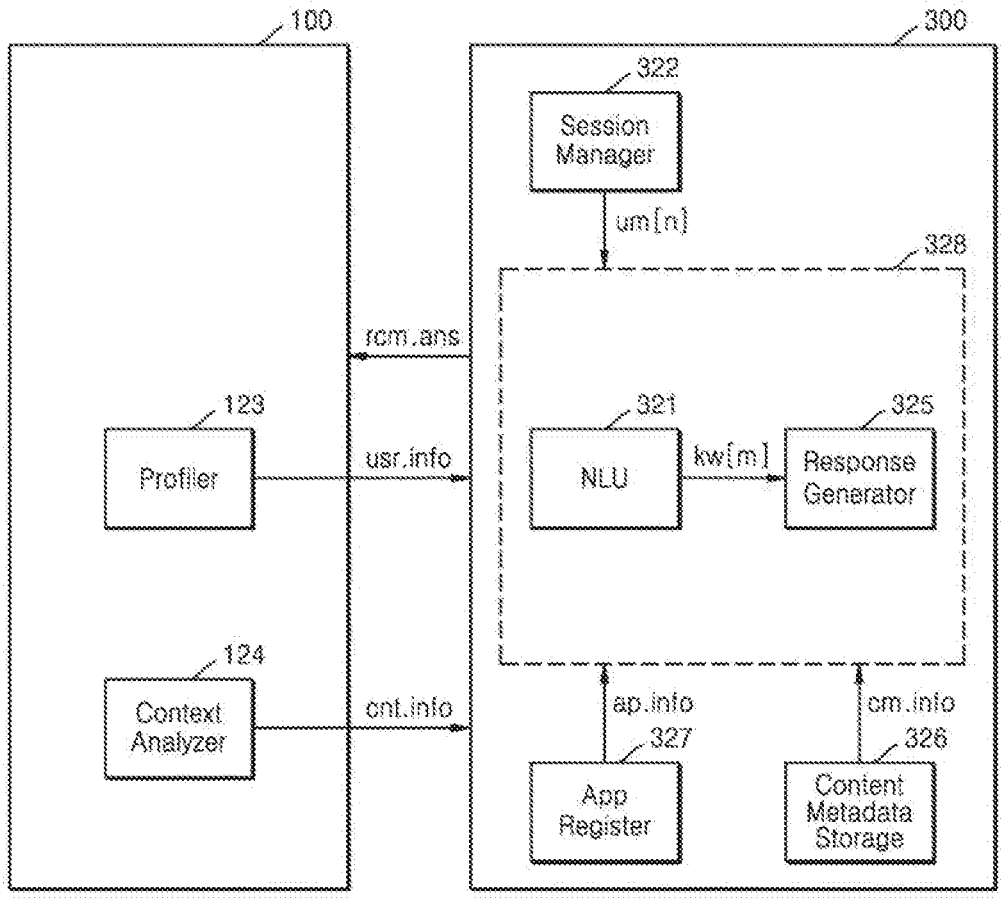
FIG. 13B is a view of a module included in each of an electronic device and a server.

FIG. 13B is a view of a module included in each of the electronic device 100 and the server 300.

FIG. 13B is an exemplary view for describing a method of obtaining the response related content based on the server 300. Specific components included in the electronic device 100 and specific components included in the server 300 may be adjusted via one or more methods.

Referring to FIG. 13B, the electronic device 100 may include the profiler 123 and the context analyzer 124.

The profiler 123 may continuously retain, process, and store content written by the user of the electronic device 100 or other users. The profiler 123 may transmit user information usr.info to the server 300 by receiving a request of the server 300.

The context analyzer 124 may determine a meaning of each of messages exchanged by the electronic device 100, based on meanings of the messages exchanged by the electronic device 100. The context analyzer 124 may transmit context information cnt.info to the server 300 by receiving a request of the server 300.

The server 300 may include a session manager 322, the content metadata storage 326, the App register 327, and a response recommender 328. The response recommender 328 may include the natural language processing unit NLU 321 and a response generator 325.

The session manager 322 may determine a conversation partner, date and time in which the conversation takes place, conversation content, and conversation environments with respect to the messages exchanged by the electronic device 100 and may determine the messages exchanged by the electronic device 100 via the server 300 in a group unit. The session manager 322 may gather one or more messages exchanged by the electronic device 100 and define the gathered messages as a session. For example, the session manager 322 may transmit the received message um[n] to the response recommender 328.

The response recommender 328 may receive the message um[n] from the session manager 322 and the NLU 321 may generate a keyword kw[m] from the message um[n]. For example, the session manager 322 may transmit a message "Is there a hot issue in Boston?" to the response recommender 328, and the NLU 321 may generate news, issues, topic, and location as the keyword kw[m].

The response recommender 328 may receive user information usr.info from the profiler 123. For example, when the keyword kw[m] is generated, the response recommender 328 may refer to the user information usr.info received from the profiler 123. For example, the user information usr.info may include an age and a preference of the user. For example, the user information usr.info may include user information in an external service accountant.

The response recommender 328 may receive context information cnt.info from the context analyzer 124. For example, the response recommender 328 may consider the context information cnt.info, when the response recommender 328 generates a recommended response rcm.ans by using the keyword kw[m]. The context information cnt.info may include time, an analyzed user schedule, and recent logs.

The response recommender 328 may receive at least one of application related information ap.info and content information cm.info and may refer to the user information usr.info and the context information cnt.info received from the electronic device 100, to generate the recommended response rcm.ans corresponding to the message um[n]. For example, the application related information ap.info may include information of applications providing news, magazines, articles. For example, the content information cm.info may include articles, and images of Boston.

The response generator 325 may generate the response related content with respect to the message. The response generator 325 may generate the content which may be used in responding to the message. The response generator 325 may transmit the generated content to the electronic device 100.

2.6. Service Provision Based on the Terminal and the Server

Figure 14A:
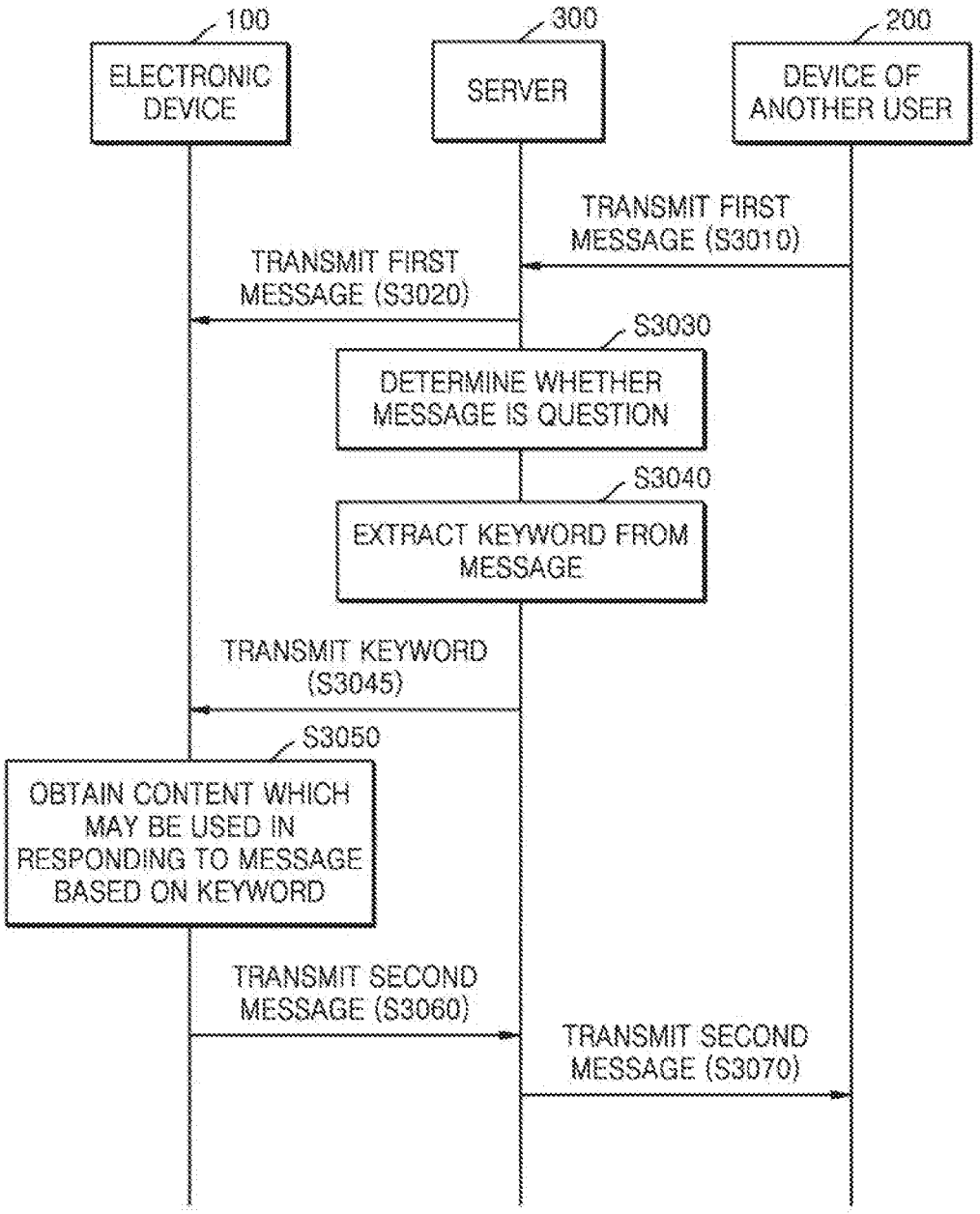
FIG. 14A is a flowchart for describing a method of providing response related content via an electronic device.

FIG. 14A is a flowchart for describing a method of providing the response related content via the electronic device 100.

The server 300 may receive a first message from the device of another user 200 in operation S3010. The server 300 may transmit the first message received from the device of another user 200 to the electronic device 100 in operation S3020.

The server 300 may determine whether the first message received from the device of another user 200 includes a question in operation S3030. The server 300 may determine whether the first message includes a question after transmitting the first message to the electronic device 100, and may determine whether the first message includes a question before transmitting the first message to the electronic device 100.

When the received first message includes a question, the server 300 may extract a keyword from the message in operation S3040. The server 300 may transmit the keyword to the electronic device 100 in operation S3045.

The electronic device 100 may obtain the content which may be used in responding to the message based on the keyword, in operation S3050. The electronic device 100 may display the content obtained based on the keyword.

The electronic device 100 may transmit a second message to the server 300 in operation S3060. For example, the electronic device 100 may transmit the second message to the server 300 by including at least one piece of obtained content in the second message. The server 300 may transmit the second message to the device of another user 200 in operation S3070.

The sever 300 may perform operations S3030 and S3040 before transmitting the first message, and may transmit the first message and the keyword to the electronic device 100 at substantially the same time. Alternatively, the device of anther user 200 may directly transmit the first message to the electronic device 100 before, at, or after the device of another user 200 transmits the first message to the server 300. In that case, the server 300 may omit operation S3020.

Figure 14B:
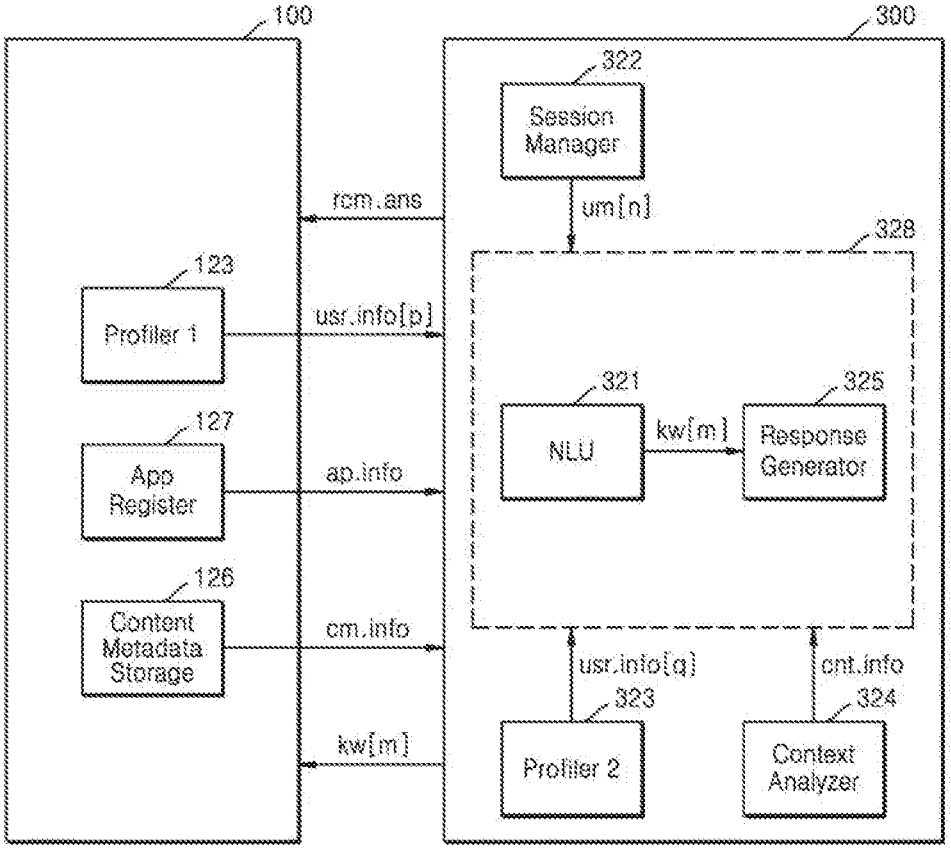
FIG. 14B is a view of a module included in each of an electronic device and a server.

FIG. 14B is a view of a module included in each of the electronic device 100 and the server 300.

FIG. 14B is an exemplary view for describing a method of obtaining the response related content, based on the server 300. Specific components included in the electronic device 100 and specific components included in the server 300 may be adjusted in one or more ways.

Referring to FIG. 14B, the electronic device 100 may include the first profiler 123, the content metadata storage 126, and the App register 127.

The first profiler 123 may collect and store data regarding a user of the electronic device 100 or another user. The data regarding the user may include a name, a job, a telephone number, an interest field, a friend relationship, and a movement record of the user. The first profiler 123 may keep, process, and store content written by the user of the electronic device 100. The content written by the user of the electronic device 100 may include a message, a memo, a reply, and a comment written by the user.

The content metadata storage 126 may include various types of data with respect to the content. For example, the content metadata storage 126 may include data regarding types of an application. Also, for example, the content metadata storage 126 may include metadata, such as a date of image generation, and a place of image generation.

Also, for example, the content metadata storage 126 may continuously collect and store data with respect to various types of web content on the Internet and data with respect to various types of content of the electronic device 100.

The App register 127 may include data regarding various applications. For example, the App register 127 may store data regarding at least one of a first application installed in the electronic device 100 and a second application not installed in the electronic device 100.

The server 300 may include the NLU 321, the session manager 322, a second profiler 323, the context analyzer 324, and the response generator 325.

The session manager 322 may analyze messages exchanged by the server 300 in a group unit by checking and using conversation participants, date and time of conversation, conversation content, and conversation environments of the messages exchanged by the server 300. The session manager 322 may gather one or more messages exchanged by the server 300 and define the gathered messages as a session.

The NLU 321 may analyze a meaning of a first message received by the server 300. The NLU 321 may analyze the first message by a statistical analysis method and a semantic analysis method and transmit the analyzed meaning to the context analyzer 324.

The context analyzer 324 may determine a meaning of each of messages exchanged by the electronic device 100 based on meanings of the messages exchanged by the electronic device 100. The context analyzer 324 may determine the meaning of each of messages exchanged by the electronic device 100 in a unit of one or more messages, the unit being defined by the session manager 322.

The response recommender 328 may receive at least one of user information usr.info[p] and context information cnt.info and may refer to the user information usr.info[p], application related information ap.info, and content information cm.info received from the electronic device 100, to generate a recommended response rcm.ans corresponding to the message um[n]. The server 300 may transmit the recommended response rcm.ans to the electronic device 100.

2.7. Analysis of the Relationship of Conversation Participants

Figure 15:
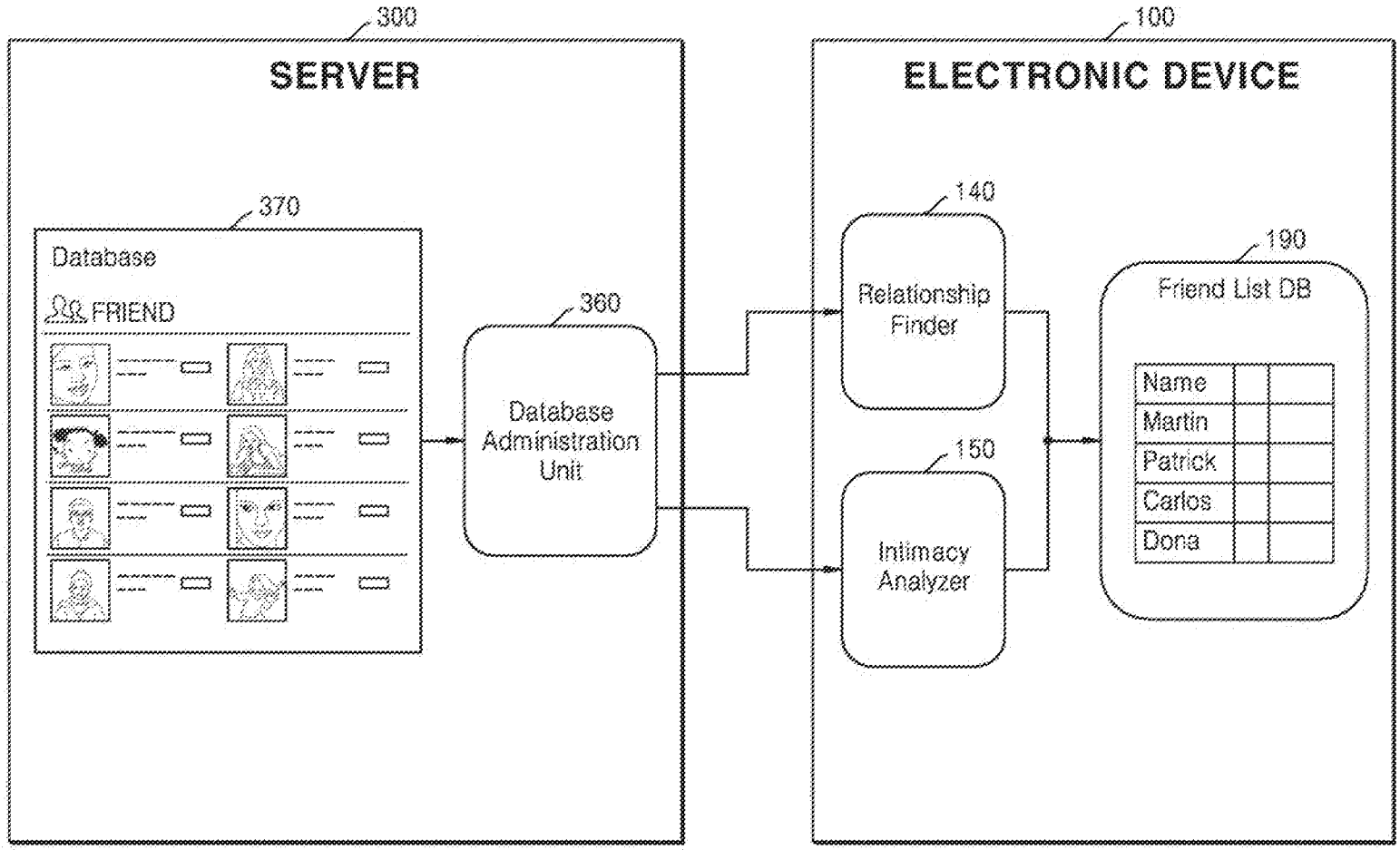
FIG. 15 is a view for describing a method of utilizing content stored in a database of a server to understand a relationship between users.

FIG. 15 is a view for describing a method of utilizing information stored in a database 370 of the server 300 to figure a relationship between users.

Referring to FIG. 15, the server 300 may collect, manage, and analyze information of the users via the database 370 and a database manager 360.

The database 370 may include data with respect to various users. For example, the database 370 may store information regarding a user related to the user of the electronic device 100. For example, the database 370 may include data regarding a level of intimacy between a user of the device of another user 200 and the user of the electronic device 100.

The database manager 360 may manage the database 370. The database manager 360 may manage various types of data recorded in the database 370, and may provide the data managed by the database manager 360 to the electronic device 100 in response to a request of the electronic device 100.

The database manager 360 may manage records for each user written in the database 370. Also, the database manager 360 may manage records for each group written in the database 370. The database manager 360 may transmit the data requested by the electronic device 100 to the electronic device 100.

The electronic device 100 may edit and manage information stored in the server 300 via a relationship finder 140, an intimacy analyzer 150, and a friend list database 190.

The relationship finder 140 may determine a relationship between the user of the device of another user 200 and the user of the electronic device 100. The relationship finder 140 may receive the information about the user of the device of another user 200 and the user of the electronic device 100 by requesting the information from the database manager 360 included in the server 300, and may determine the relationship between the users. The relationship finder 140 may determine the relationship between the users by analyzing previous call records and conversation content between the users.

The intimacy analyzer 150 may analyze the level of intimacy between the user of the device of another user 200 and the user of the electronic device 100. For example, the intimacy analyzer 150 may calculate the level of intimacy between the user of the device of another user 200 and the user of the electronic device 100 as quantified data (for example, data such as 1, 2, 3, and 10, or data such as a first level, a second level, and a third level). For example, the intimacy analyzer 150 may determine which of one or more predetermined categories the intimacy level between the user of the device of another user 200 and the user of the electronic device 100 belongs to. For example, the intimacy analyzer 150 may analyze the level of intimacy between the user of the device of another user 200 and the user of the electronic device 100 in such a way that the intimacy analyzer 150 selects the intimacy level from among categories, such as a "family," a "friend," a "colleague," or a "school mate."

The friend list database 190 may store data analyzed by the relationship finder 140 and the intimacy analyzer 150, based on a relationship that a user has with respect to the user of the electronic device 100. Here, information included in the friend list database 190 may correspond to not only information about friends of the user of the electronic device 100, the friends as in a social context, but also information about all persons who may be accessed by the electronic device 100, such as families, alumni, colleagues, and relatives.

For example, the friend list database 190 may store information that the user of the device of another user 200 and the user of the electronic device 100 are friends in a social network service (SNS). For example, the friend list database 190 may store information that the user of the device of another user 200 and the user of the electronic device 100 are family members or relatives. For example, the friend list database 190 may store information that the user of the device of another user 200 and the user of the electronic device 100 are an employee and an employer of a company. For example, the friend list database 190 may store information that the user of the device of another user 200 and the user of the electronic device 100 are school alumni.

Figure 16:
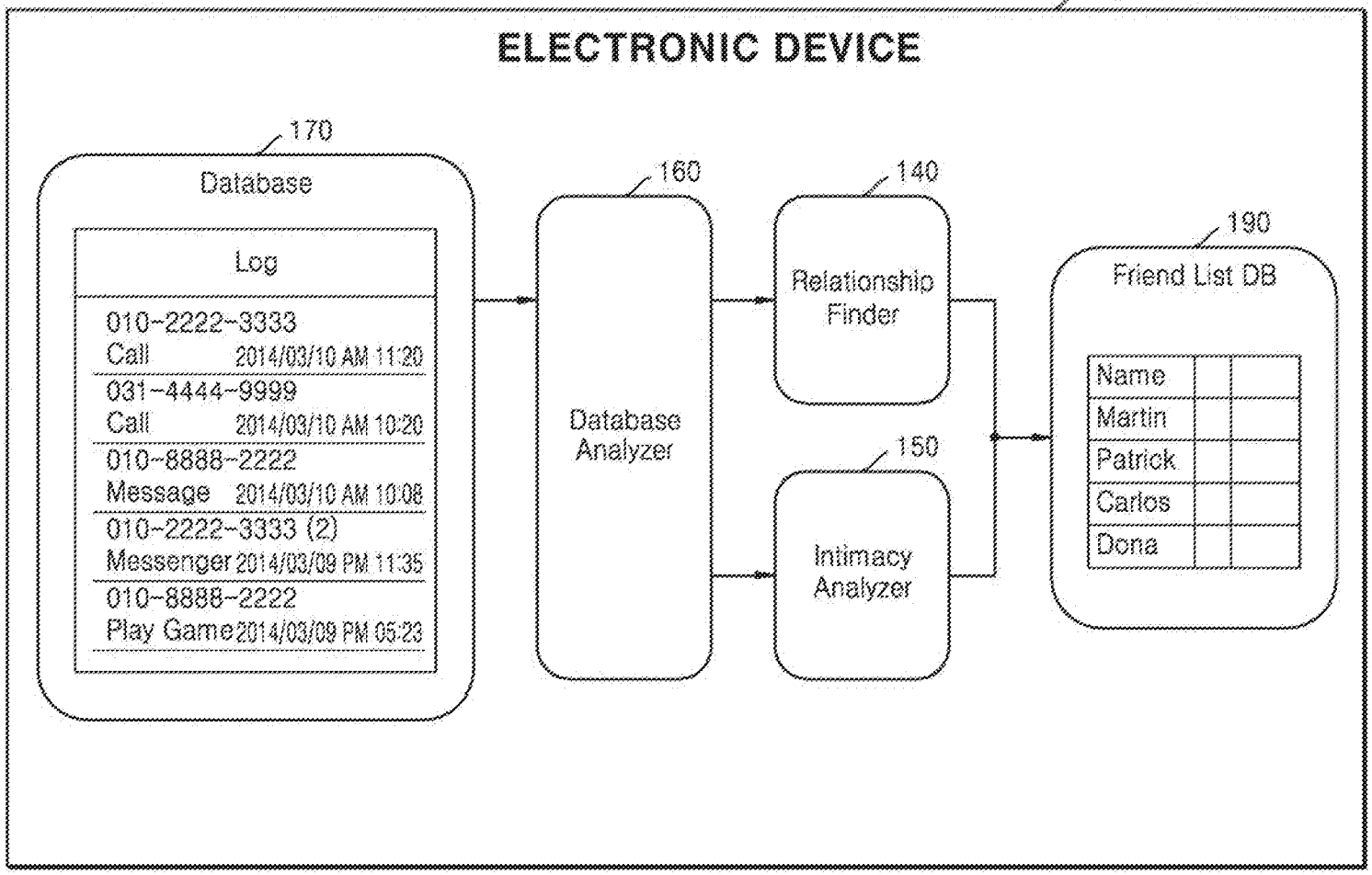
FIG. 16 is a view for describing a method of utilizing content stored in a database of an electronic device to understand a relationship between users.

FIG. 16 is a view for describing a method of utilizing information stored in the database 170 of the electronic device 100 to determine a relationship between users.

Referring to FIG. 16, the electronic device 100 may collect, manage, and analyze information about the users via the database 170, a database analyzer 160, the relationship finder 140, the intimacy analyzer 150, and the friend list database 190.

The database 170 may include data corresponding to phone records between the user of the electronic device 100 and various users. For example, the database 170 may store information about phone records between the user of the electronic device 100 and other users, in real time. For example, the phone records may include calling time, calling places, calling start time, calling end time, and calling methods (voice or message).

Also, the database 170 may include data written in an address book or a contact list of the user of the electronic device 100. For example, the database 170 may include information, such as a company name, a job, and a family relation of a friend.

The database analyzer 160 may analyze and manage data such as the phone records or the address list included in the database 170. The database analyzer 160 may analyze various types of data written in the database 170 and may provide a result of the analysis of the data, in response to a request of the relationship finder 140 or the intimacy analyzer 150.

The database analyzer 160 may manage the record written in the database 170 for each individual. Also, the database analyzer 160 may manage the record written in the database 170 for each group. The database analyzer 160 may transmit the data requested by the relationship finder 140 or the intimacy analyzer 150 to the electronic device 100.

The relationship finder 140 may determine a relationship between the user of the device of another user 200 and the user of the electronic device 100. The relationship finder 140 may determine the relationship between the user of the device of another user 200 and the user of the electronic device 100 by requesting the database analyzer 160. The relationship finder 140 may determine the relationship between the user of the device of another user 200 and the user of the electronic device 100 by analyzing previous call records between the user of the device of another user 200 and the user of the electronic device 100.

The intimacy analyzer 150 may analyze a level of intimacy between the user of the device of another user 200 and the user of the electronic device 100. For example, the intimacy analyzer 150 may calculate the level of intimacy between the user of the device of another user 200 and the user of the electronic device 100 as quantified data (for example, data such as 1, 2, 3, and 10, or data such as a first level, a second level, and a third level). For example, the intimacy analyzer 150 may analyze the level of intimacy between the user of the device of another user 200 and the user of the electronic device 100 in such a way that the intimacy analyzer 150 selects the level of intimacy from among categories, such as a "family," a "friend," a "colleague," or a "school mate."

The friend list database 190 may store the data analyzed by the relationship finder 140 and the intimacy analyzer 150, based on a relationship that a user has with respect to the user of the electronic device 100. The friend list database 190 of FIG. 16 is similar to the friend list database 190 of FIG. 15.

Figure 17:
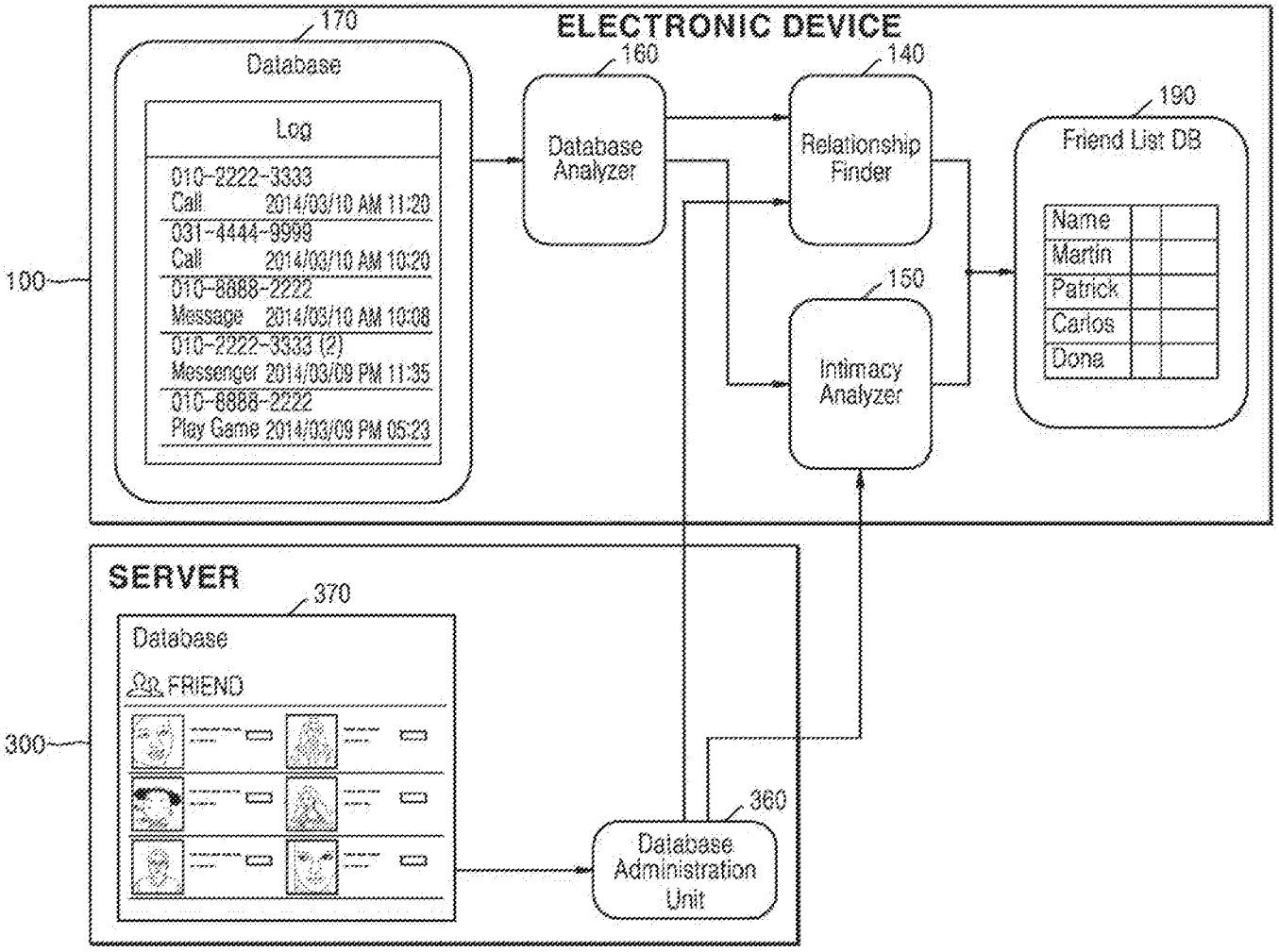
FIG. 17 is a view for describing a method of utilizing content stored in a database of an electronic device and content stored in a database of a server, in order to understand a relationship between a user of the electronic device and a user of a device of another user.

FIG. 17 is a view for describing a method of utilizing information stored in the database 170 of the electronic device 100 and information stored in a database 370 of the server 300, to determine a relationship between a user of the electronic device 100 and a user of the device of another user 200.

Referring to FIG. 17, the electronic device 100 may collect, manage, and analyze information related to the users via the database 170, the database analyzer 160, the relationship finder 140, the intimacy analyzer 150, and the friend list database 190. The database 170 and the database analyzer 160 of FIG. 17 are similar to the database 170 and the database analyzer 160 of FIG. 16. Hereinafter, repeated descriptions will be omitted.

The server 300 may include the database 370 and the database manager 360. The database 370 and the database manager 360 of FIG. 17 are similar to the database 370 and the database manager 360 of FIG. 15. Hereinafter, repeated descriptions will be omitted.

The relationship finder 140 may determine the relationship between the user of the device of another user 200 and the user of the electronic device 100. The relationship finder 140 may determine the relationship between the user of the device of another user 200 and the user of the electronic device 100 by requesting at least one of the database analyzer 160 and the database manager 360. The relationship finder 140 may determine the relationship between the user of the device of another user 200 and the user of the electronic device 100 by analyzing previous phone records between the user of the device of another user 200 and the user of the electronic device 100. The relationship finder 140 may determine the relationship between the user of the device of another user 200 and the user of the electronic device 100 by analyzing conversation content between the user of the device of another user 200 and the user of the electronic device 100.

The intimacy analyzer 150 may analyze a level of intimacy between the user of the device of another user 200 and the user of the electronic device 100. The intimacy analyzer 150 may analyze the level of intimacy between the user of the device of another user 200 and the user of the electronic device 100 by requesting at least one of the database analyzer 160 and the database manager 360.

For example, the intimacy analyzer 150 may calculate the level of intimacy between the user of the device of another user 200 and the user of the electronic device 100 as quantified data (for example, data such as 1, 2, 3, and 10, or data such as a first level, a second level, and a third level). For example, the intimacy analyzer 150 may determine which of one or more predetermined categories the level of intimacy between the user of the device of another user 200 and the user of the electronic device 100 belongs to. For example, the intimacy analyzer 150 may analyze the level of intimacy between the user of the device of another user 200 and the user of the electronic device 100 in such a way that the intimacy analyzer 150 selects the level of intimacy from among categories, such as a "family," a "friend," a "colleague," or a "school mate."

The friend list database 190 may store the data analyzed in the relationship finder 140 and the intimacy analyzer 150, based on a relationship that a user has with respect to the user of the electronic device 100.

Also, according to another exemplary embodiment, at least one of the relationship finder 140, the intimacy analyzer 150, and the friend list database 190 may be included in the server 300.

3. Scenario 2

3.1. Identification with Respect to Content Obtainment

FIGS. 18, 19A through 19D, 20A through 20D, 21, 22A, 22B, 23A through 23C, and 23A through 24E are views for describing a method of providing content according to an exemplary embodiment. FIGS. 18, 19A through 19D, 20A through 20D, 21, 22A, 22B, 23A through 23C, and 23A through 24E are views of a user interface according to steps of a scenario in which the electronic device 100 provides a text chatting service, and directly provides to a user an image and a recommended application, as response related content.

Figure 18:
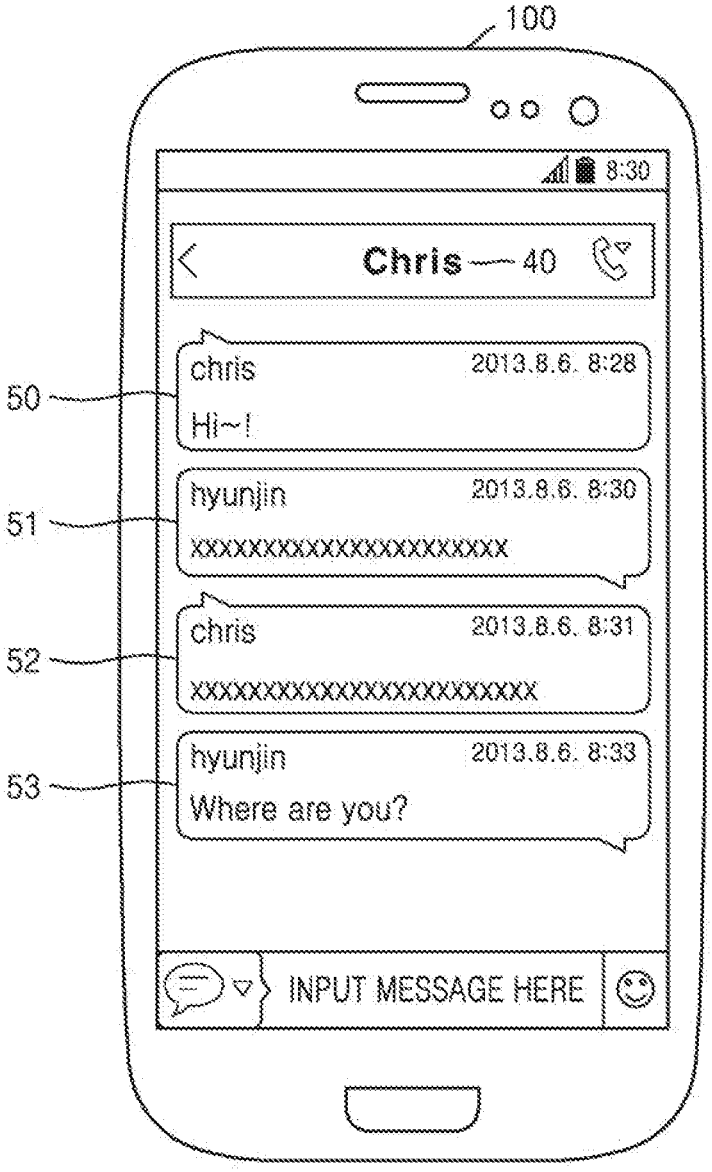
FIGS. 18, 19A through 19D, 20A through 20D, 21, 22A, 22B, 23A through 23C, and 24A through 24E are views for describing a method of providing content according to an exemplary embodiment.

Referring to FIG. 18, Chris, the user of the electronic device 100 is performing a text chatting with Hyunjin, the user of the device of another user 200.

The electronic device 100 displays the name of the user of the electronic device 100 via the user name box 40. According to another exemplary embodiment, the electronic device 100 may display the name of the user of the device of another user 200 via the user name box 40.0

The electronic device 100 receives the message 50 "Hi" from the device of another user 200 at 8:26 on Aug. 6, 2013. The electronic device 100 transmits the message 51 to the device of another user 200 and receives the message 52 from the device of another user 200. The user of the electronic device 100 receives the message "where are you?" from Hyunjin.

The electronic device 100 may determine whether each of the messages 50, 51, 52, and 53 includes a question. For example, the electronic device 100 may determine that the messages 50, 51, and 52 do not include questions, and the message 53 includes a question.

Figure 19A:
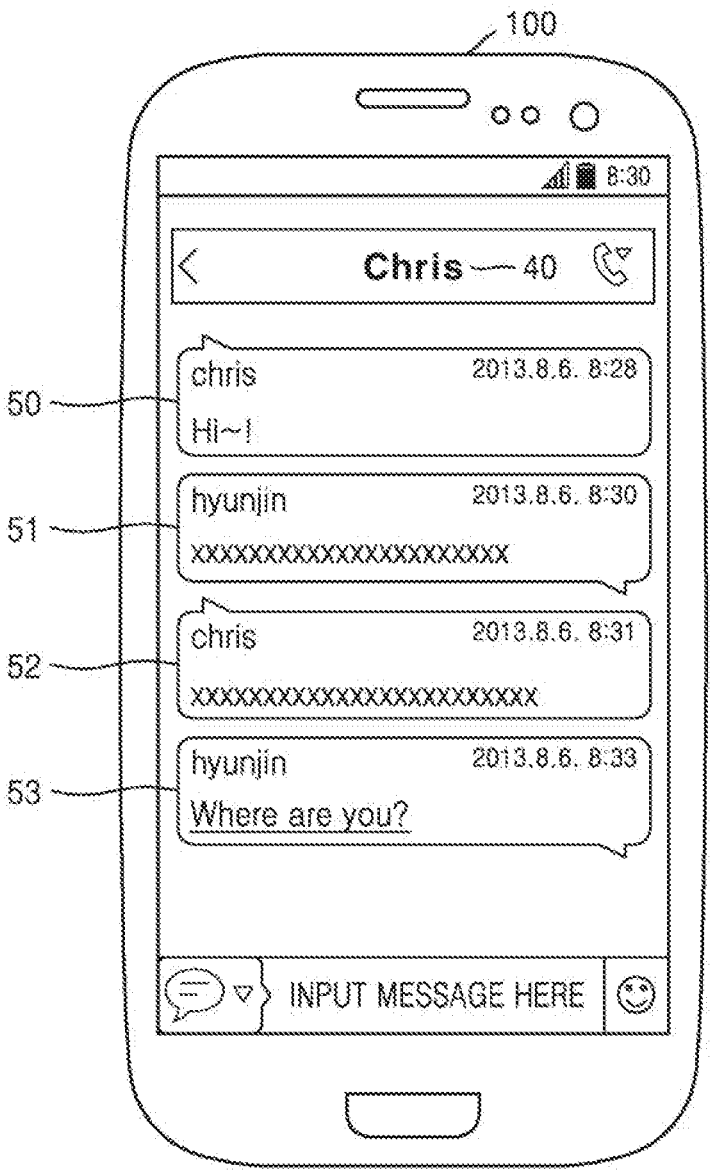
Figure 19B:
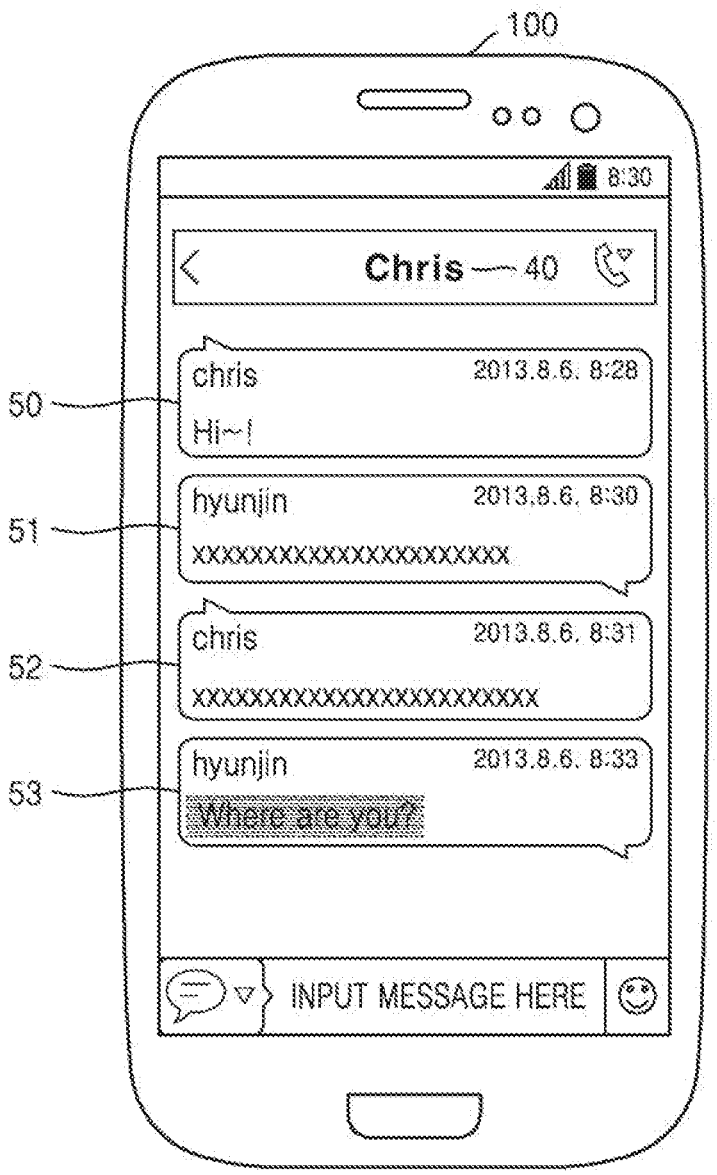
Figure 19C:
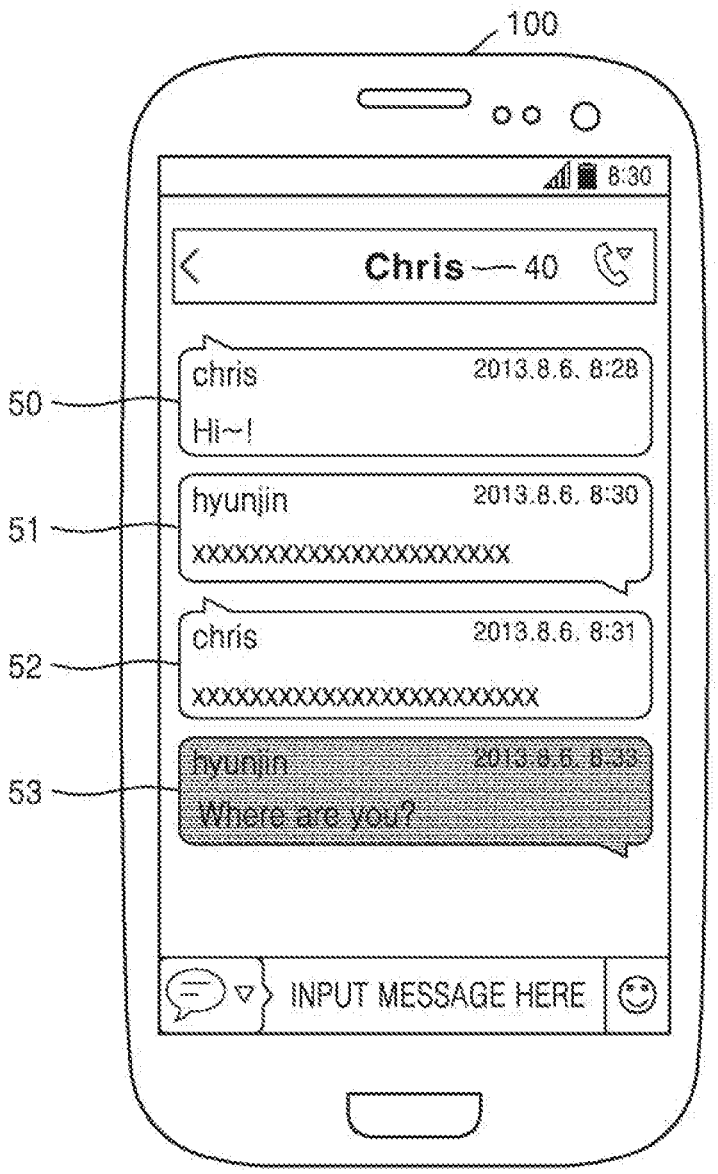

For example, the electronic device 100 may mark the message which is determined as a question such that the message determined as a question is distinguished from other messages, as illustrated in FIGS. 19A through 19C. For example, the electronic device 100 may mark the message corresponding to the question by using an underline as illustrated in FIG. 19A. For example, the electronic device 100 may mark the message corresponding to the question by using a shadow for the text, as illustrated in FIG. 19B. For example, the electronic device 100 may mark the message corresponding to the question by using a shadow for a speech bubble, as illustrated in FIG. 190.

When the electronic device 100 receives a user input corresponding to the portion marked so as to be distinguished from other messages, the electronic device 100 may display content which may be used in responding to the message.

Figure 19D:
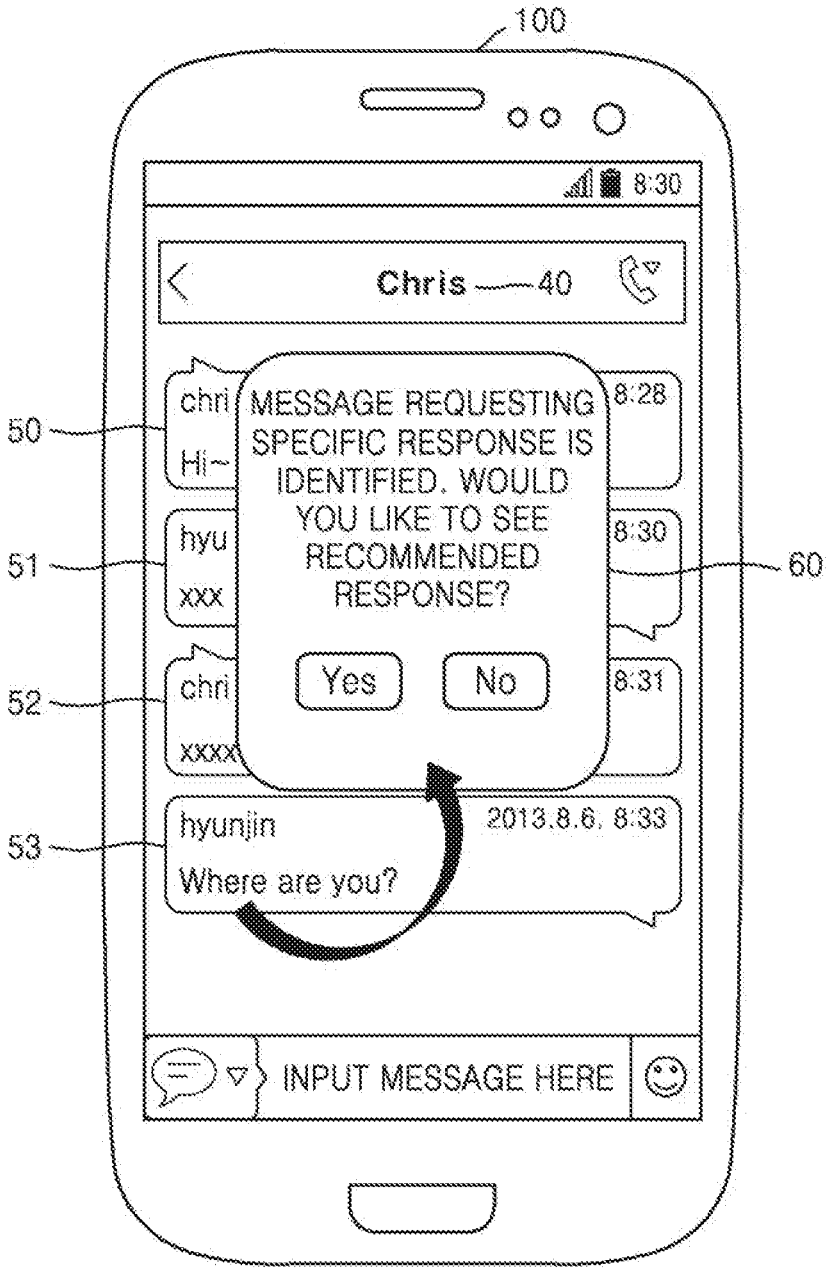

For example, when the message 53 is determined as the question, the electronic device 100 may receive a user input indicating whether a recommended response is required, via the pop-up window 60, as illustrated in FIG. 19D.

3.2. Proposal of Content

Referring to FIGS. 20A through 20D, the electronic device 100 may display the content which may be used in responding to the message 53, in response to the user input.

Figure 20A:
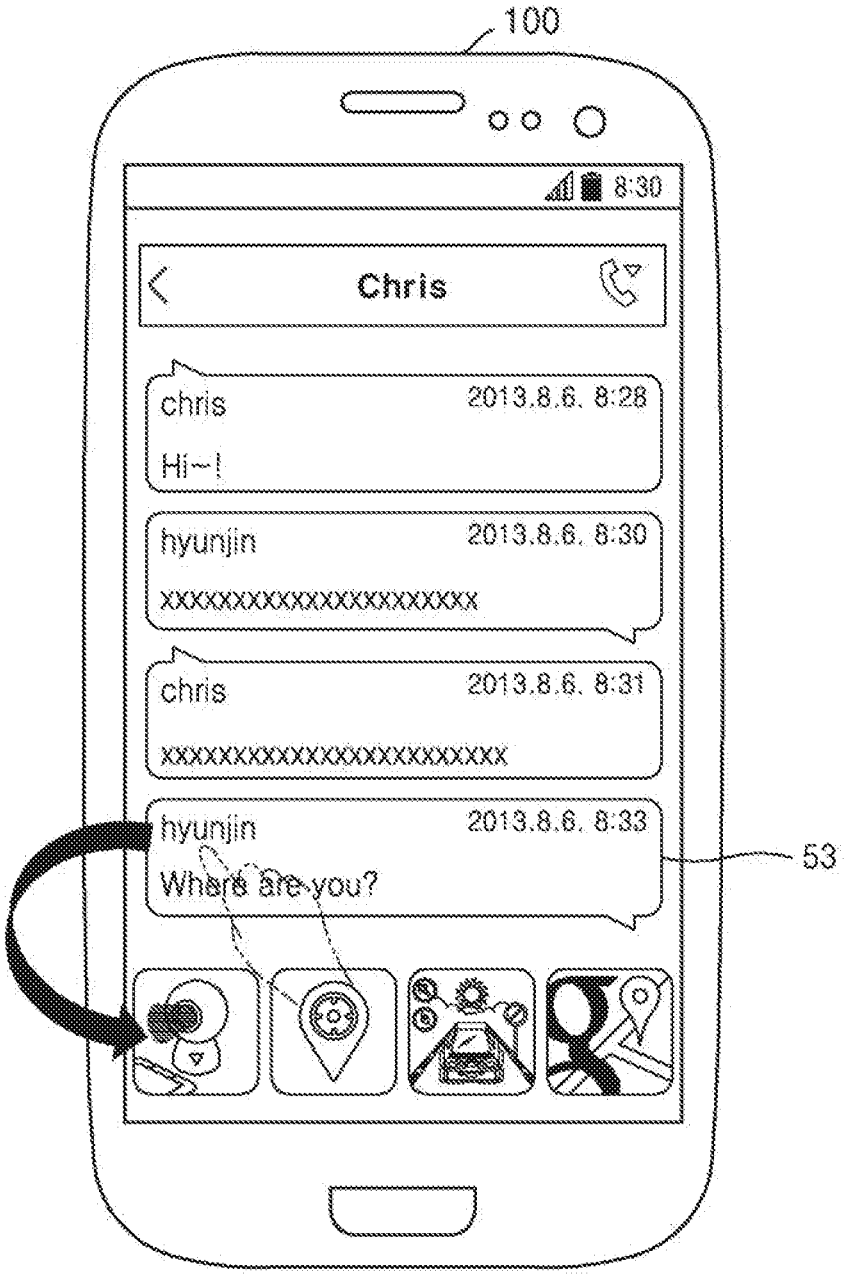

Referring to FIG. 20A, the electronic device 100 may recommend an application related to the message corresponding to the question, when the electronic device 100 receives a user input (for example, a touch) corresponding to the mark illustrated in FIG. 19C. For example, the electronic device 100 may recommend a map application or a navigation application when the message corresponding to the question is related to a location.

Figure 20B:
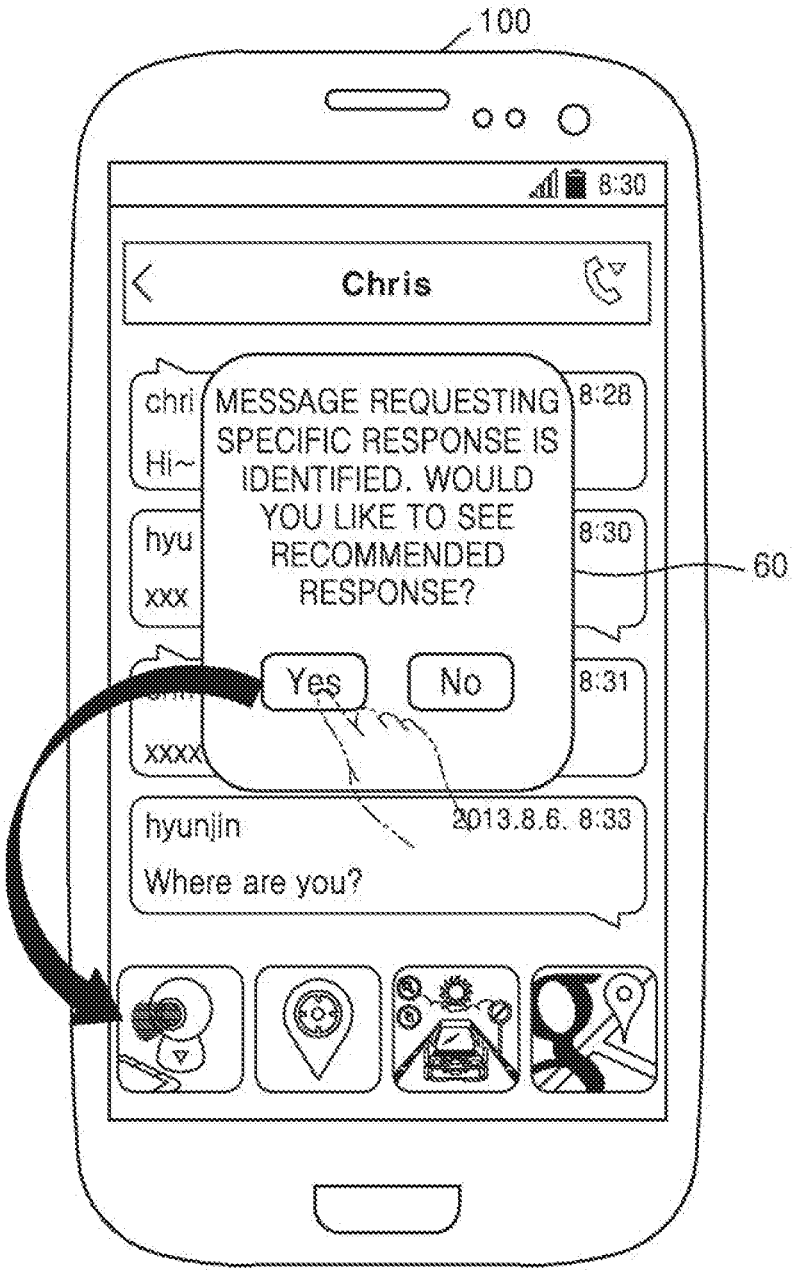

Referring to FIG. 20B, the electronic device 100 may recommend an application related to the message corresponding to the question, when the electronic device 100 receives a user input (for example, a user input touching a YES button) corresponding to the mark illustrated in FIG. 19D. For example, when the message corresponding to the question is related to a location, the electronic device 100 may recommend a map application or a navigation application.

Figure 20C:
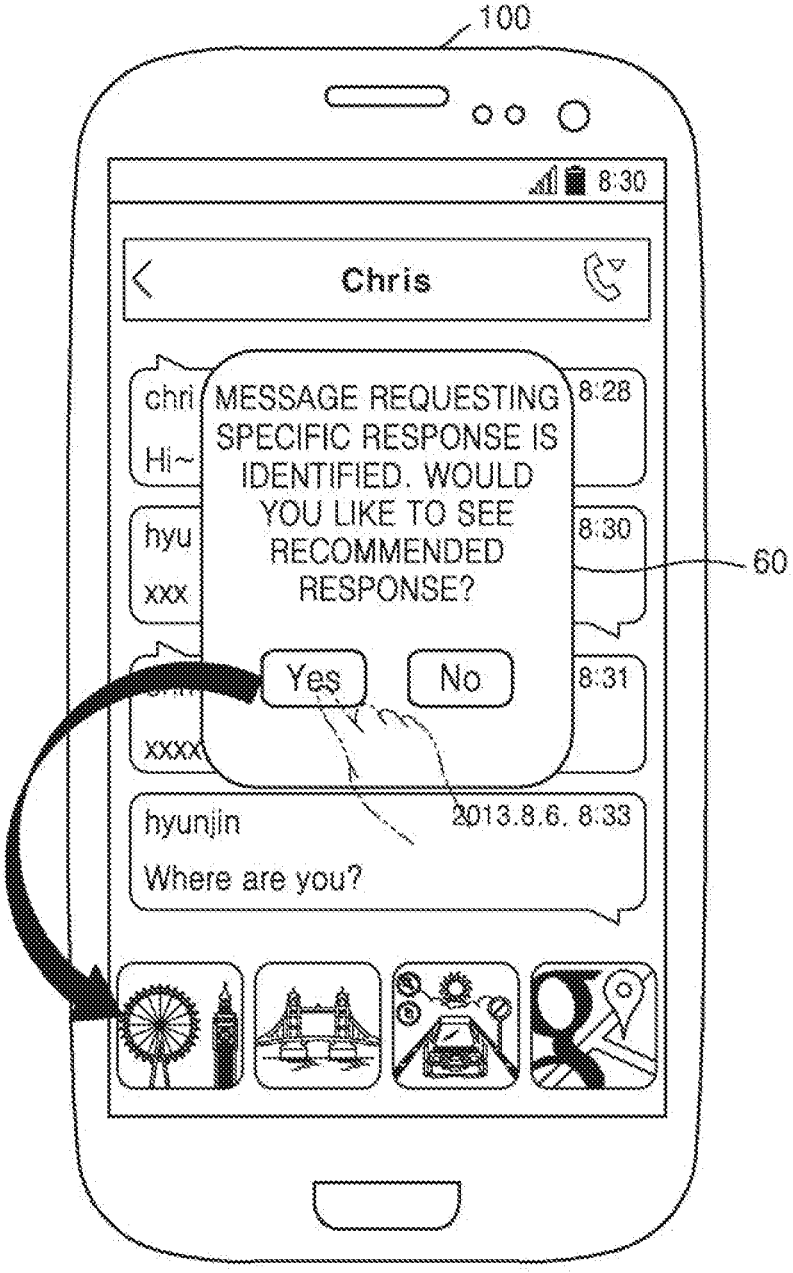

Referring to FIG. 20C, the electronic device 100 may recommend at least one of an application and an image related to the message corresponding to the question, when the electronic device 100 receives a user input (for example, a user input touching a YES button) corresponding to the mark illustrated in FIG. 19D.

The electronic device 100 may recommend at least one of the application and the image which may be used in responding to the message, by considering the relationship between the user of the electronic device 100 and the user of the device of another user 200, according to the exemplary method described by referring to FIGS. 15 through 17.

For example, the electronic device 100 may recommend at least one of the application and the image, except a personal picture of the user of the electronic device 100, when the electronic device 100 determines that the user of the electronic device 100 and the user of the device of another user 200 have a relationship that is an employer and an employee. For example, if the user of the electronic device 100 takes a vacation in London now, the electronic device 100 may not recommend a picture taken in the vacation as the response, by considering that the relationship between conversation participants is business-related. The electronic device 100 may classify the vacation picture as personal data and store the classification information in connection with the vacation picture. The electronic device 100 may not suggest any data classified as personal data when the level of intimacy (e.g., level 2) of the user of another device 200 is lower than a predetermined level (e.g., level 7).

Figure 20D:
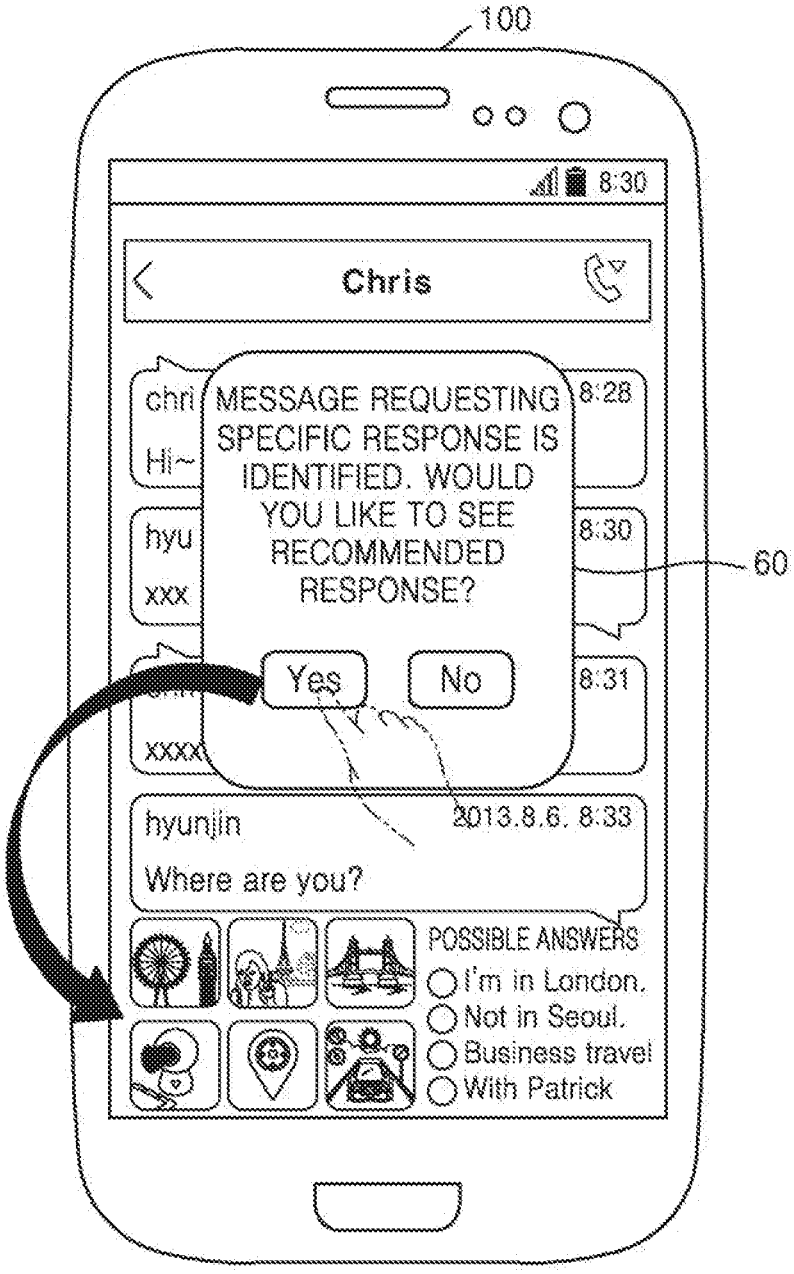

Referring to FIG. 20D, the electronic device 100 may recommend at least one of an application, a direct response, and an image, which are related to the message corresponding to the question, when the electronic device 100 receives a user input (for example, a user input touching a YES button) corresponding to the mark illustrated in FIG. 19D.

The electronic device 100 may recommend at least one of the application, the direct response, and the image which may be used in responding to the message, by considering the relationship between the user of the electronic device 100 and the user of the device of another user 200, according to the exemplary method described with reference to FIGS. 15 through 17. In this specification, the direct response may denote a sentence, a phrase, a word, etc. which may become a response with respect to the message, without an additional search.

For example, when the electronic device 100 determines that the user of the electronic device 100 and the user of the device of another user 200 have a relationship that has a high level of intimacy, such as families or friends, the electronic device 100 may provide the content which may be used in responding to the message, the content including an personal picture of the user of the electronic device 100. For example, if the user of the electronic device 100 currently takes a vacation in London, the electronic device 100 may recommend a picture taken in the vacation as the response, by considering that the conversation participants have a personal relationship.

3.3. Specific Response Situation

FIGS. 21, 22A, 22B, 23A through 23C, and 23A through 24E are views illustrating a process in which a user selects response related content proposed by the electronic device 100 and provides the response related content to the device of another user 200.

Figure 21:
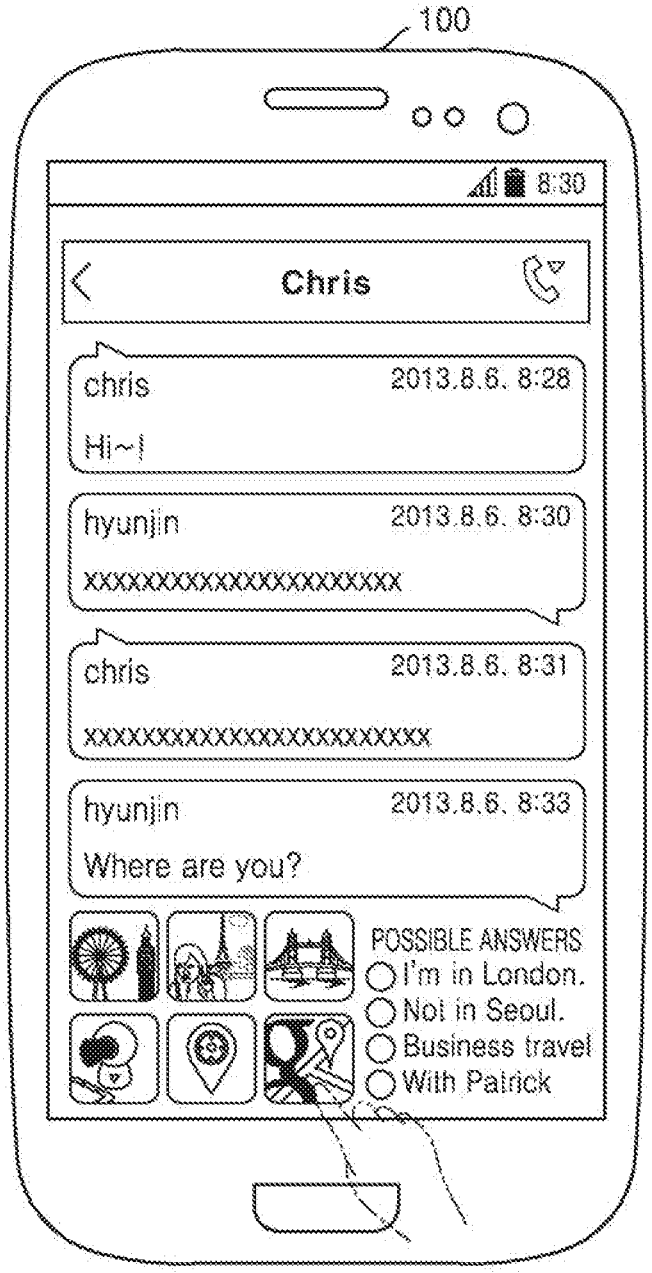

Referring to FIG. 21, the user of the electronic device 100 may select a map application from among the recommended response related content illustrated in FIG. 20D.

Figure 22A:
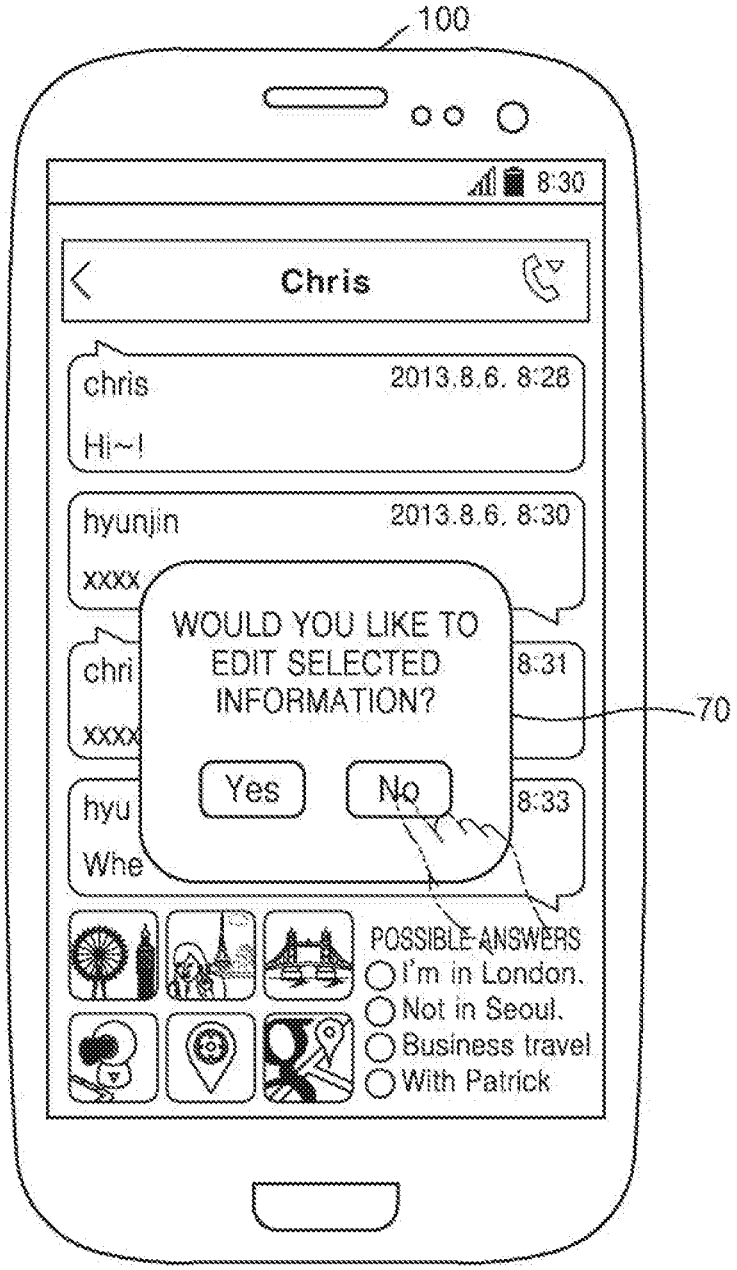

Referring to FIG. 22A, the electronic device 100 may request the user to identify whether to edit the content, via a pop-up window 70. For example, when the user wants to use the content provided by the application without an additional edit thereof, the user may select a response indicating no edit of the content.

Figure 22B:
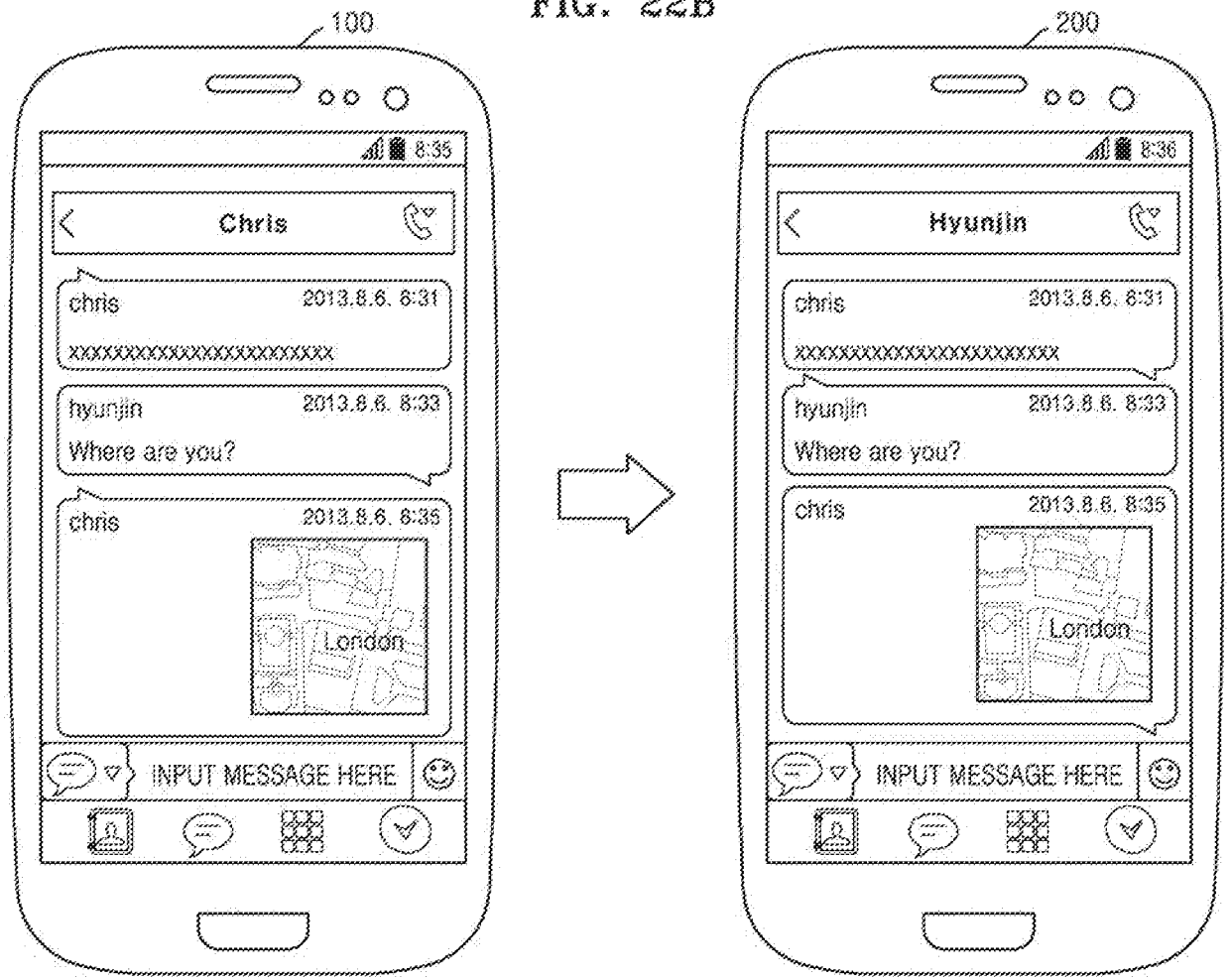

Referring to FIG. 22B, when the electronic device 100 identifies that the user does not want to edit the selected content, the electronic device 100 may provide a screen indicating a current location of the user in the map application selected in FIG. 21 to the device of another user 200 via a message, without an additional edit of the screen.

Figure 23A:
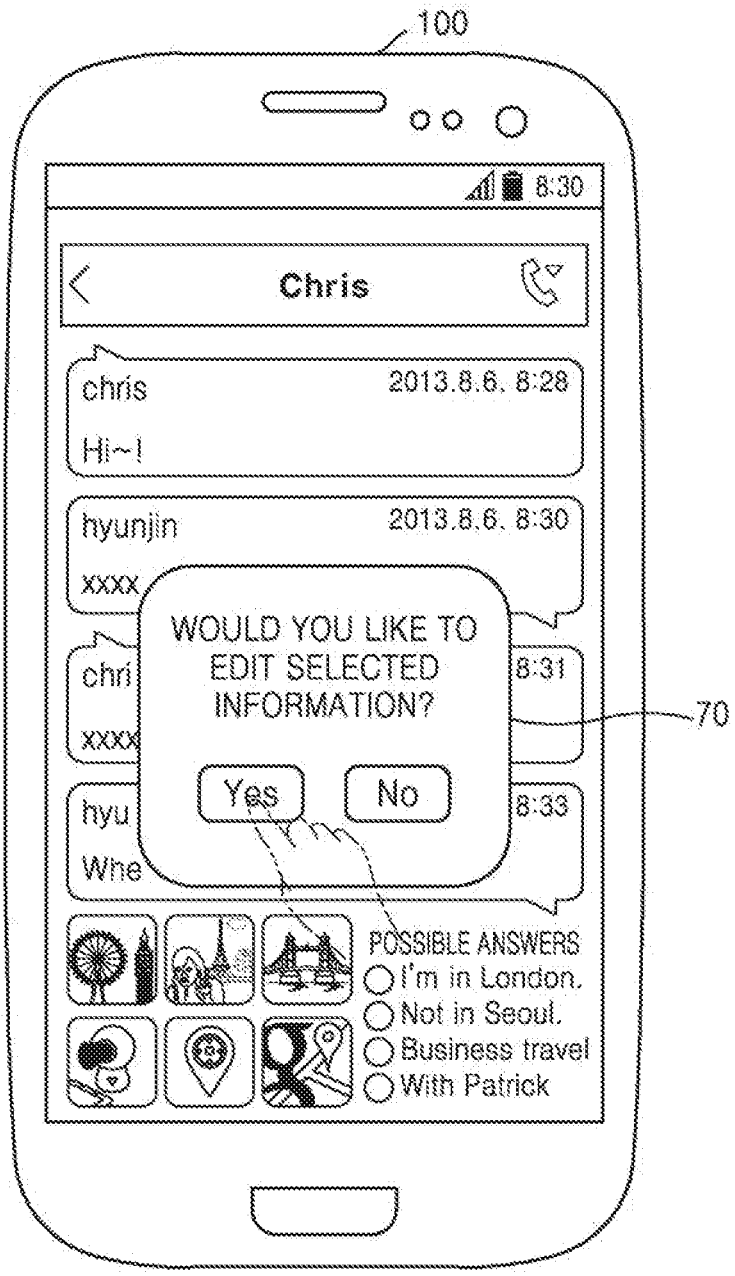

Referring to FIG. 23A, the electronic device 100 may request the user to identify whether to edit the content, via the pop-up window 70. For example, when the user wants to make a response by editing the content provided by the application, the user may select a response indicating an edit of the content.

Figure 23B:
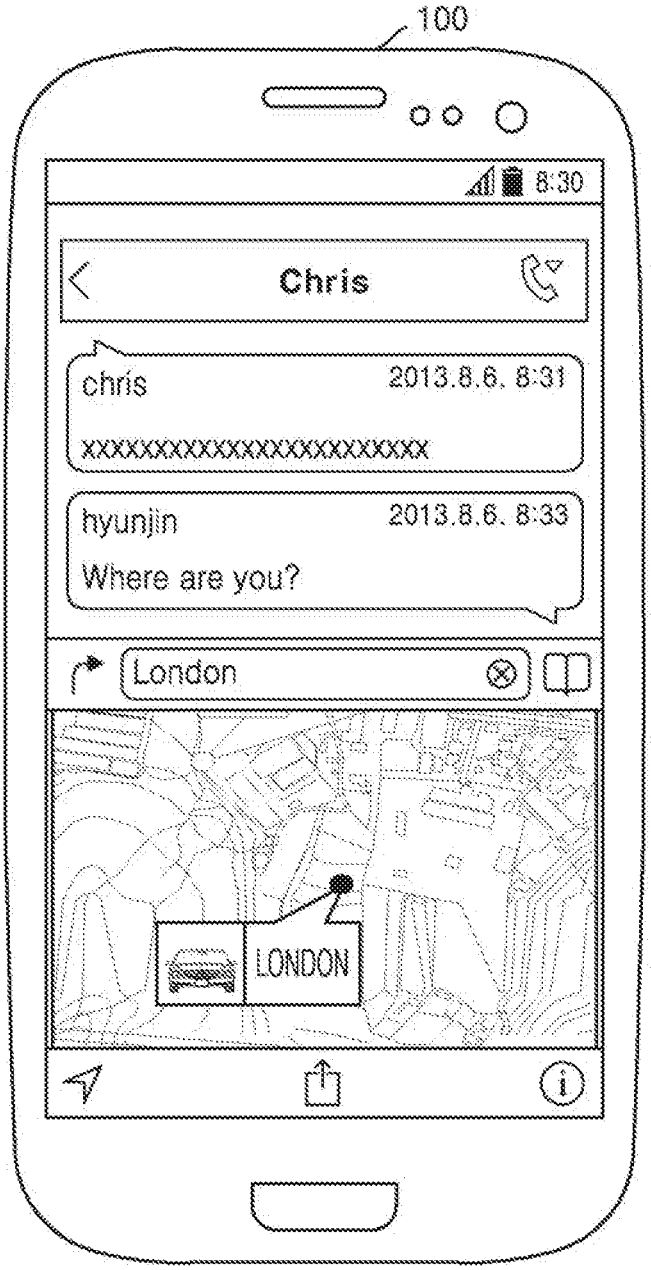

Referring to FIG. 23B, when the electronic device 100 identifies that the user wants to edit the selected content, the electronic device 100 may search the current location of the user in the map application selected in FIG. 21 for the user to edit a screen indicating the current location of the user, and may display a screen corresponding to a search result.

Figure 23C:
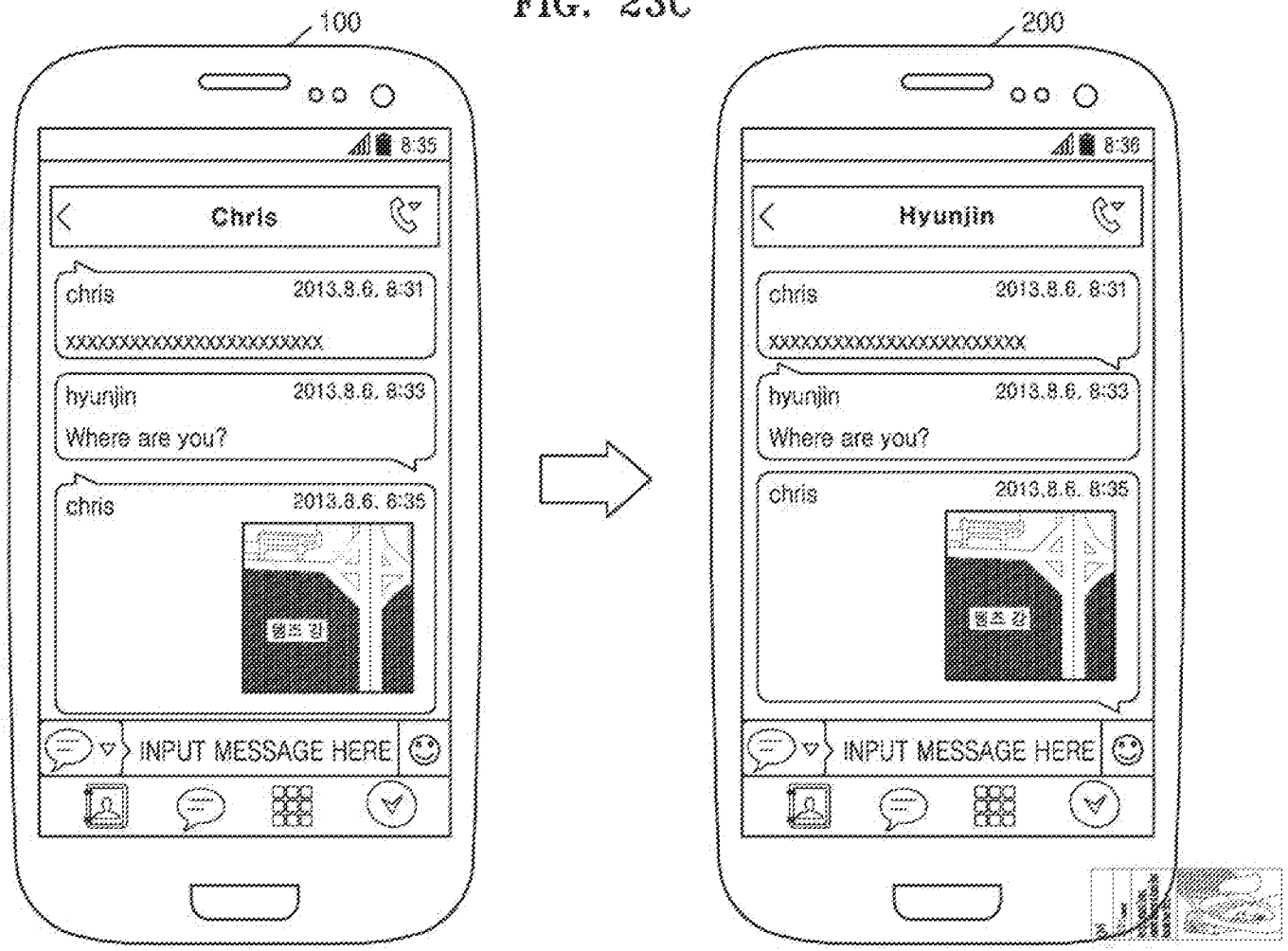

Referring to FIG. 23C, the electronic device 100 may transmit a screen which is the result of editing the search result provided by the map application, via the user, to the device of another user 200, via a message.

3.4. Feedback Situation

FIGS. 24A through 24E are views of a user interface via which a user feedback is received with respect to the provision of content which may be used in responses, according to an exemplary embodiment.

Figure 24A:
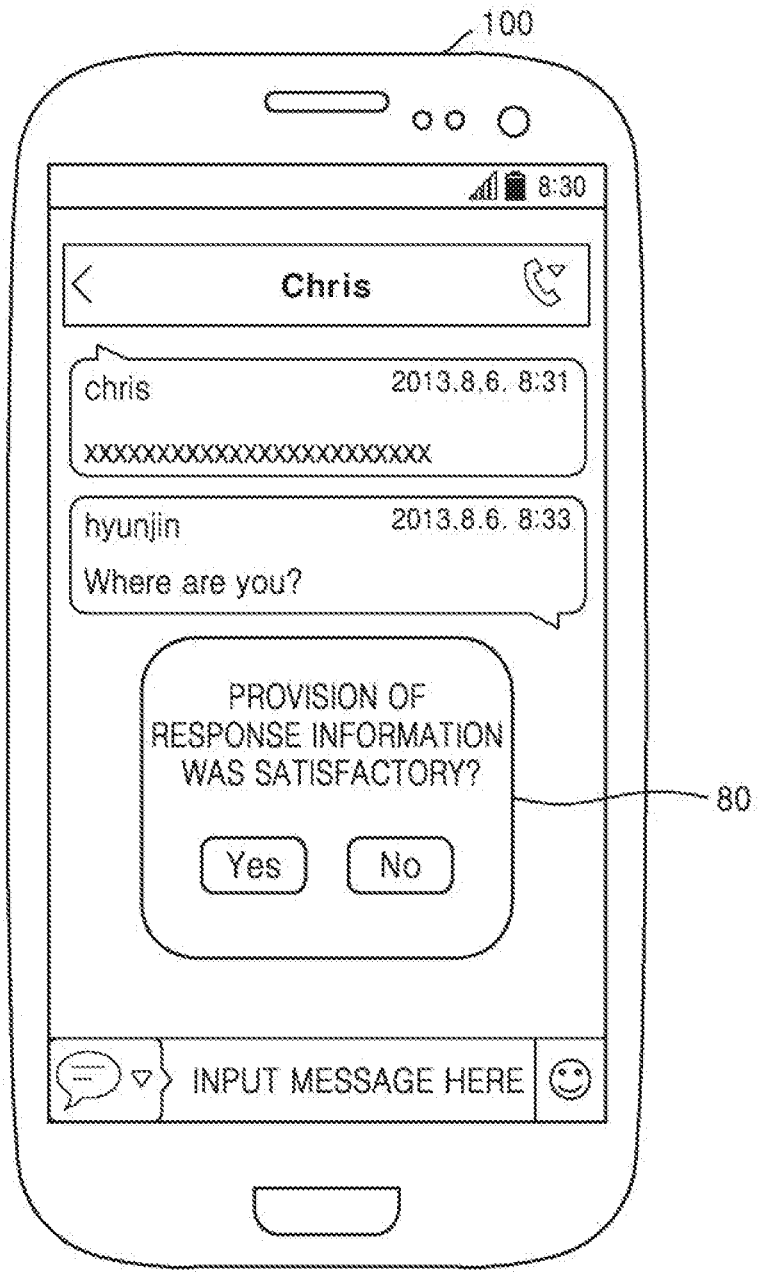

Referring to FIG. 24A, the electronic device 100 may ask the user whether the user is satisfied with the providing of the content which may be used in responses, via a pop-up window 80.

Figure 24B:
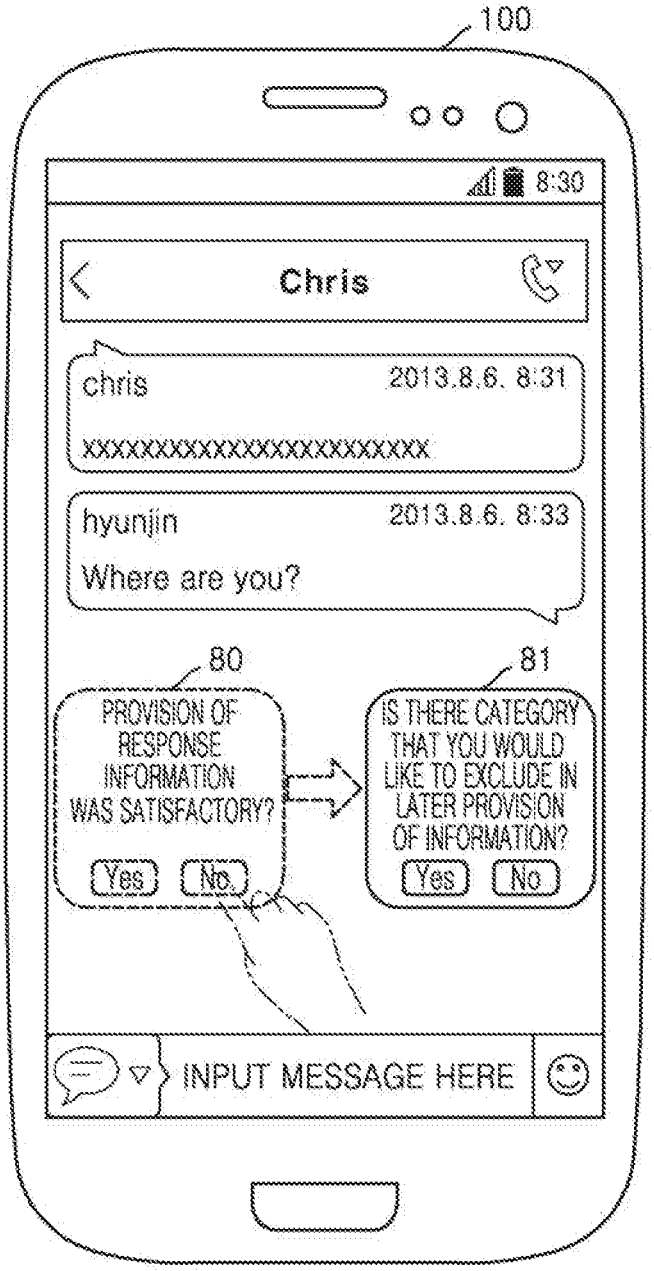
Figure 24C:
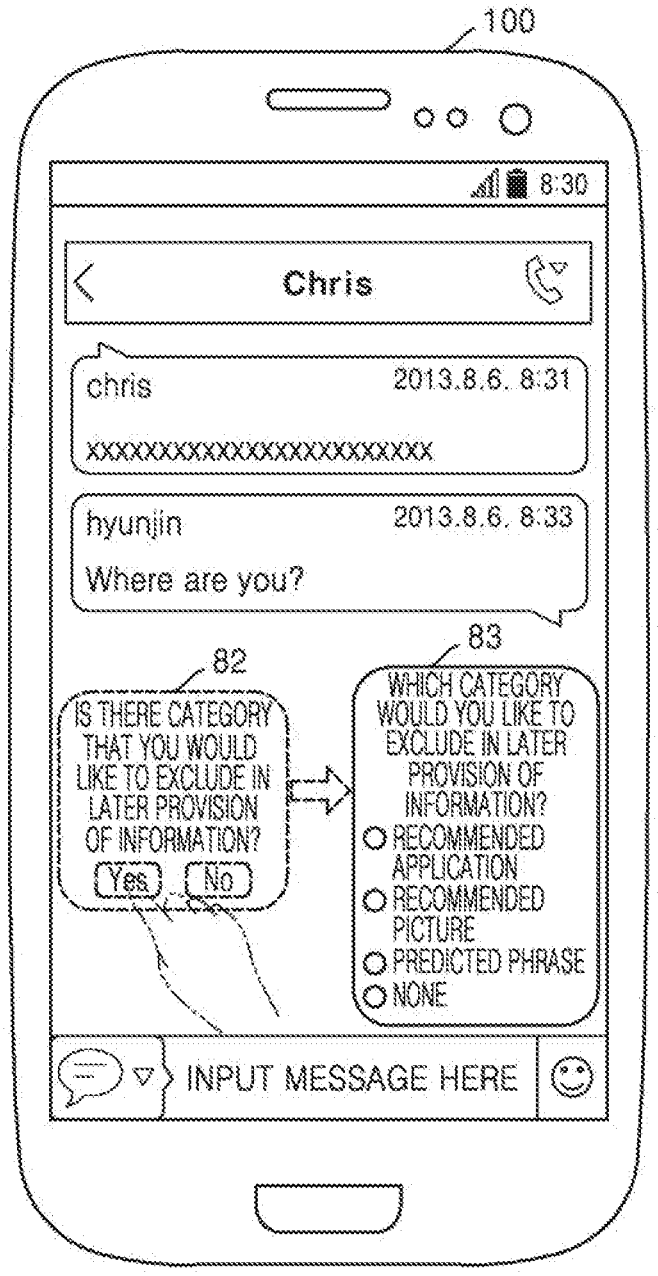
Figure 24D:
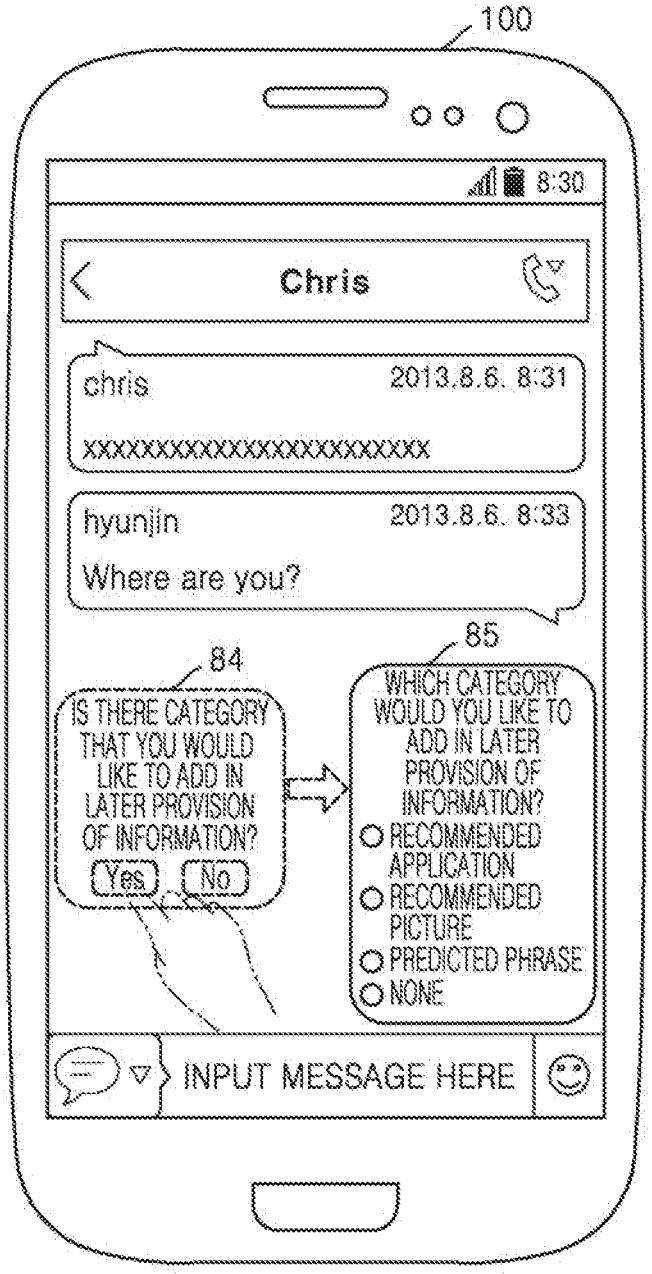

Referring to FIGS. 24B through 24D, when the user has answered via the pop-up window 80 that the user was not satisfied with the providing of the content, the electronic device 100 may provide pop-up windows 81, 82, 83, 84, and 85 via which the user may select categories which the user wants to add or exclude for the later providing of the content which may be used in responses.

Figure 24E:
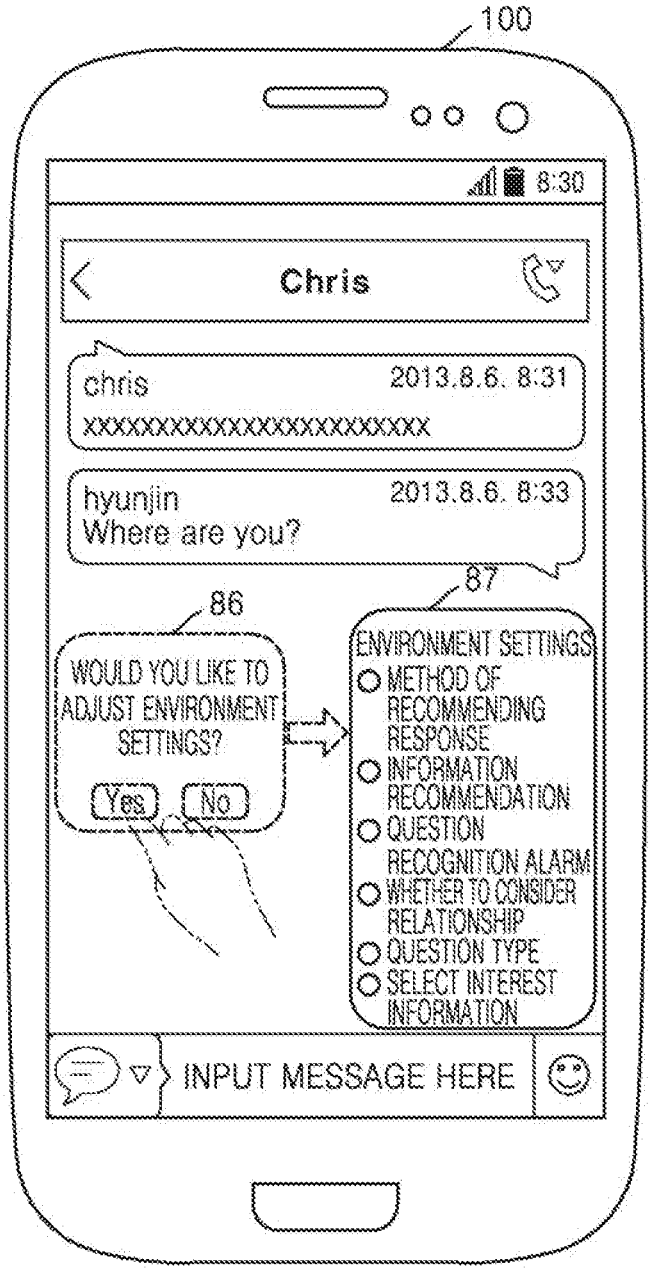

Referring to FIG. 24E, when the user has answered via the pop-up window 80 that the user was not satisfied with the providing of the content, the electronic device 100 may provide pop-up windows 86 and 87 via which the user may select an environment setting which the user wants to adjust with respect to the later providing of the content which may be used in responses.

According to another exemplary embodiment, the electronic device 100 may determine user's category preference without using the survey pop-up windows 81, 82, 83, 53, and 85, To this end, the electronic device 100 may automatically store category information of content selected by the user every time a selection is made, and count the number of times that each category is selected. Recommended response may be displayed in the order of category preference.

3.5. Layout of the Proposed Response

FIGS. 25A through 25E are views of a content providing screen, when content which may be used in responses is provided, according to an exemplary embodiment.

Figure 25A:
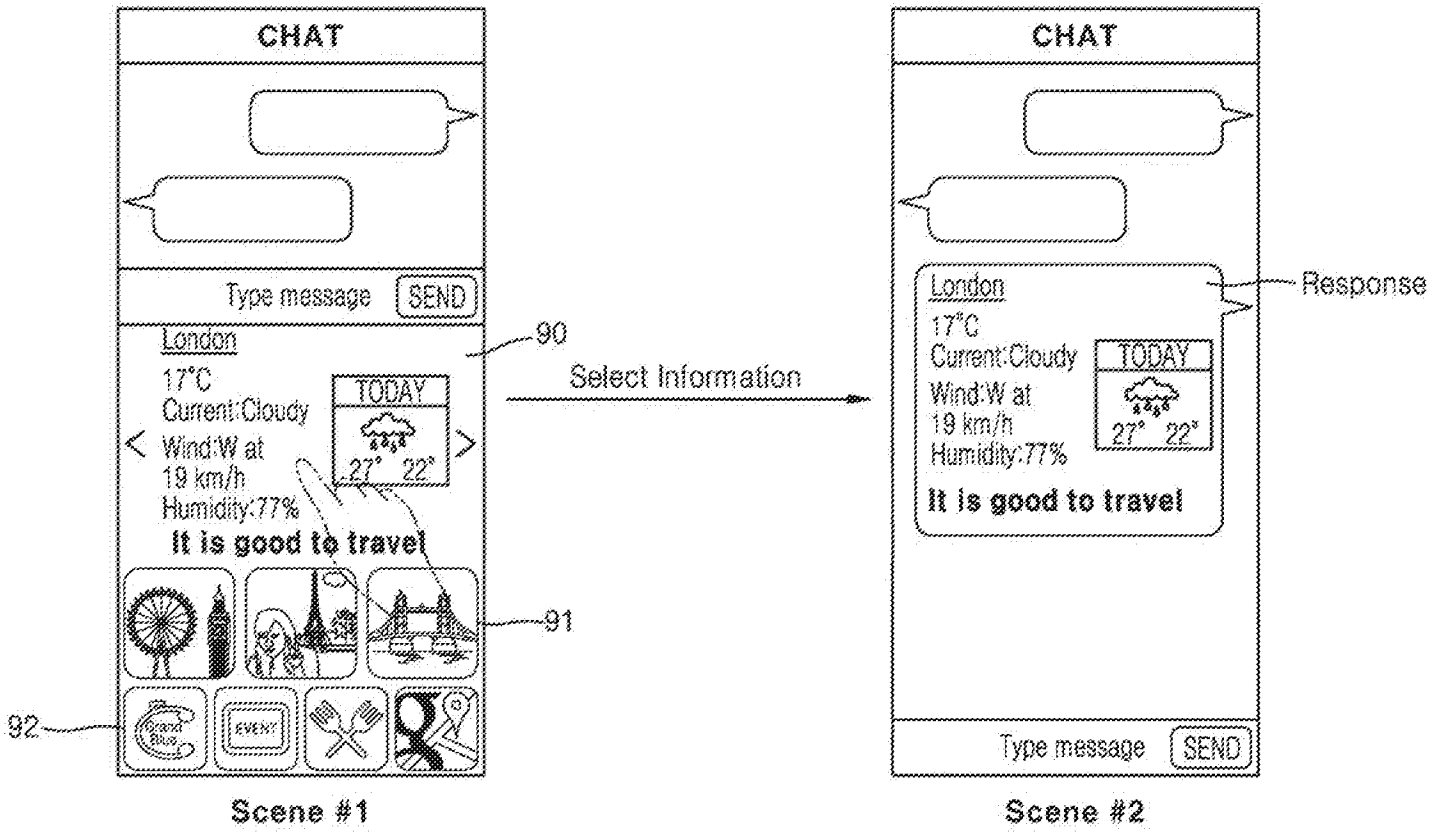
FIGS. 25A through 25E are views of content providing screens, when content which may be used for a response is provided, according to an exemplary embodiment.

Referring to FIG. 25A, the electronic device 100 may provide the content by a screen division method. The electronic device 100 may display a recommended content list 90, a recommended content list 91, and a recommended application list 92. For example, when a user touches the recommended content list 90 in a first scene Scene #1, the electronic device 100 is transformed into a second scene Scene #2 to transmit the recommended content list 90 to a device of another user. For example, the electronic device 100 may transmit the recommended content list 90 to the device of another user via a message.

Figure 25B:
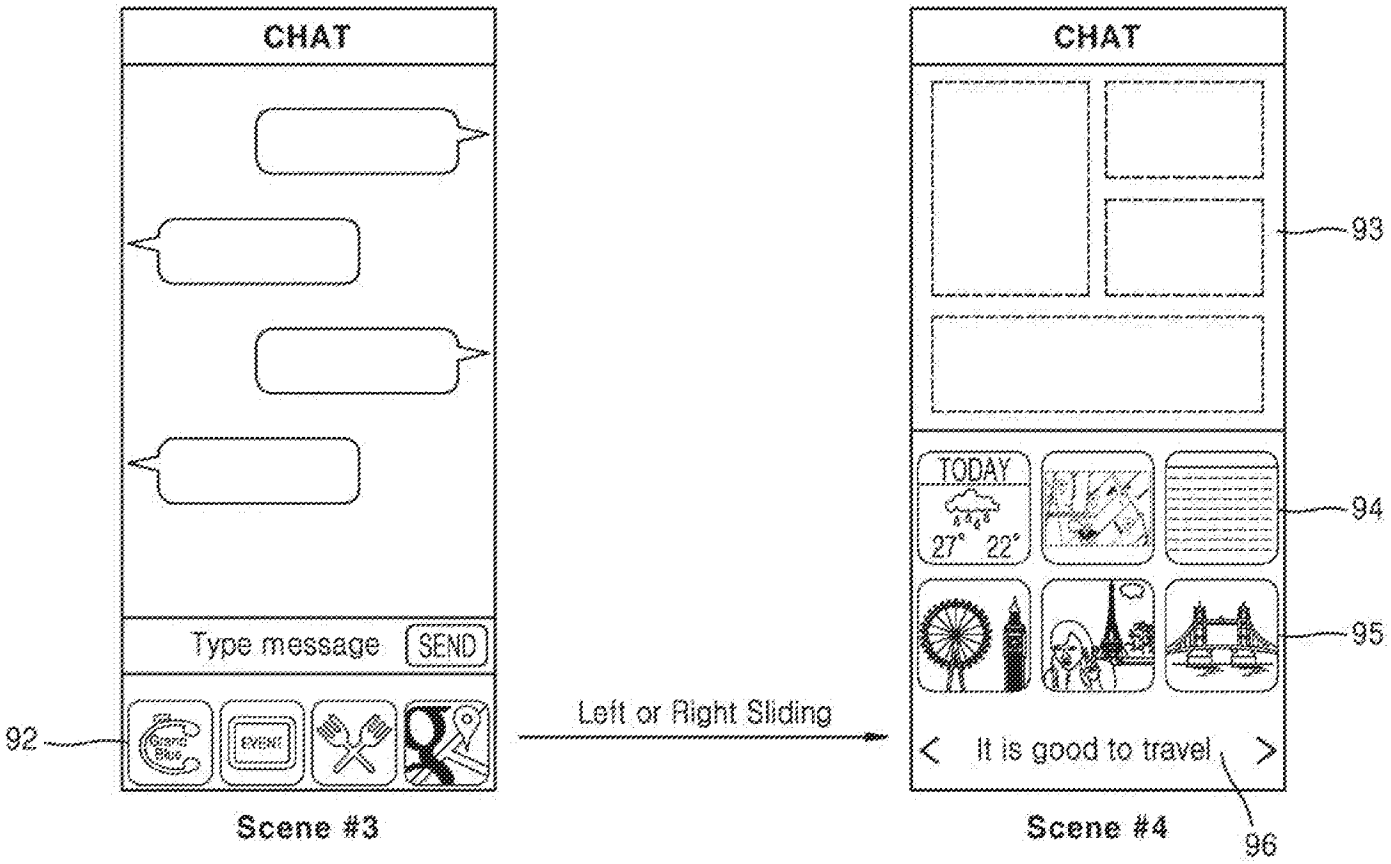

Referring to FIG. 25B, the electronic device 100 may provide the content by a screen transformation method. The electronic device 100 may display summarized response related content 92 in a third scene Scene #3, and may display specific response related content 93, 94, and 95 in a fourth scene Scene #4. The electronic device 100 may display the fourth scene Scene #4 when the user touches or taps the third scene Scene #3.

Figure 25C:
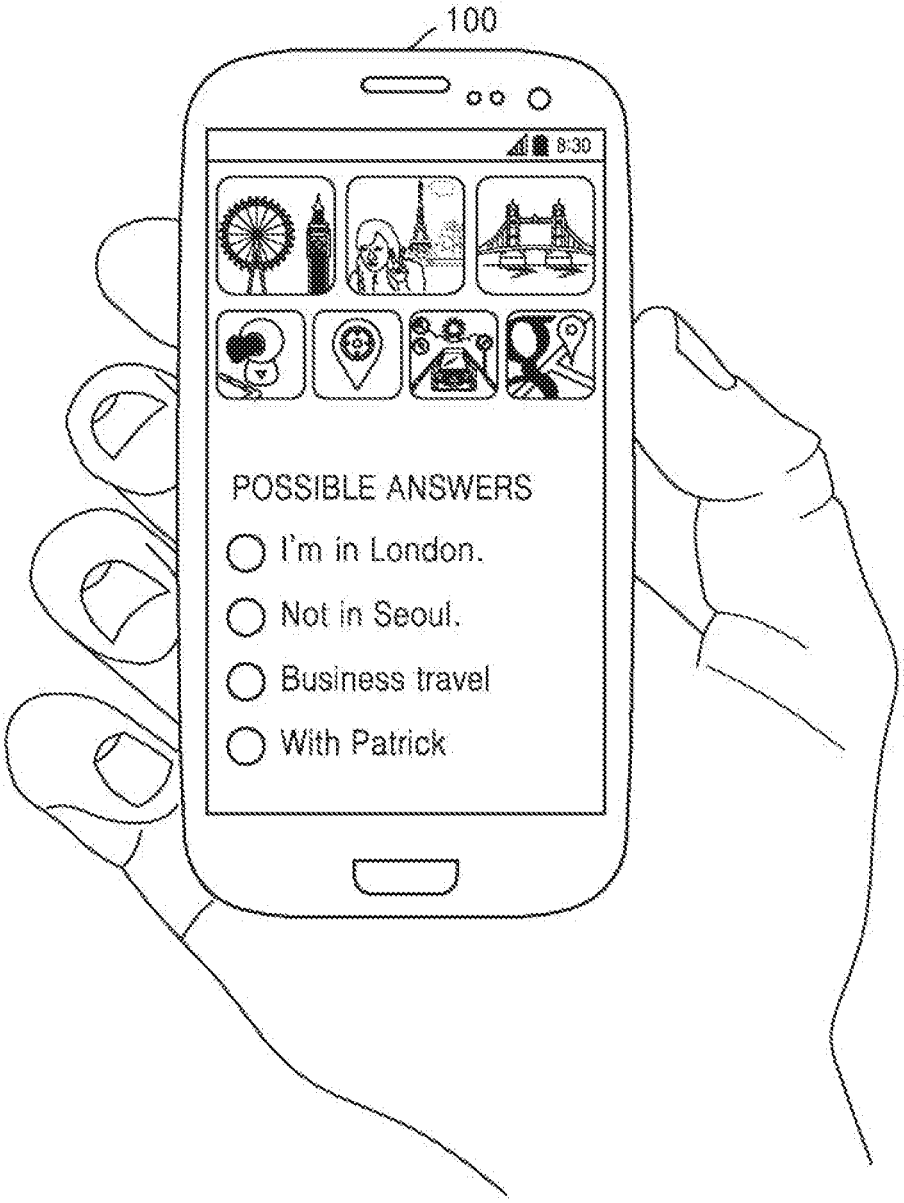

Referring to FIG. 25C, the electronic device 100 may display an image, an application, or a direct possible response. The electronic device 100 may display the content which may be used in responses by one or more methods and arrangements.

Figure 25D:
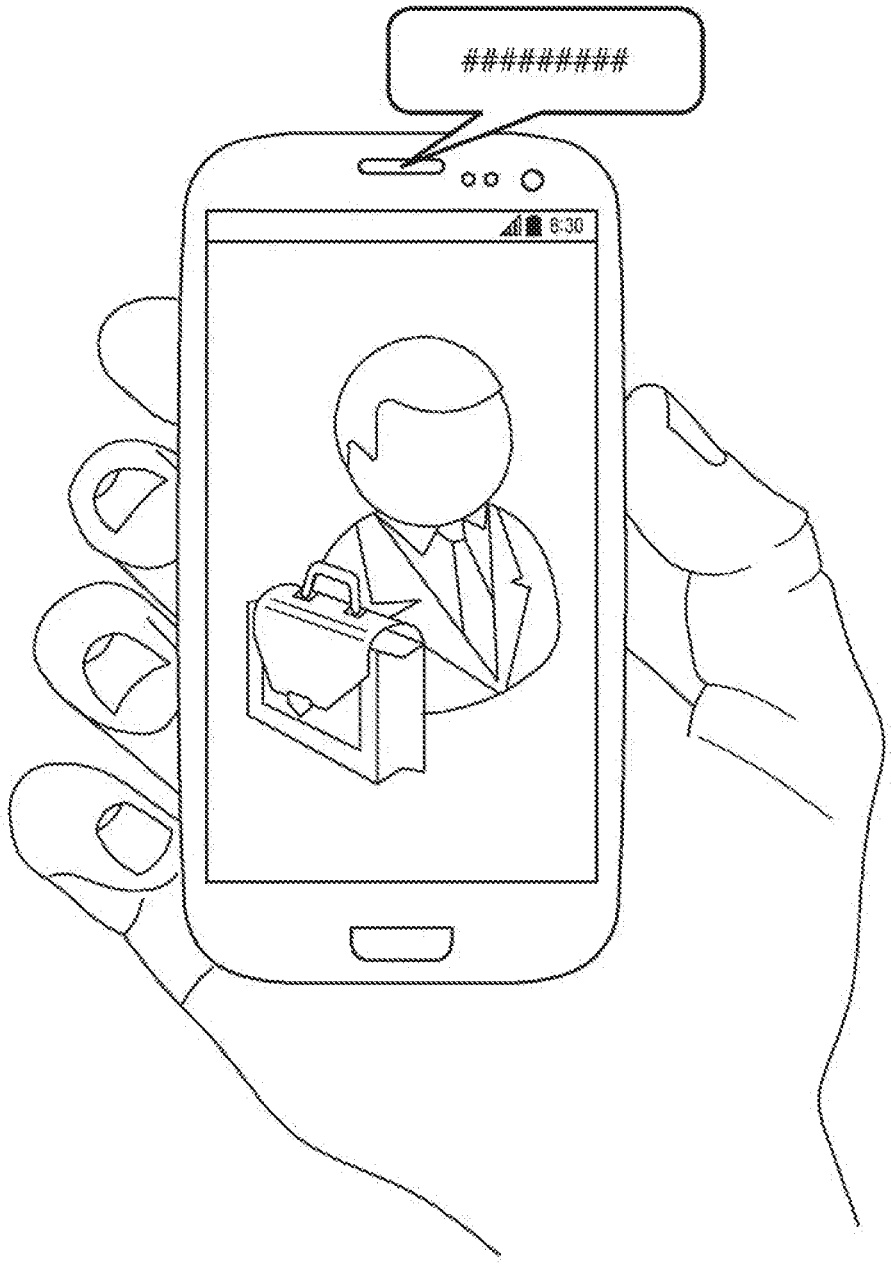

Referring to FIG. 25D, the electronic device 100 may provide the content which may be used in responses via a voice of an avatar.

Figure 25E:
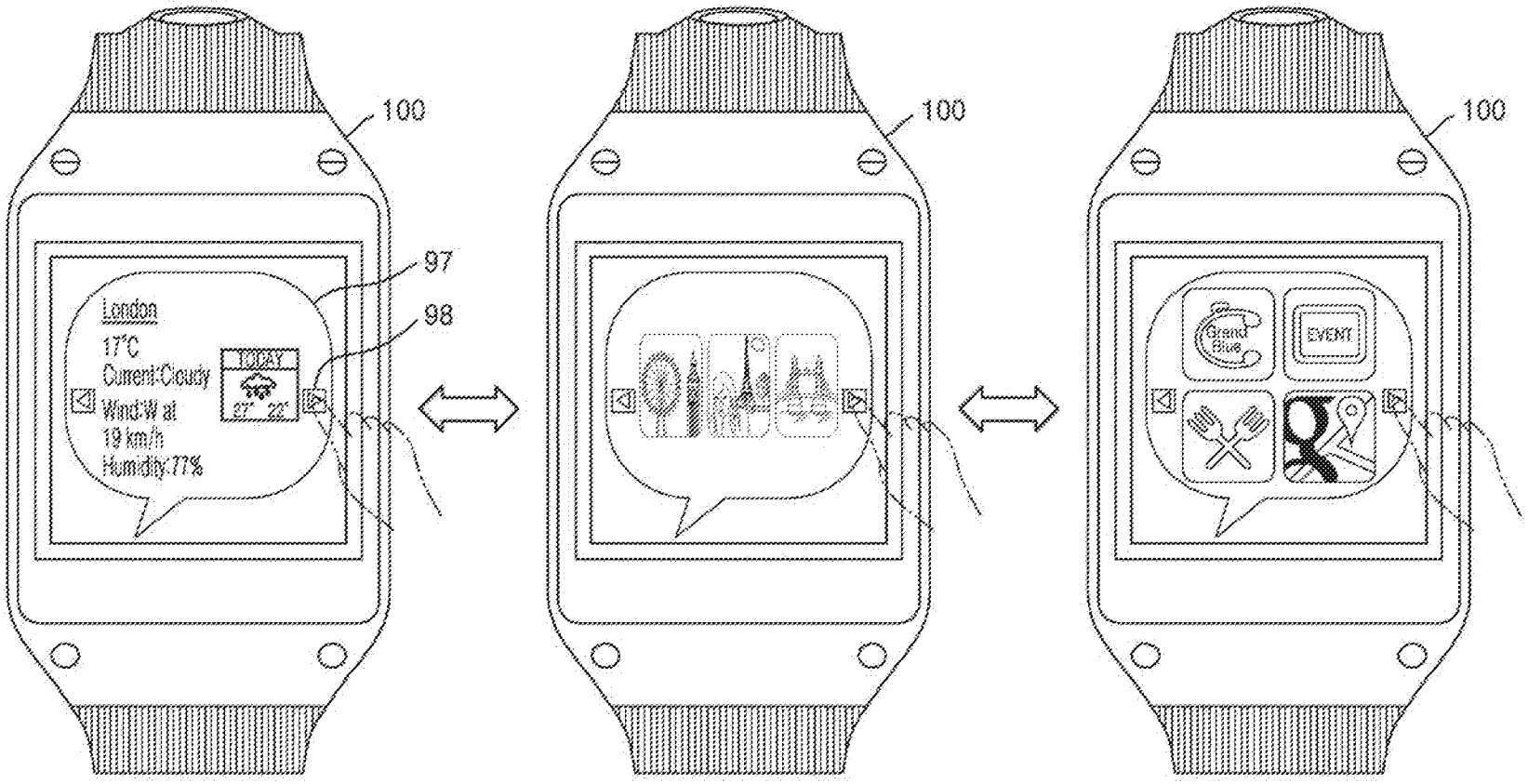

Referring to FIG. 25E, when the electronic device 100 is a smart watch, the electronic device 100 may provide the recommended content via a summary screen 97. When a user touches or taps a move button 98, the electronic device 100 may display another summary screen.

Figure 26:
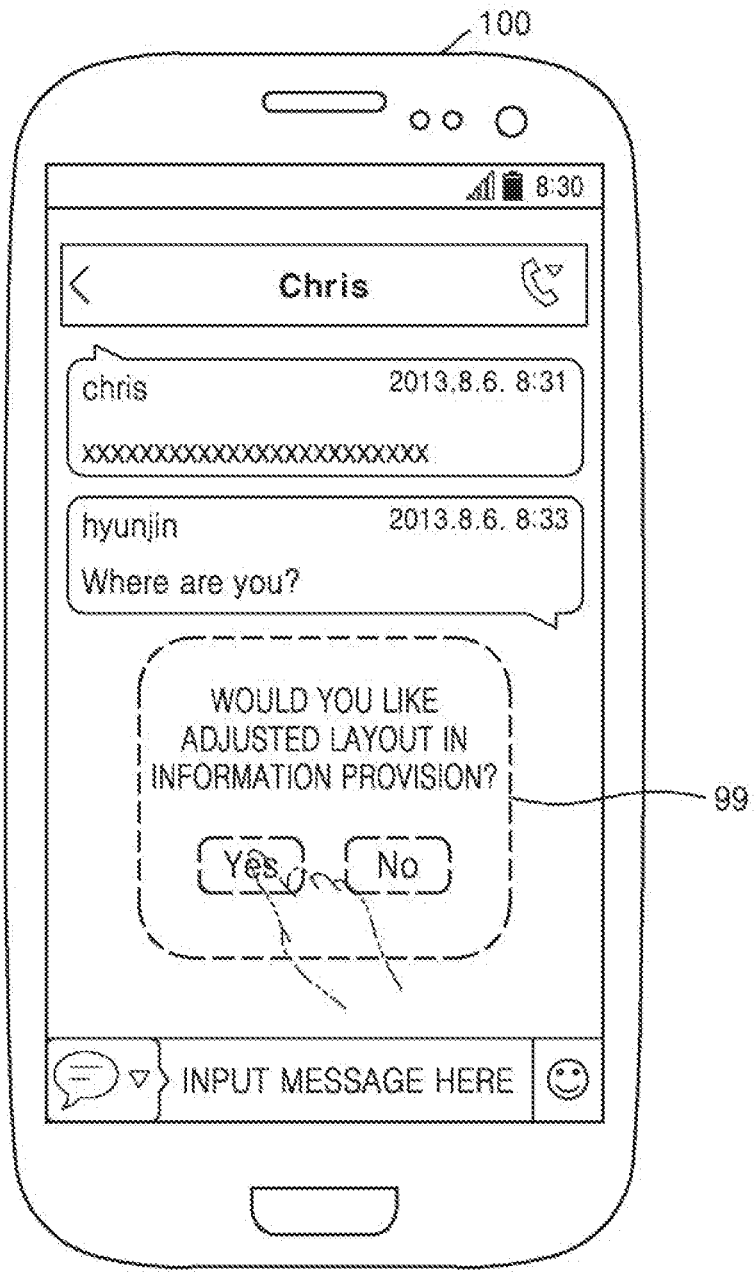
FIG. 26 is a view of an electronic device providing an interface via which a content providing layout is changed.

FIG. 26 is a view of the electronic device 100 providing an interface via which a content providing layout is adjusted.

Referring to FIG. 26, the electronic device 100 may receive a user feedback regarding whether to change a layout of the content provision, via a pop-up window 99, and may select various content providing layouts according to a selection of the user.

4. Scenario 3

4.1. Identification with Respect to Content Obtainment

FIGS. 27 through 37 are views for describing a method of providing content according to an exemplary embodiment. FIGS. 27 through 37 are views of a user interface according to operations of a scenario in which the electronic device 100 provides a voice chatting service, and provides an image, a recommended application, and a direct response, to a user, as the response related content.

Figure 27:
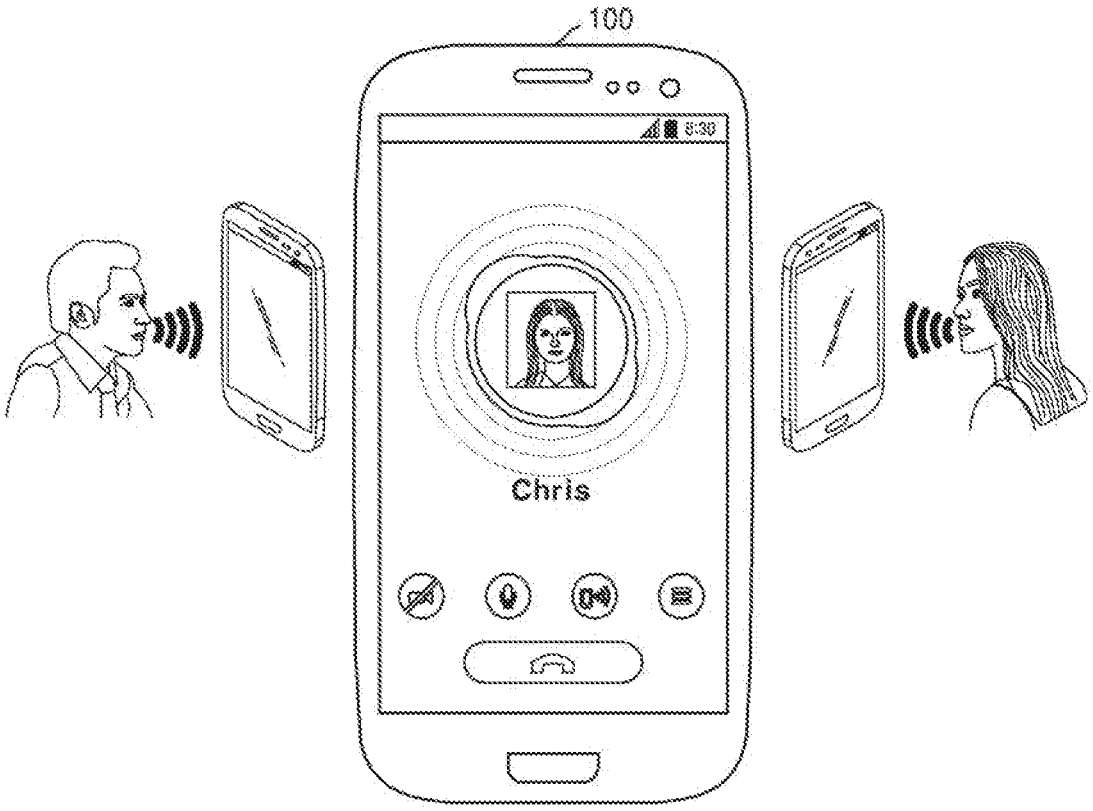
FIGS. 27 through 37 are views for describing a method of providing content according to an exemplary embodiment.

Referring to FIG. 27, Chris, the user of the electronic device 100, is performing a voice chatting with Hyunjin, the user of the device of another user 200. The electronic device 100 and the device of another user 200 may divide the conversation in a message unit.

Figure 28:
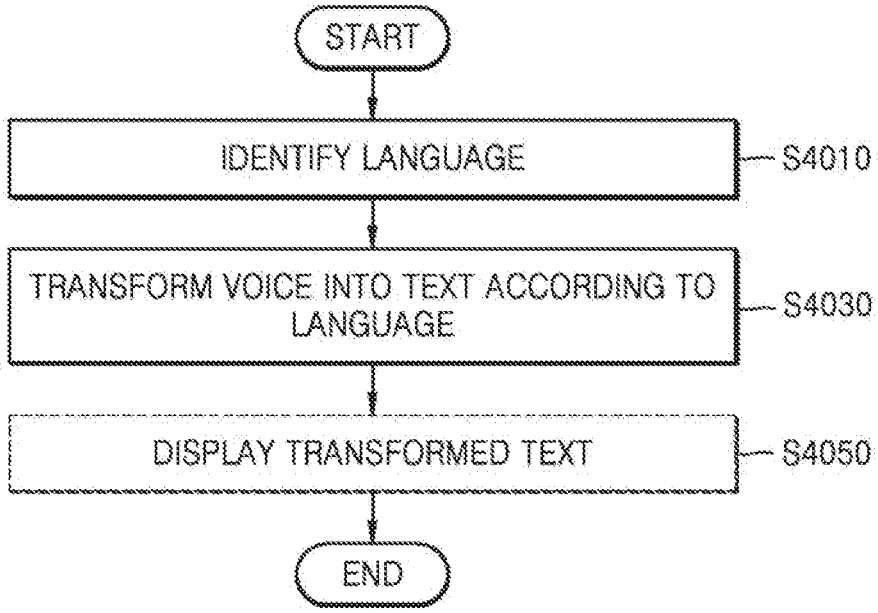

Referring to FIG. 28, the electronic device 100 may receive each of voice messages and perform a speech to text (STT) transformation with respect to the message according to illustrated orders.

The electronic device 100 may identify which language each voice message is formed of in operation S4010. For example, the electronic device 100 may identify whether each voice message is formed of the English language or the Korean language.

The electronic device 100 may transform each voice message into a text of the identified language in operation S4030. For example, when the electronic device 100 determines that a first voice message is formed of the English language, the electronic device 100 may transform the first voice message into an English text.

The electronic device 100 may display the transformed text in operation S4050. For example, the electronic device 100 may transform the first voice message into the English text and may display the English text via a display unit (or an output interface).

Figure 29:
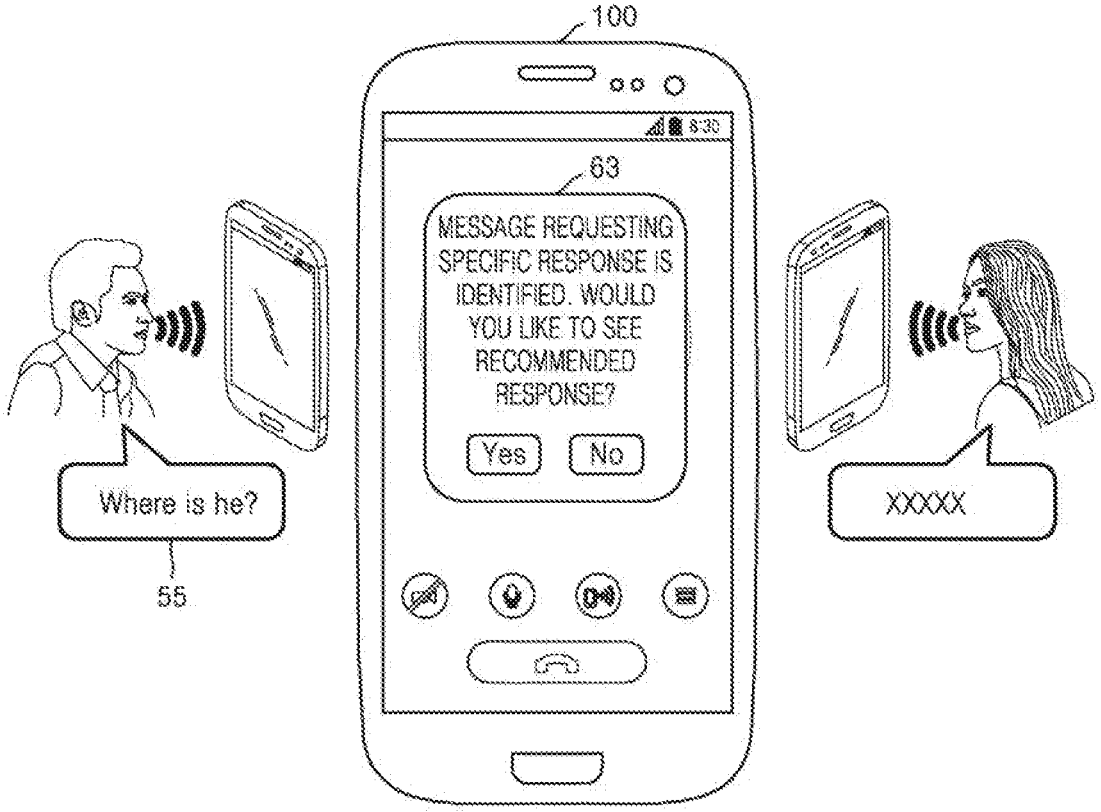

Referring to FIG. 29, the electronic device of Chris receives the message 55 "Where is he?" from the electronic device of Hyunjin. The electronic device 100 may determine whether each of messages is a question. For example, the electronic device 100 may determine whether the message 55 is a question. The electronic device 100 may determine who "he" included in the message 55 "Where is he?" refers to, by performing a natural language analysis.

4.2. User Input Reception

Figure 30:
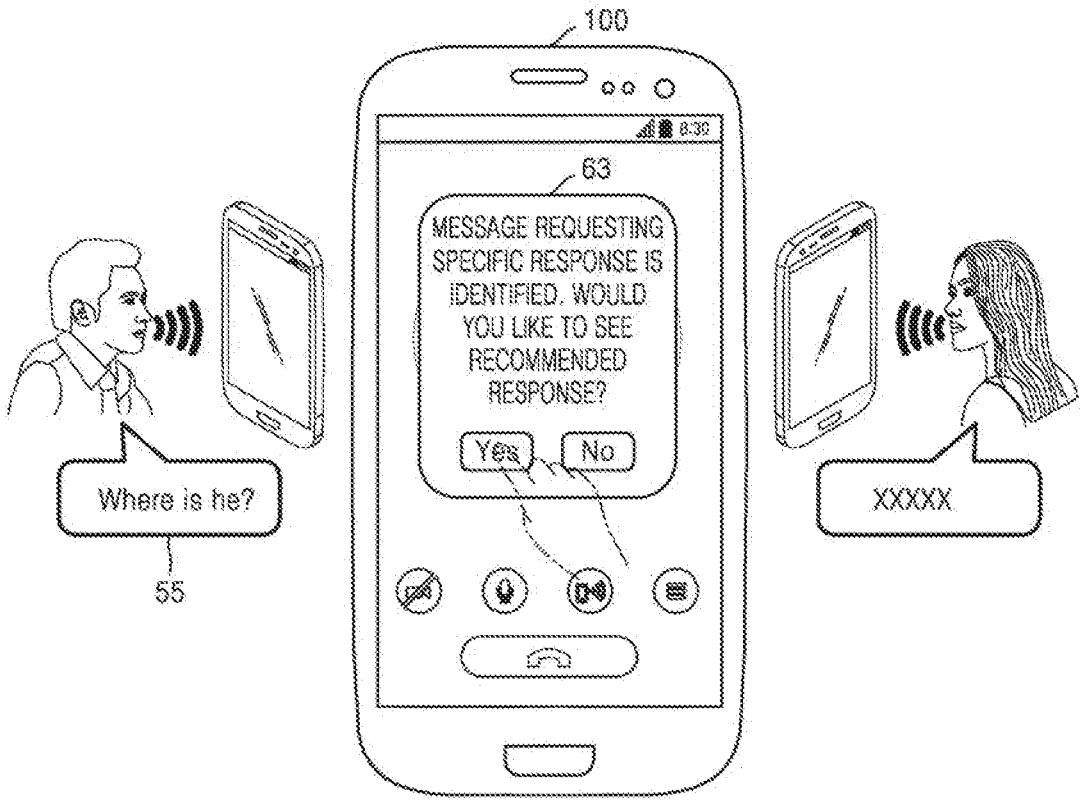

Referring to FIG. 30, when the electronic device 100 determines that the message includes a question, the electronic device 100 may receive a user input indicating whether the user needs a recommended response.

For example, when the electronic device 100 determines that the message 55 "Where is he?" is a question, the electronic device 100 may check whether the user needs a recommended response, via the pop-up window 63, as illustrated in FIG. 30. When the user touches a "Yes" button indicating that the user wants to receive content which may be used in responses, in correspondence to the pop-up window 63, the electronic device 100 may display various types of obtained content. Alternatively, the electronic device 100 may omit to display the pop-up window 63 according to a user setting, and may provide a recommended response once the message 55 is determined as an inquiry message.

4.3. Specific Proposal Situations

Figure 31:
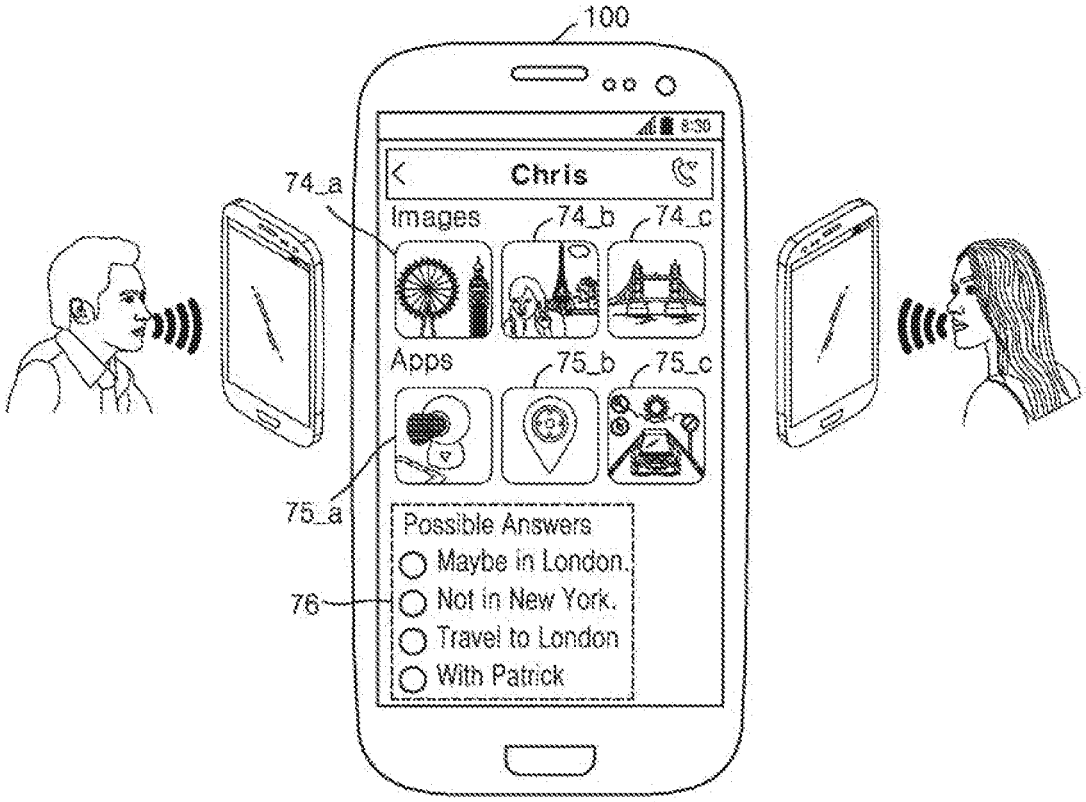

Referring to FIG. 31, the electronic device 100 may provide images 74_a, 74_b, and 74_c, applications 75_a, 75_b, and 75_c, and a possible direct answer 76.

Figure 32:
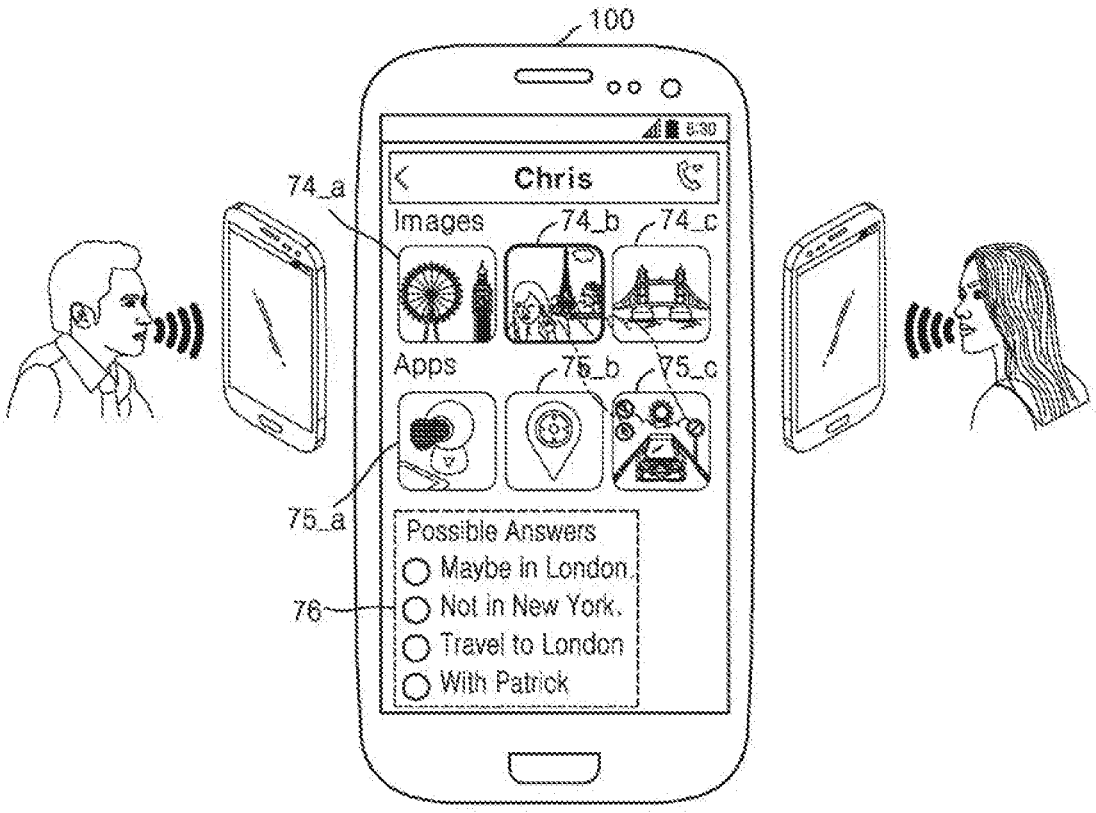

Referring to FIG. 32, the user may select the image 74_b from among the content which may be used in responses. The electronic device 100 may receive a user input. For example, the user input may be a touch input selecting the image 74_b.

Figure 33:
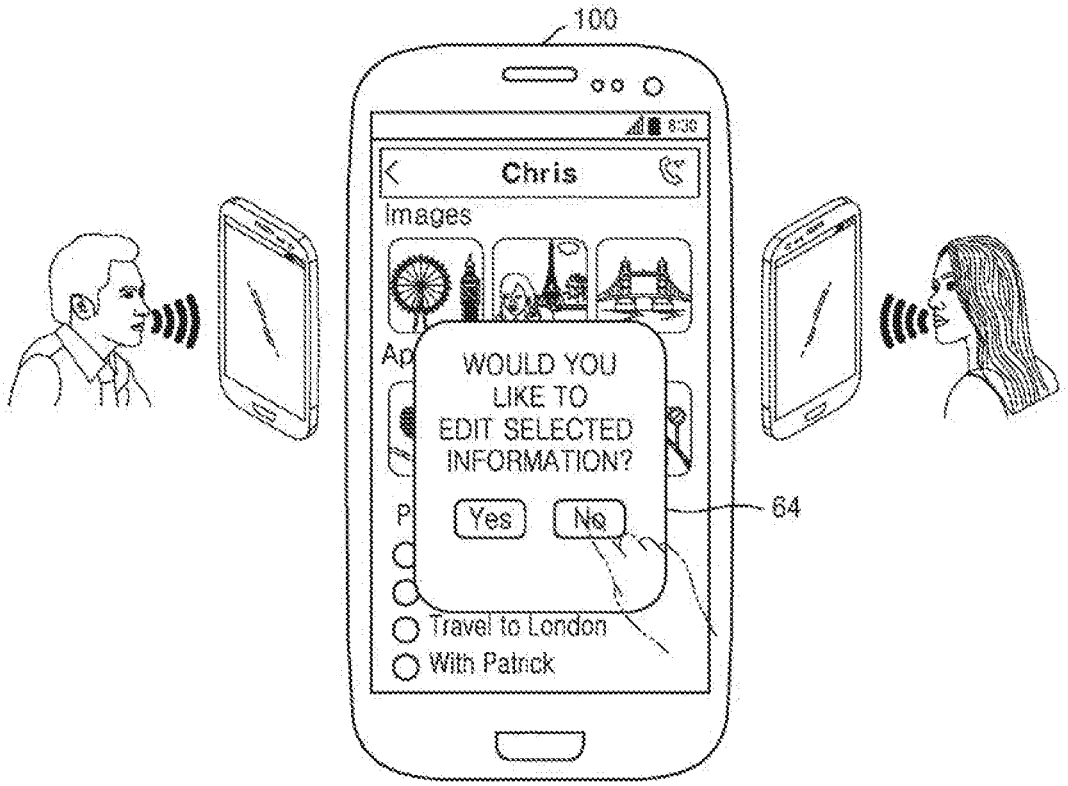

Referring to FIG. 33, the electronic device 100 may identify whether to edit the selected content, via the pop-up window 64. The user may touch a "No" button indicating that the user wants to use the selected content as the response without editing the selected content, via the pop-up window 64.

Figure 34:
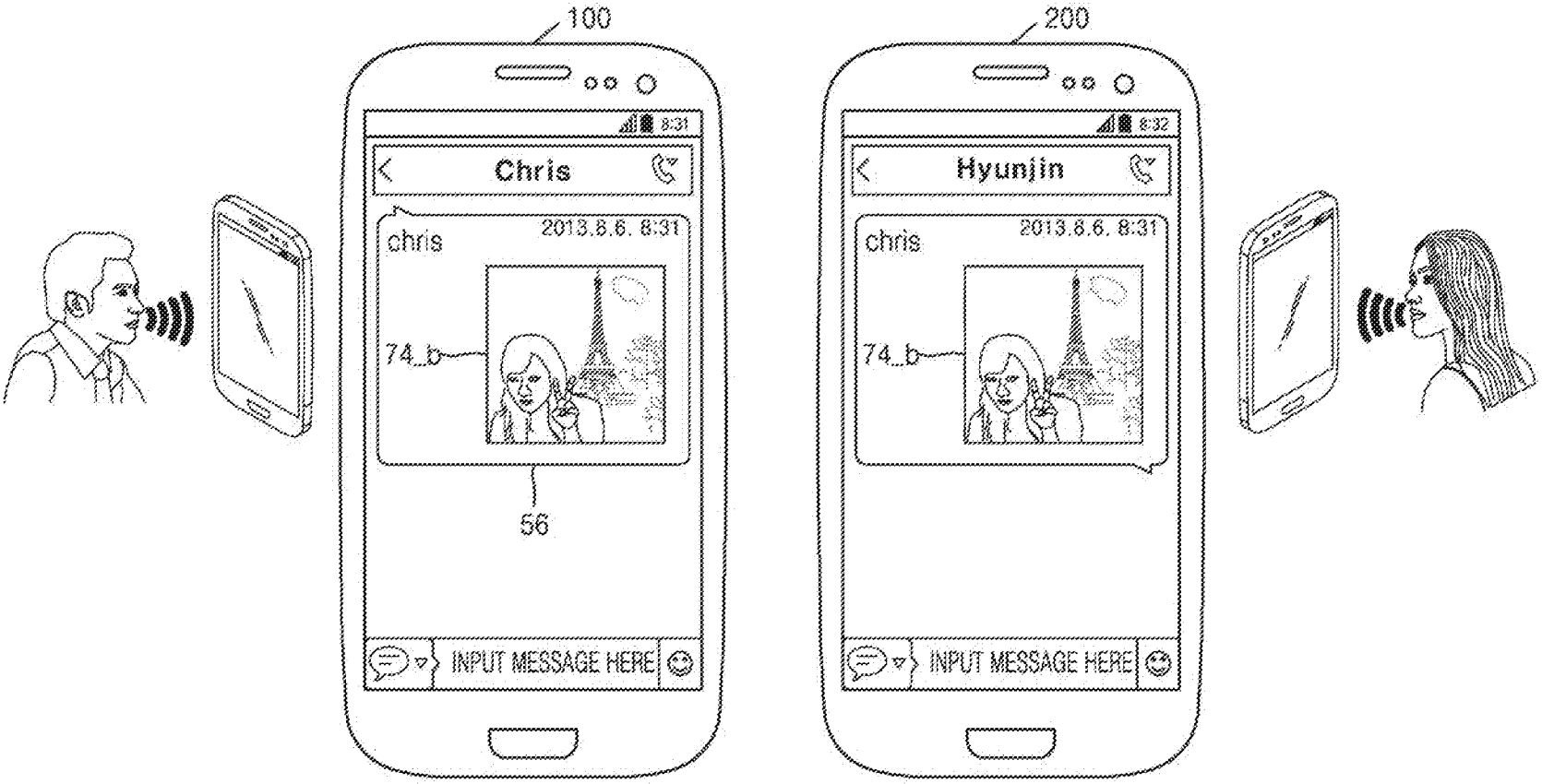

Referring to FIG. 34, when the user checks that the user wants to use the selected content without editing the content via the pop-up window 64, the electronic device 100 may transmit the image 74_b to the conversation partner, via the message 56.

Figure 35:
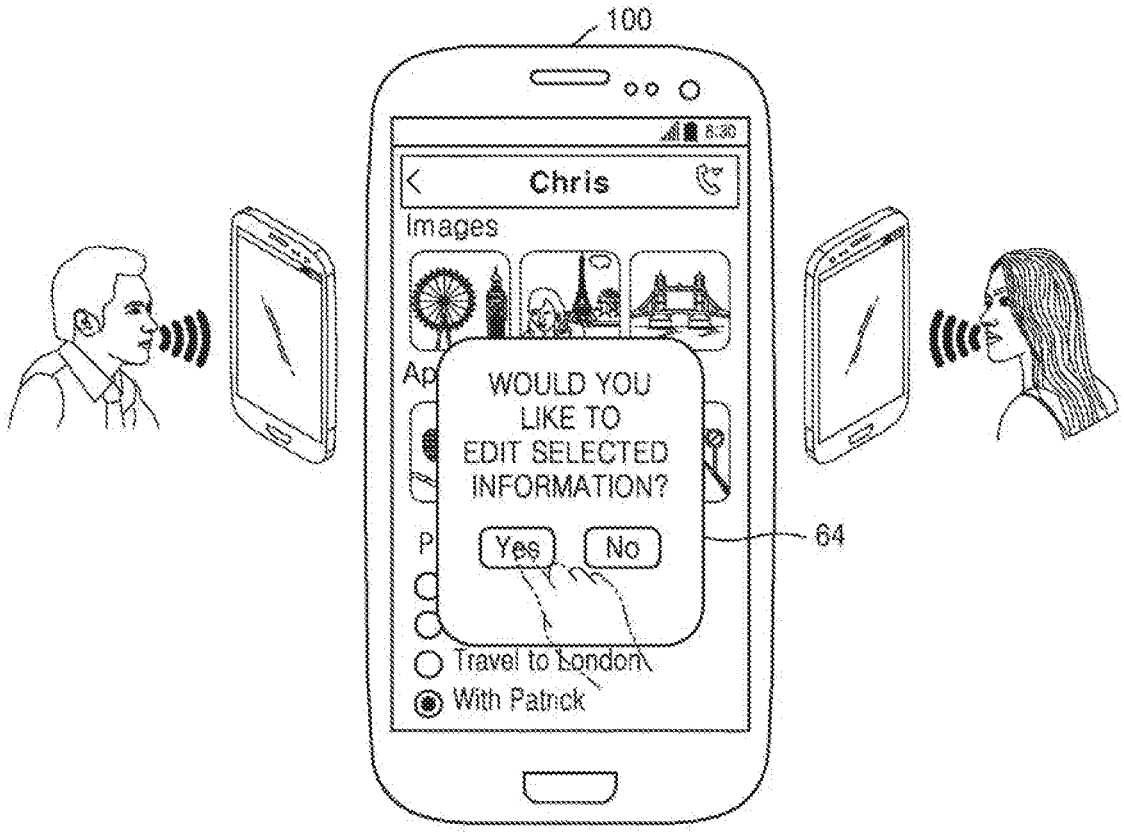

Referring to FIG. 35, the electronic device 100 may identify whether to edit the selected content via the pop-up window 64. The user may touch a "Yes" button indicating that the user wants to use the selected content as the response by editing the content, via the pop-up window 64.

Figure 36:
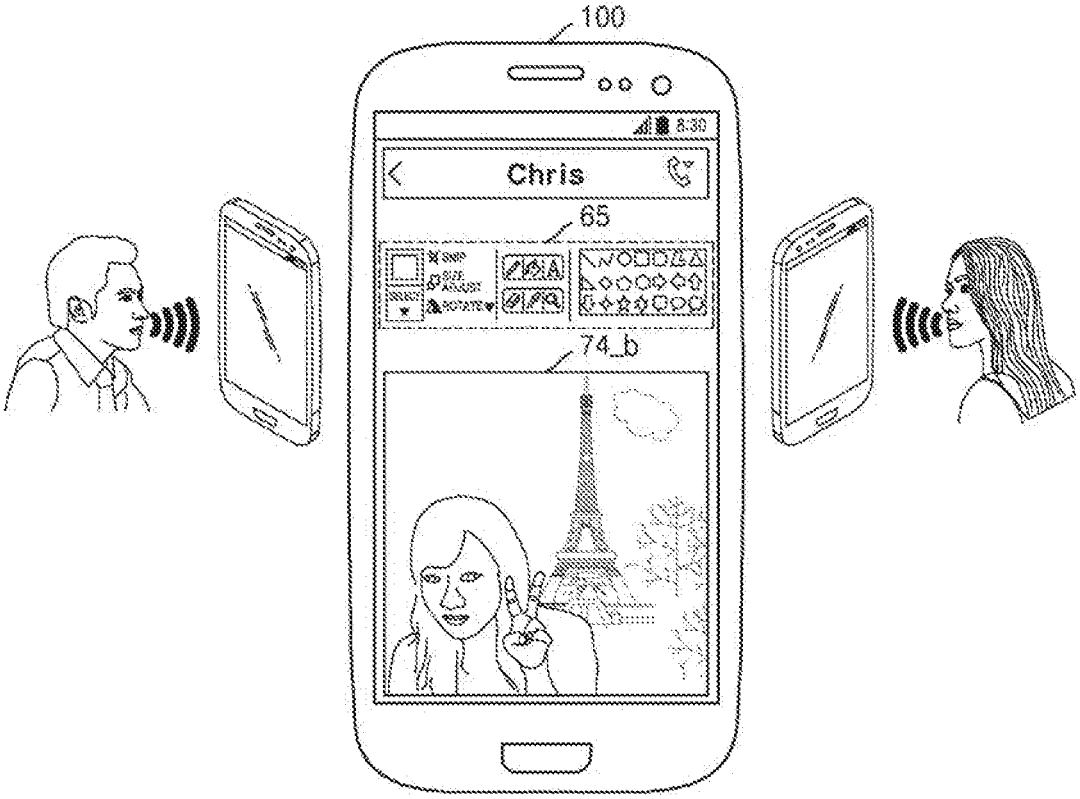

Referring to FIG. 36, when the user touches the "Yes" button indicating that the user wants to use the selected content as the response by editing the content, via the pop-up window 64, the electronic device 100 may provide the user with an image edition environment 65. The user may edit the image 74_b via the image edit environment 65.

Figure 37:
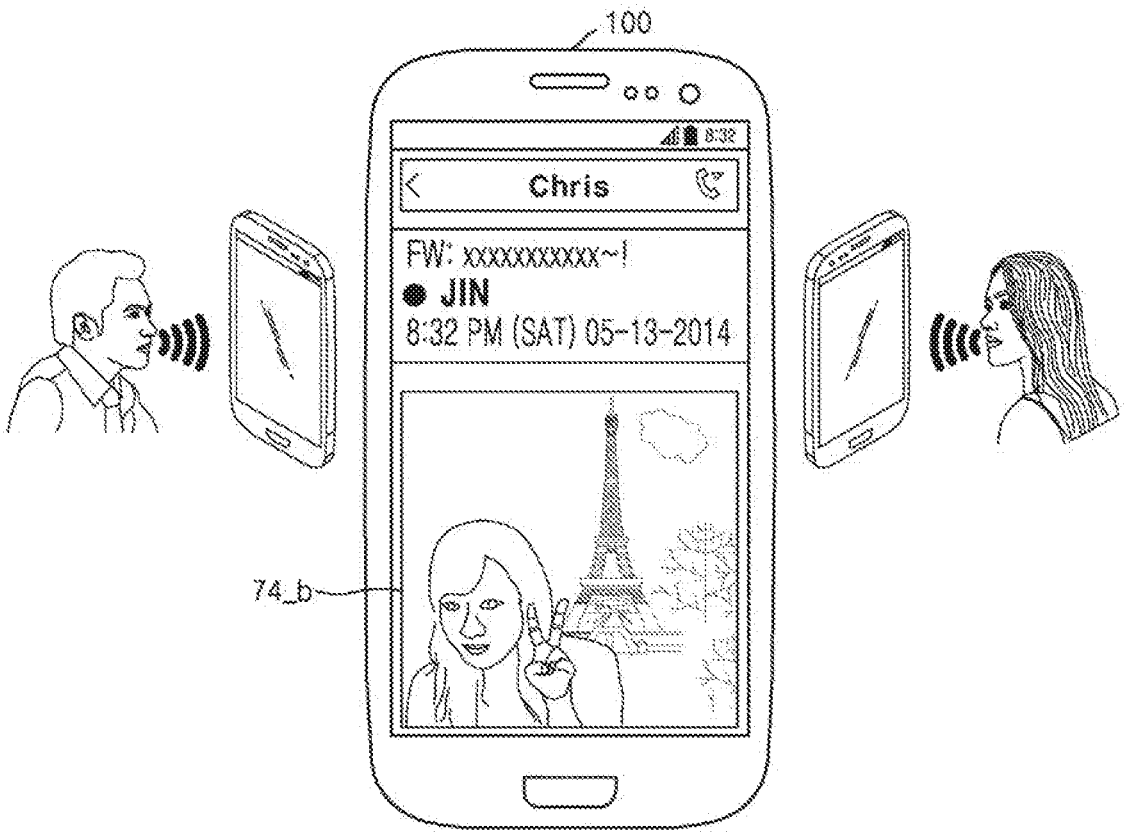

Referring to FIG. 37, when the user finishes editing the image 74_b, the electronic device 100 may provide the image 74_b to the user of the electronic device, the user of the device of another user, or a third user, via a mailing service or a social network service, according to a selection of the user of the electronic device 100. Also, the electronic device 100 may provide the image 74_b to the user of the electronic device, the user of the device of another user, or the third user, regardless of the selection of the user.

5. Scenario 4

5.1. Identification with Respect to Content Obtainment

FIGS. 38, 42, 43A, 43B, 44, 45, 46A, 46B, 47, 48, 50A through 50D, 51A through 51D, 52A through 52D, and 53A through 53C, 53D1, 53D2, 54A through 54D, 55A through 55D, and 56 are views for describing a method of providing content according to an exemplary embodiment. FIGS. 38, 42, 43A, 43B, 44, 45, 46A, 46B, 47, 48, 50A through 50D, 51A through 51D, 52A through 52D, 53A through 53C, 53D1, and 53D2, 54A through 54D, 55A through 55D, and 56 are views of a user interface according to operations of a scenario in which the electronic device 100 provides a video call service and provides to a user at least one of an image, a recommended application, and a possible direct answer, as the response related content.

Figure 38:
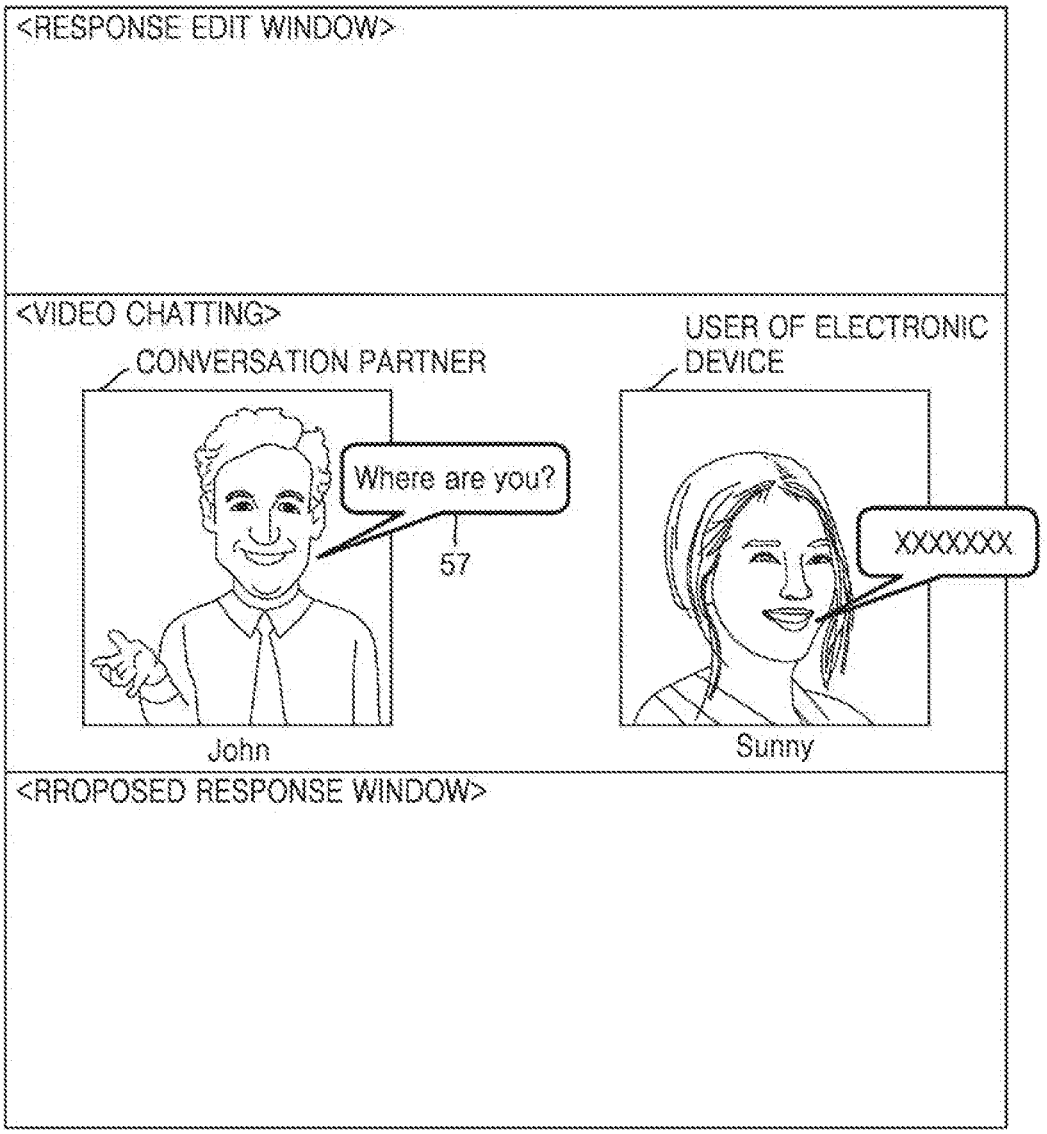
FIGS. 38 through 42, 43A, 43B, 44, 45, 46A, 46B, 47, and 48 are views for describing a method of providing content according to an exemplary embodiment.

Referring to FIG. 38, Sunny, the user of the electronic device 100, is performing the video call service with John, the user of the device of another user. The electronic device 100 may display appearances of the user of the electronic device and the user of the device of another user in real time. The electronic device may display content of conversation between the user of the electronic device and the user of the device of another user in real time. For example, the electronic device 100 may display the content of conversation between the users of the electronic device 100 and the device of another user 200 as a speech bubble shape via the STT function.

The electronic device receives the message 57 "Where are you?" from the device of another user 200, which is the device of John. The electronic device 100 and the device of another user 200 may display exchanged messages via the STT function. The electronic device 100 continuously transmits messages to the device of another user, and receives messages from the device of another user 200. The electronic device 100 may determine whether the continuously received messages are questions. The user of the electronic device 100 receives the message 57 "where are you?" from John.

Figure 39:
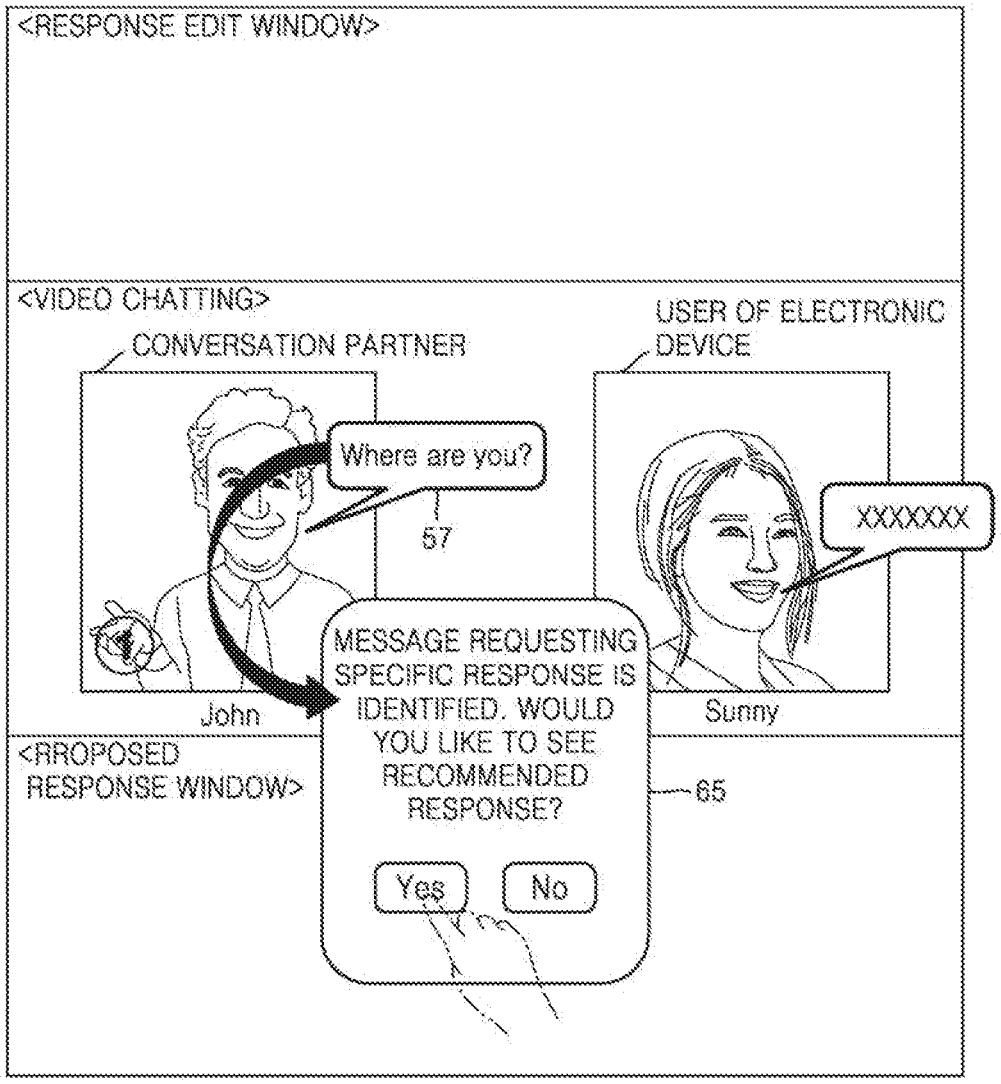

Referring to FIG. 39, when the electronic device 100 determines that the message 37 is a question, the electronic device 100 may check whether the user needs to be provided with content which may be used in responding to the message 37, via the pop-up window 65.

5.2. Proposal of Content

Figure 40:
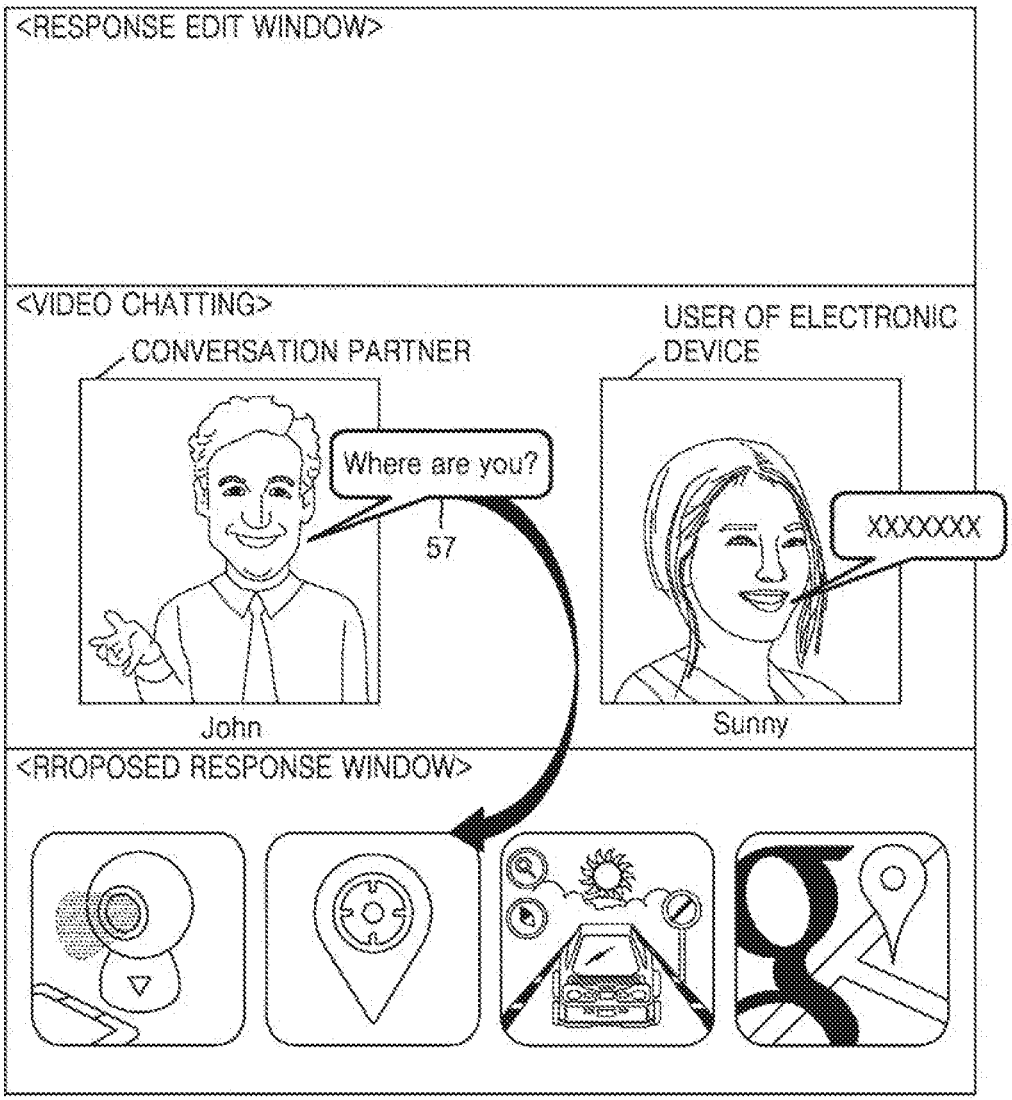
Figure 41:
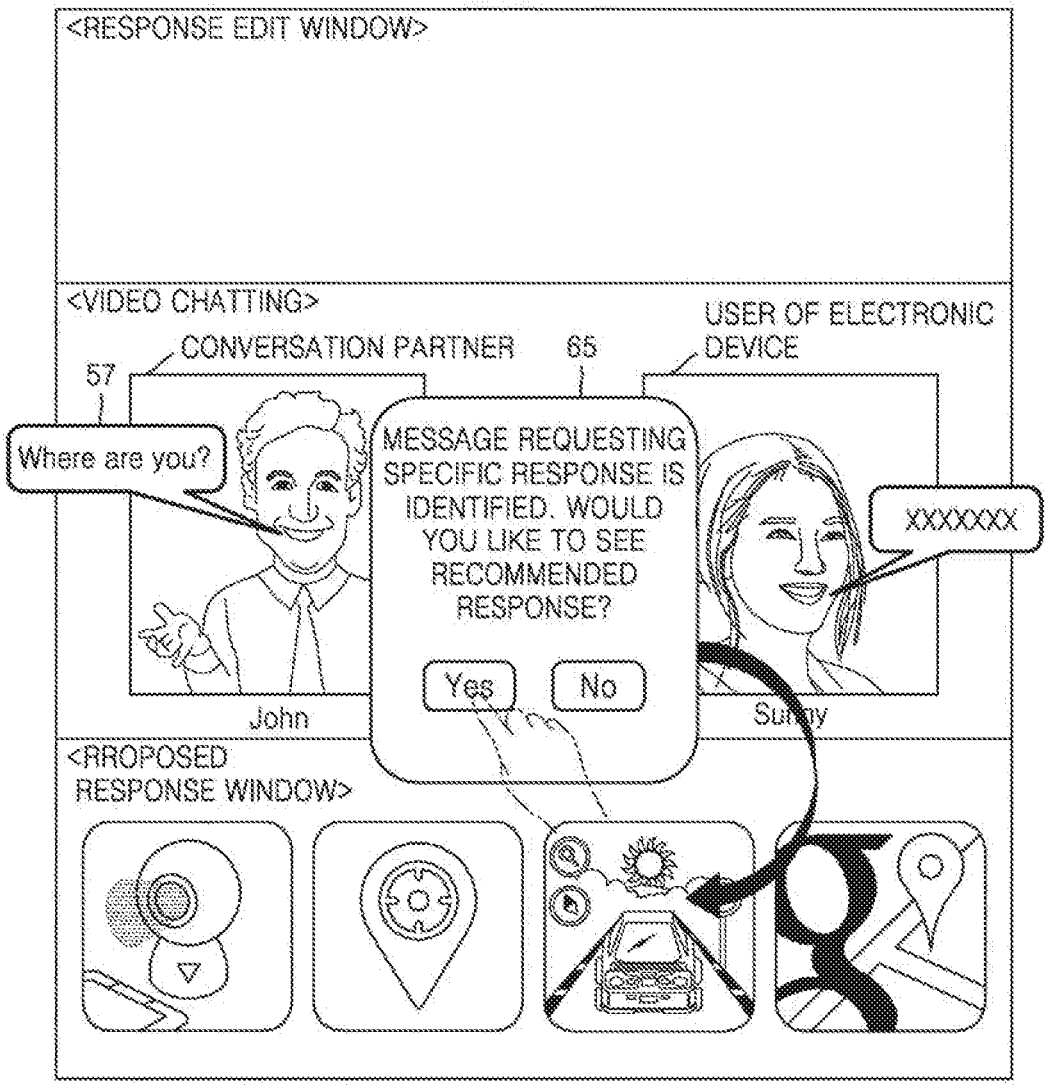
Figure 42:
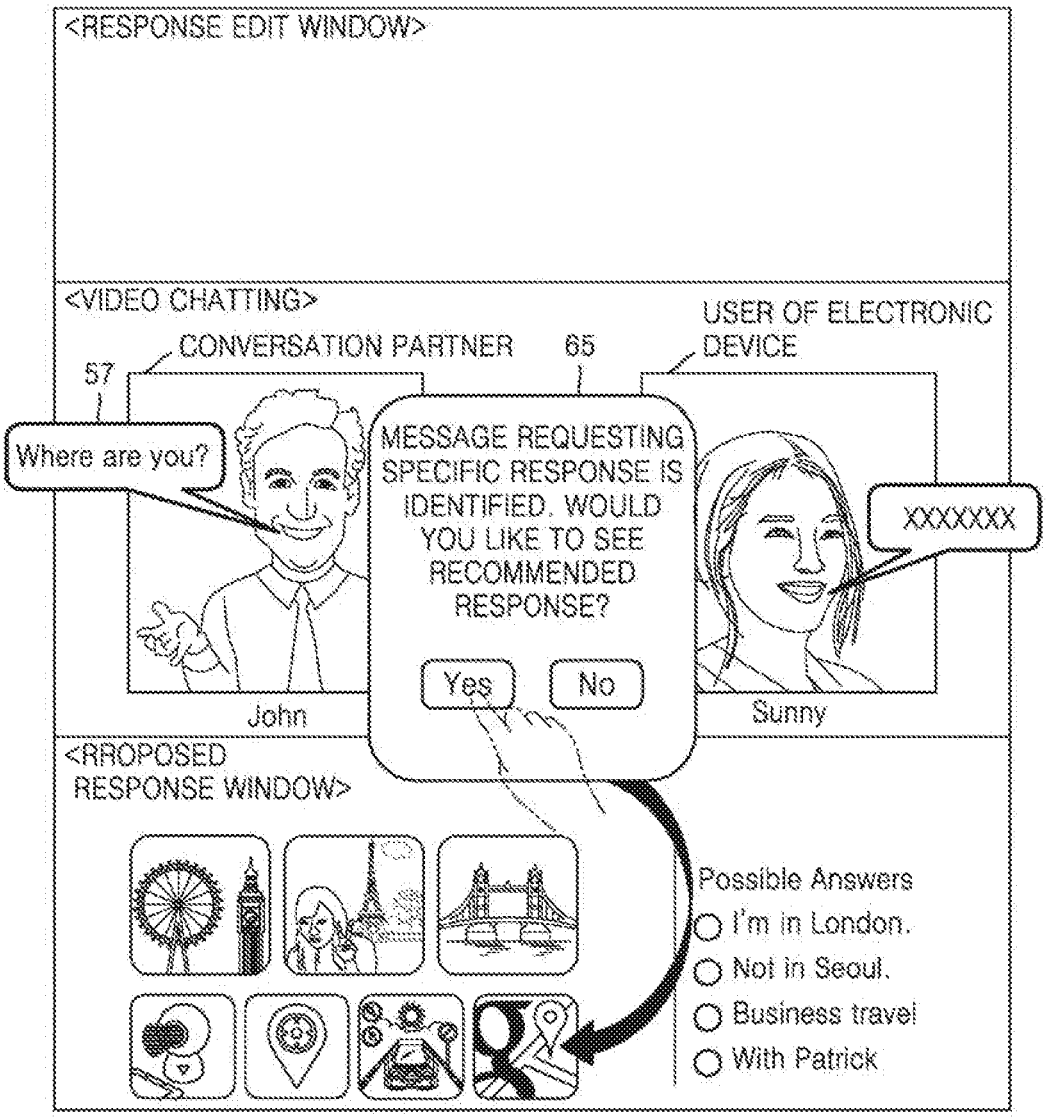

Referring to FIGS. 40 through 42, the electronic device 100 may display the content which may be used in responding to the message 57, in correspondence to a user input.

Referring to FIG. 40, when the electronic device 100 receives the message 57 illustrated in FIG. 38, the electronic device 100 may recommend an application related to the message 57. For example, when content of the message 57 is related to a location, the electronic device 100 may recommend a map application or a navigation application.

Referring to FIG. 41, when the electronic device 100 receives a user input (for example, a user input touching a Yes button) corresponding to the mark illustrated in FIG. 39, the electronic device 100 may recommend an application related to the message 57. For example, when the message corresponding to the question is related to a location, the electronic device 100 may recommend a map application or a navigation application.

Referring to FIG. 42, when the electronic device 100 receives a user input (for example, a user input touching a Yes button) corresponding to the mark illustrated in FIG. 39, the electronic device may recommend at least one of an image, an application, and a direct response related to the message 57.

5.3. Specific Proposal Situation (1)

Figure 43A:
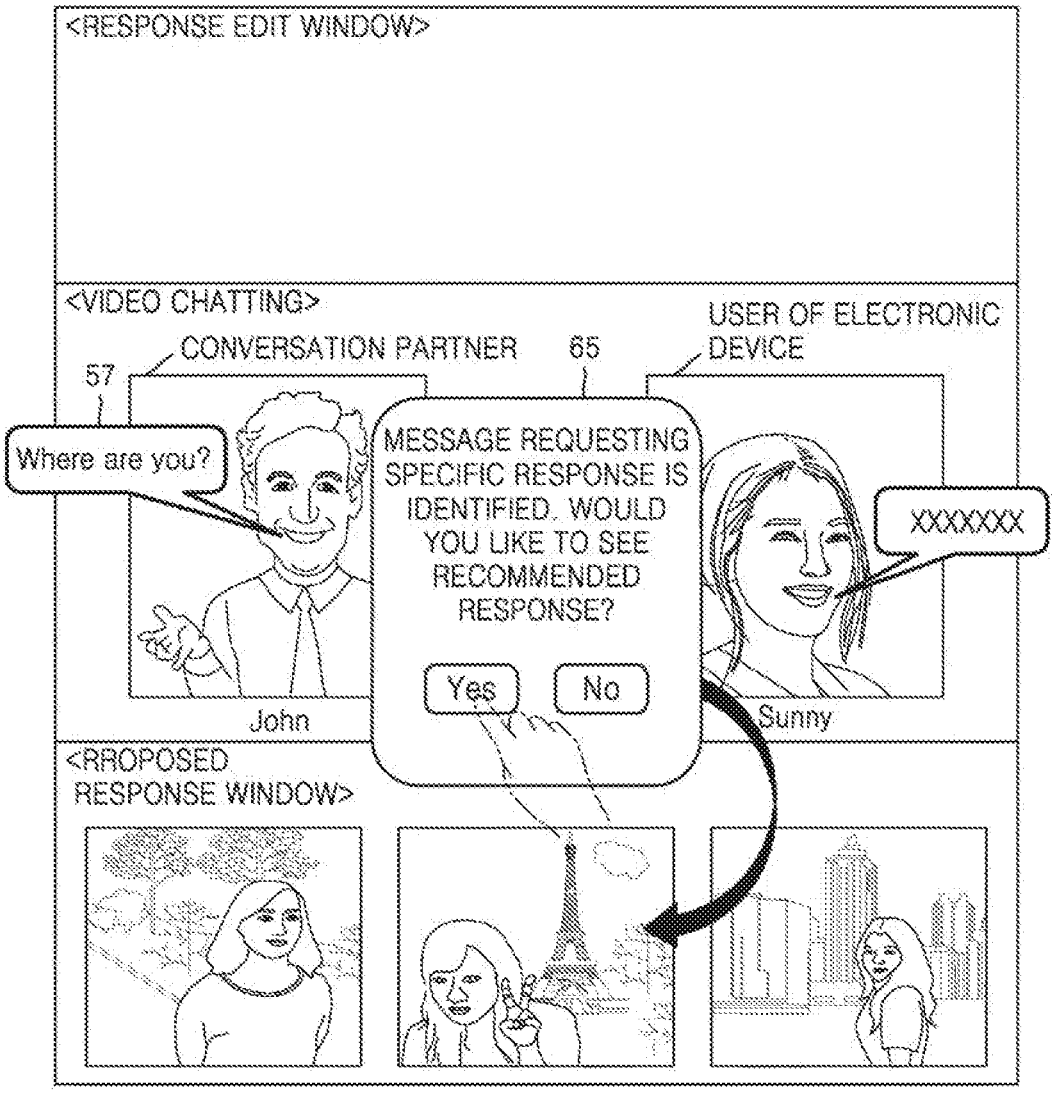

Referring to FIG. 43A, the electronic device 100 may provide images to the user when the user requests for the content which may be used in responses.

Figure 43B:
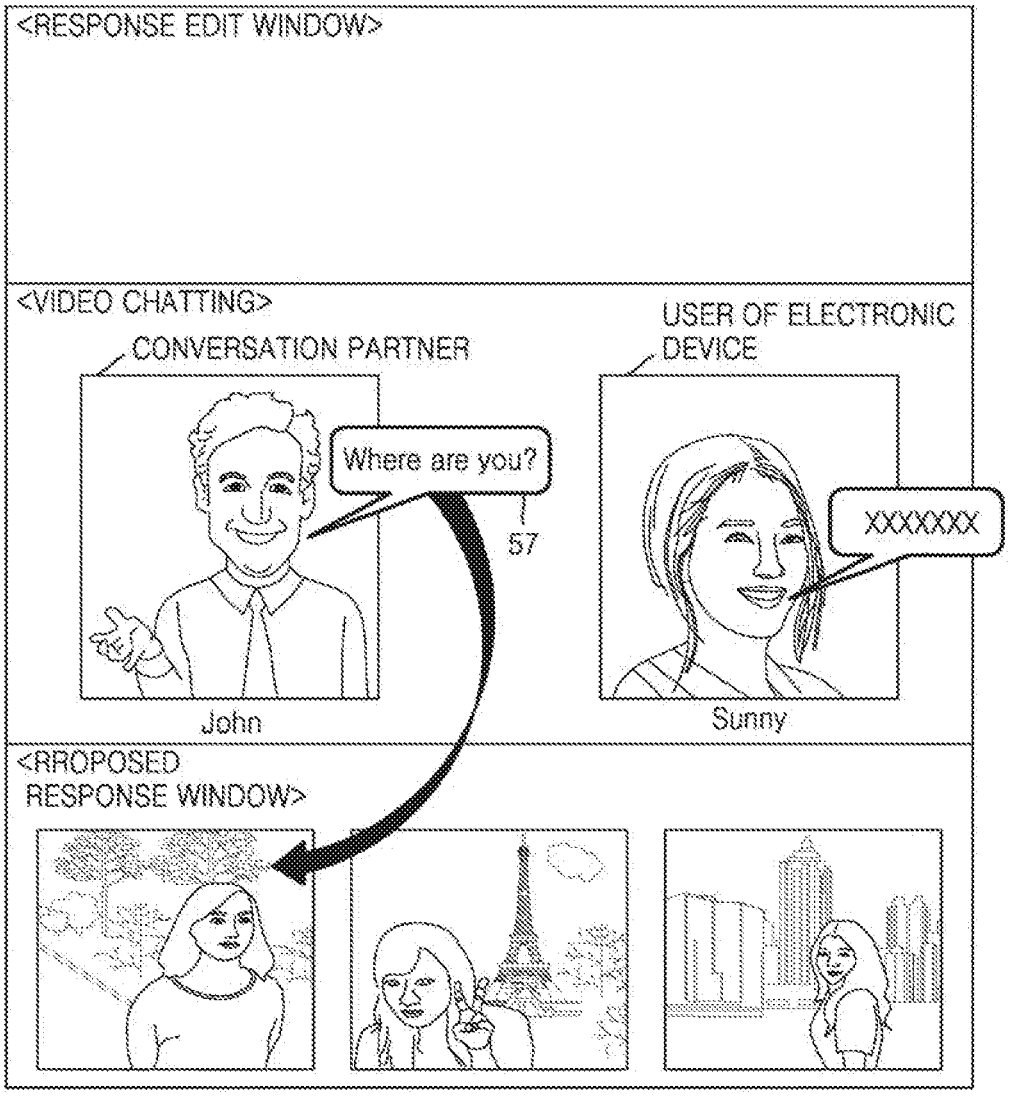

Referring to FIG. 43B, when the user wants to receive the content which may be used in responding to the message, the electronic device 100 may provide images to the user without additionally identifying whether to provide the content which may be used in responses.

Figure 44:
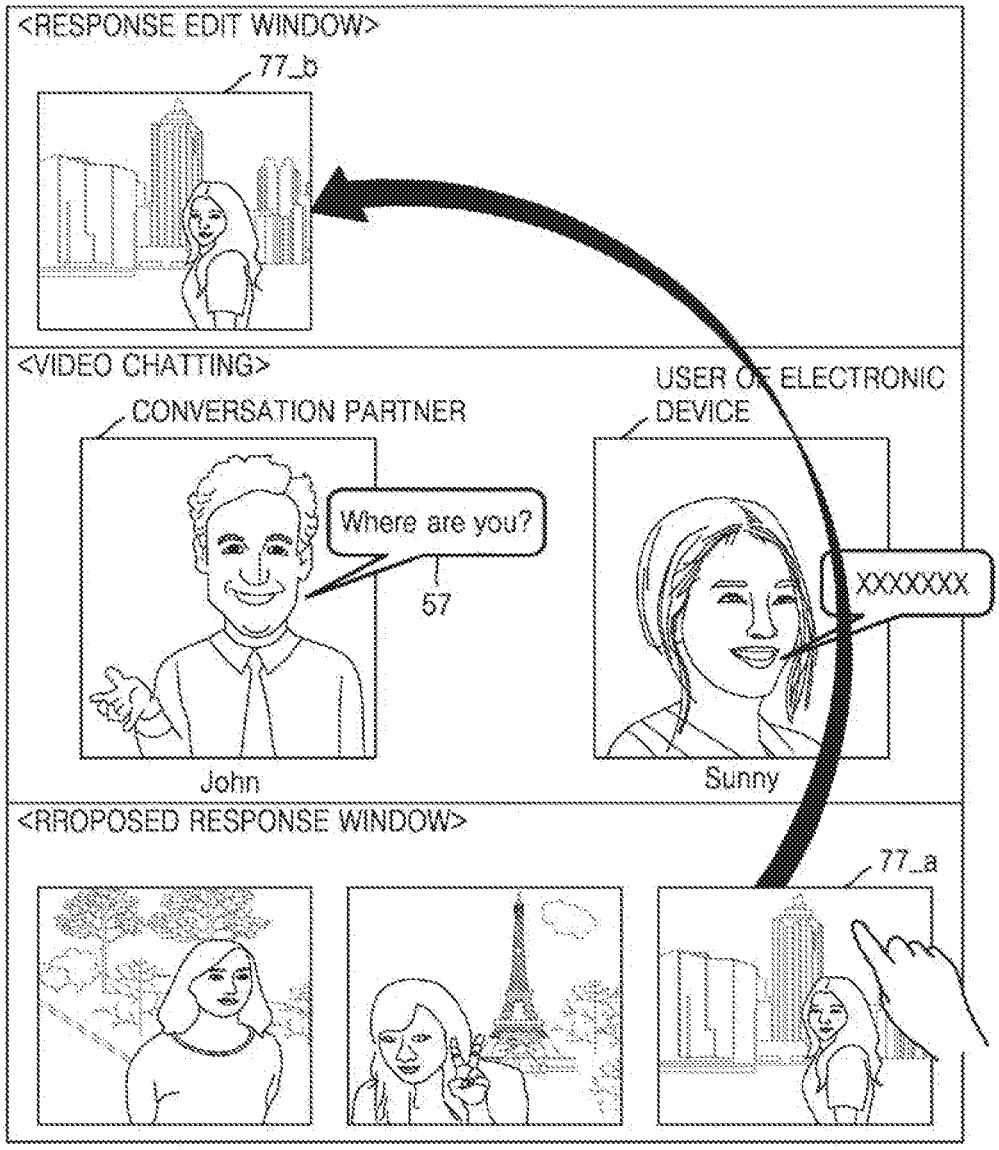

Referring to FIG. 44, the user may select the image 77_a from among the content which may be used in responses. The electronic device 100 may receive a user input selecting the content. For example, the user input may be a touch input selecting the image 77_a.

The electronic device 100 may provide a response edit window to the user. The user may edit the selected image 77_b via the response edit window.

Figure 45:
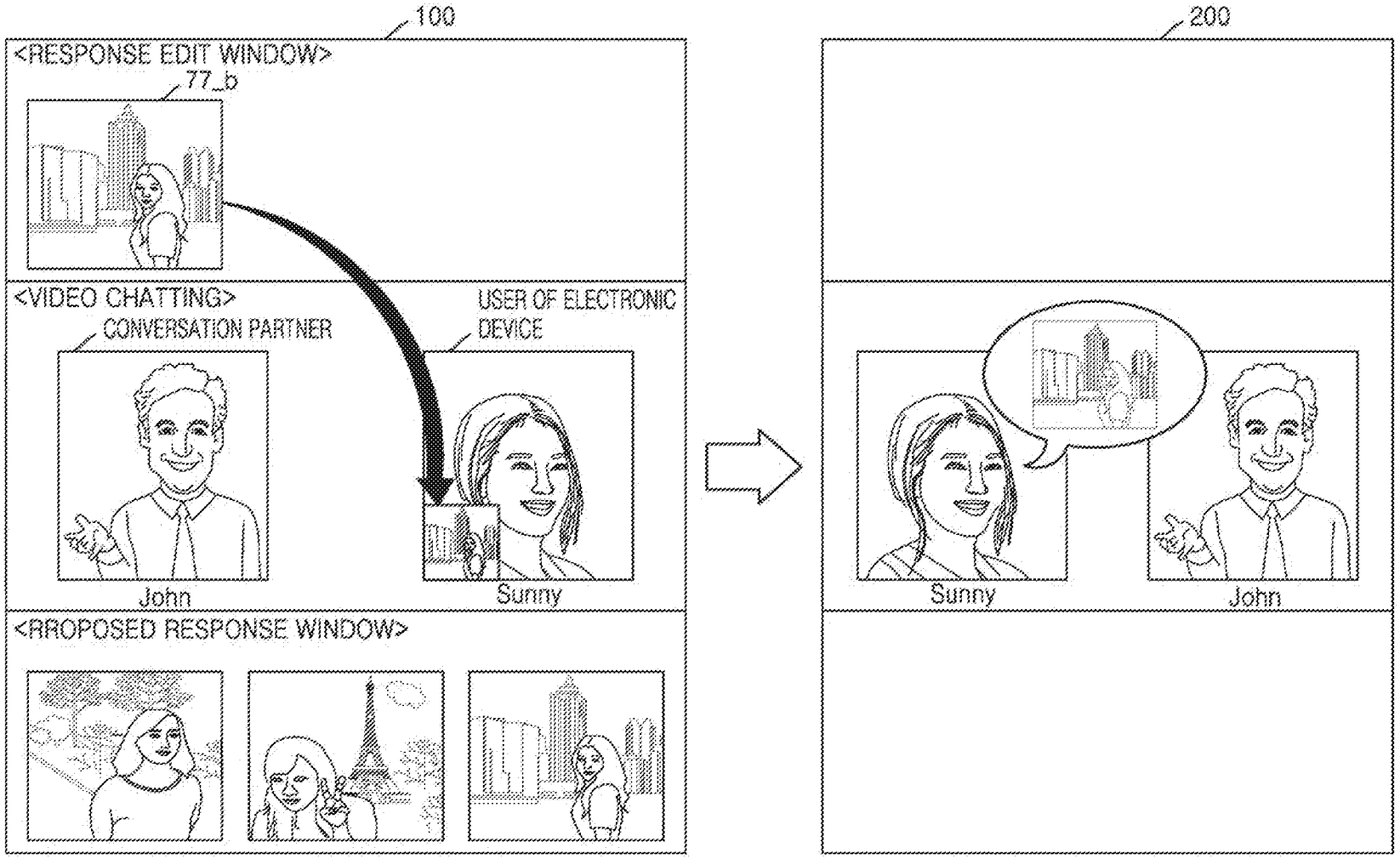

Referring to FIG. 45, when the user touches the image 77_b which the user has finished editing, the edited selected image 77_b may be provided to the conversation partner. For example, when the user touches the selected image 77_b which the user has finished editing, the electronic device 100 may transmit the edited selected image 77_b to the conversation partner. The electronic device 100 may transmit the edited selected image 77_b via a portion displaying the appearance of the user.

When the user finishes editing the selected image, the electronic device may provide the image 77_b to the user of the electronic device 100, the user of the device of another user 200, or a third user, via a mailing service or an SNS, according to a selection of the user. Also, the electronic device 100 may provide the image 77_b to the user of the electronic device 100, the user of the device of another user 200, or the third user, via one or more services, regardless of the selection of the user.

5.4. Specific Proposal Situation (2)

Figure 46A:
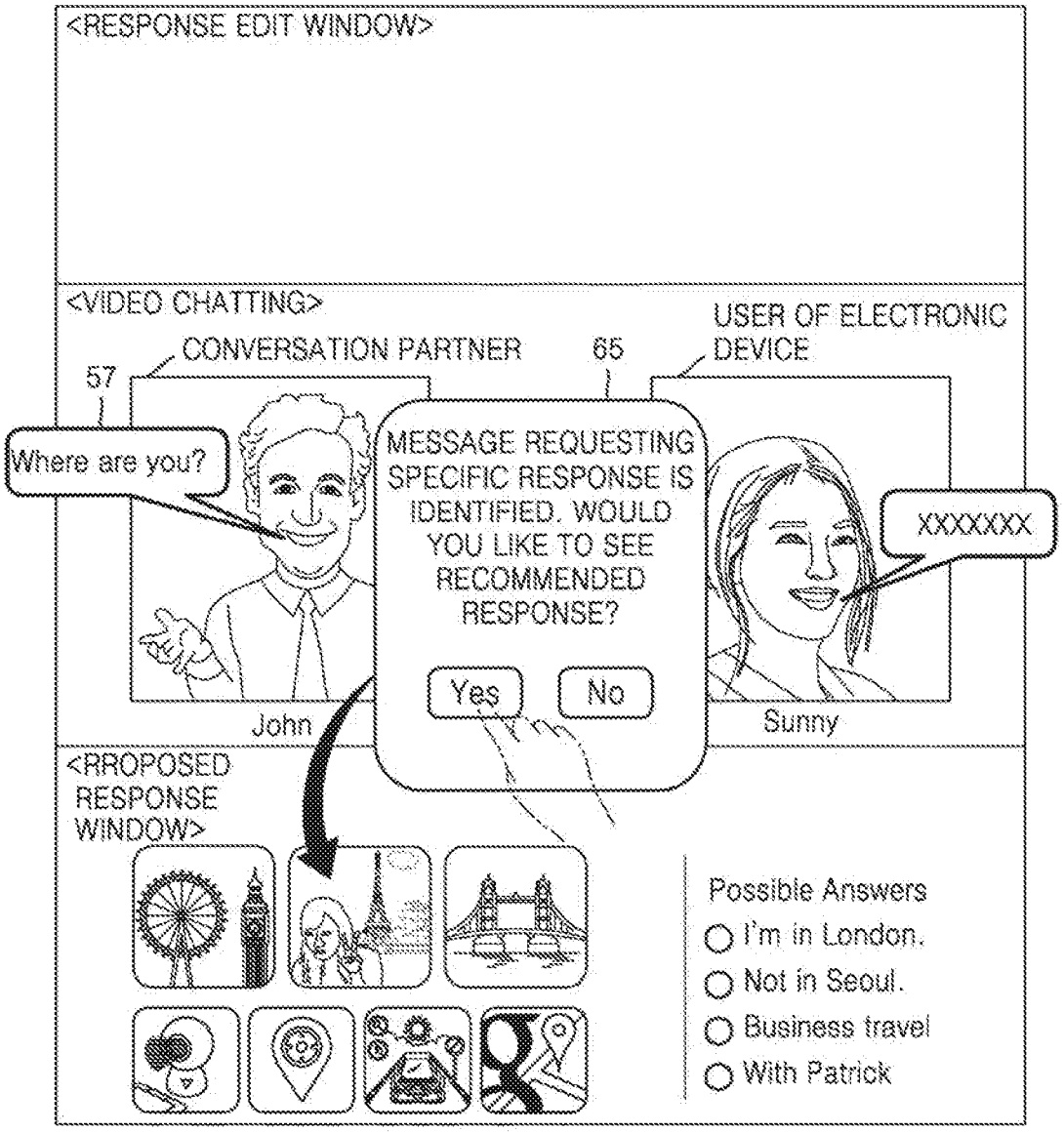

Referring to FIG. 46A, when the user requests for the content which may be used in responses, the electronic device 100 may provide an image, an application, and a possible direct answer.

Figure 46B:
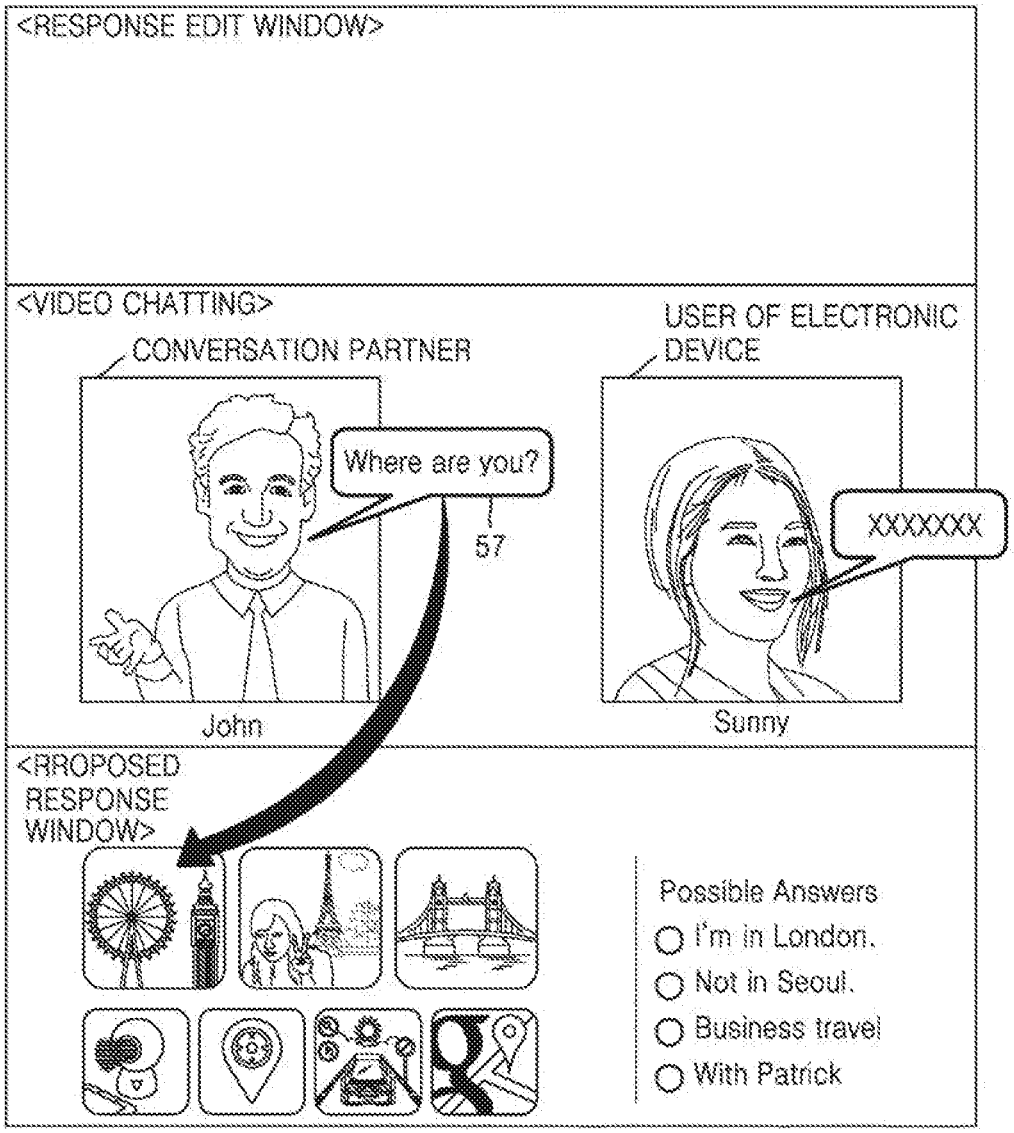

Referring to FIG. 46B, the electronic device may provide the image, the application and the possible direct answer, without additionally identifying whether to provide the content which may be used in responding to the message.

Figure 47:
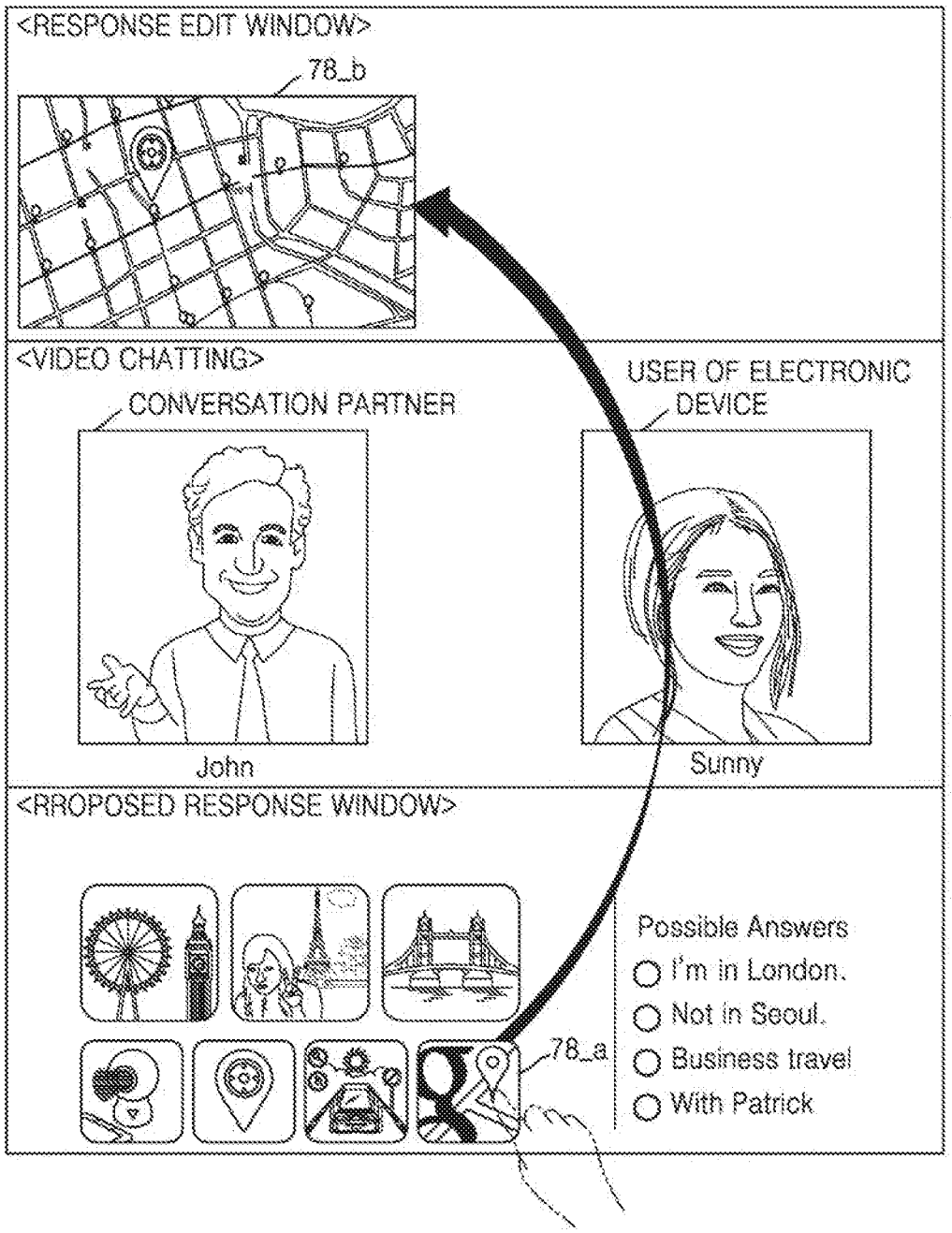

Referring to FIG. 47, the user may select a map application 78_a from among the content which may be used in responses. The electronic device 100 may receive a user input. For example, the user input may be a touch input selecting the application 78_a.

The electronic device 100 may provide a response edit window to the user, in correspondence to a user input. The electronic device 100 may display, via the response edit window, a result of inputting a keyword extracted from the message in the application 78_a as an input value. For example, as illustrated in FIG. 47, the electronic device 100 may display, via the response edit window, the image 78_b, which is the result of inputting the keyword "a current location" in the map application.

The electronic device 100 may provide an editing environment via the response edit window, via which the user may emit the result image 78_b. For example, the user may enlarge or reduce the result image 78_b via the response edit window, and may select a portion of the result image 78_b.

Figure 48:
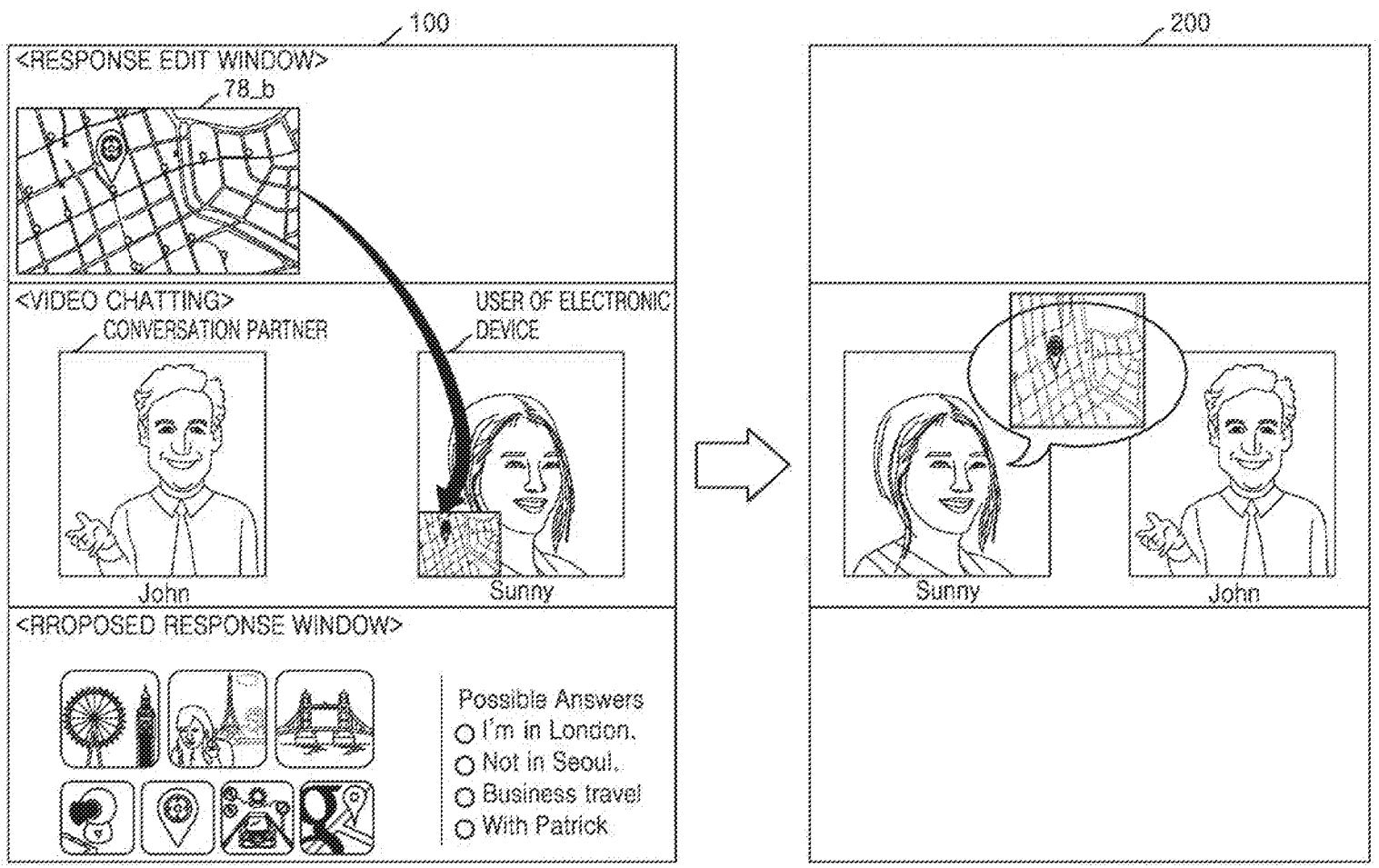

Referring to FIG. 48, when the user selects the result image 78_b which has been edited, the result image 78_b may be provided to the conversation partner. For example, when the user touches the result image 78_b which has been edited, the electronic device 100 may transmit the edited result image 78_b to the conversation partner. The electronic device 100 may transmit the edited result image 78_b via a portion displaying the appearance of the user.

6. Scenario 5

FIGS. 50A through 50D, 51A through 51D, 52A through 52D, and 53A through 53C, 53D1, and 53D2 are views for generally describing a method of providing content according to an exemplary embodiment. FIGS. 49A through 49D, 50A through 50D, 51A through 51D, 52A through 52D, and 53A through 53C, 53D1, and 53D2 are views of a user interface according to operations of a scenario in which the electronic device 100 and the device of another user 200 recommend to the users a possible direct answer, a restaurant application, a response-related image, a map application, and a news application, as the response related content, while the electronic device 100 and the device of another user 200 provide a text message service.

6.1. Proposal of a Direct Response

Figure 49A:
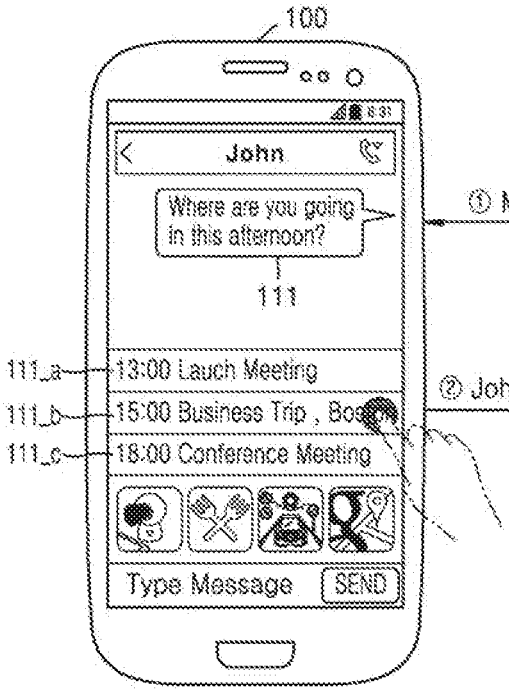
FIG. 49A through 49D are block diagrams of components of a user's terminal according to an exemplary embodiment, wherein the user's terminal may be the electronic device of FIG. 1.
Figure 49B:
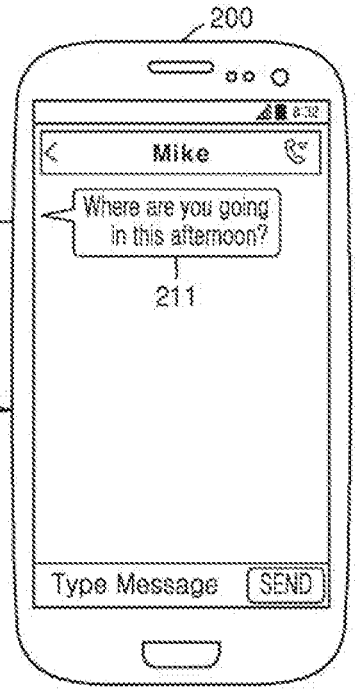

Referring to FIGS. 49A and 49B, John, the user of the electronic device 100 is conversing with Mike, the user of the device of another user 200, via a text message service. John receives a message 111 "Where are you going in this afternoon?" from Mike. The electronic device 100 and the device of another user 200 may display exchanged messages. The electronic device 100 may determine whether continuously received messages are questions.

Referring to FIG. 49A, when the electronic device 100 determines that the message 111 is a question, the electronic device 100 may provide direct answer candidates 111_a, 111_b, and 111_c to the user. John, the user of the electronic device 100 may click one direct answer candidate 111_b to transmit the direct answer candidate 111_b to the conversation partner, Mike.

Figure 49C:
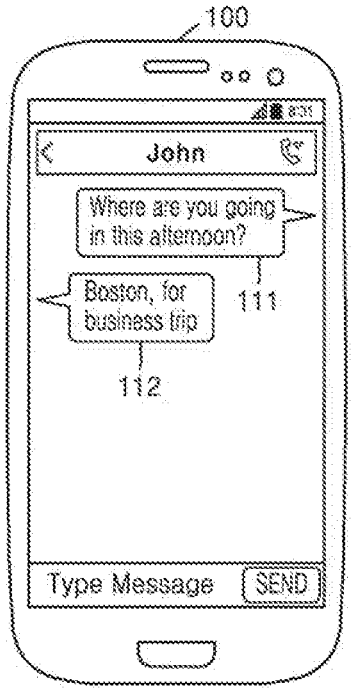
Figure 49D:
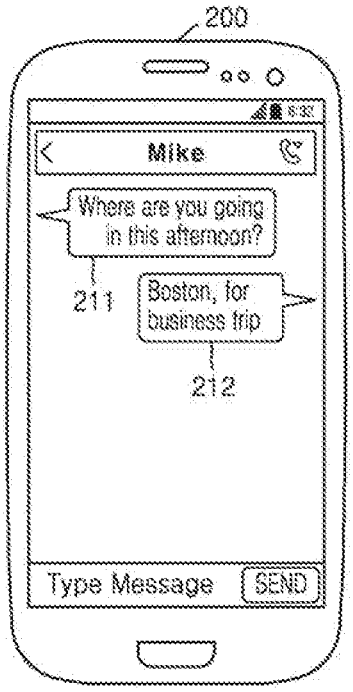

Referring to FIGS. 49C and 49D, John and Mike may identify exchanged messages 111, 112, 211, and 212 via each of the devices.

6.2. Proposal of a Restaurant Via a Restaurant Application

Referring to FIGS. 50A and 50B, Mike may transmit a message 213 "Really? I was there for one month" to John. The electronic device 100 may display a message 113 received from the device of another user 200. John may transmit a message 114 "Do you know a good restaurant near the Fenway Park?" to Mike. The device 200 of another user may display a message 214 received from the electronic device 100.

Referring to FIGS. 50C and 50D, the device of another user 200 may recommend an application 214_a related to various restaurants, in correspondence to the received message, and may recommend menu content. Mike may touch the menu content to transmit a message 115 including the menu content, to John.

6.3. Proposal of the Response Via an Image

Figure 51A:
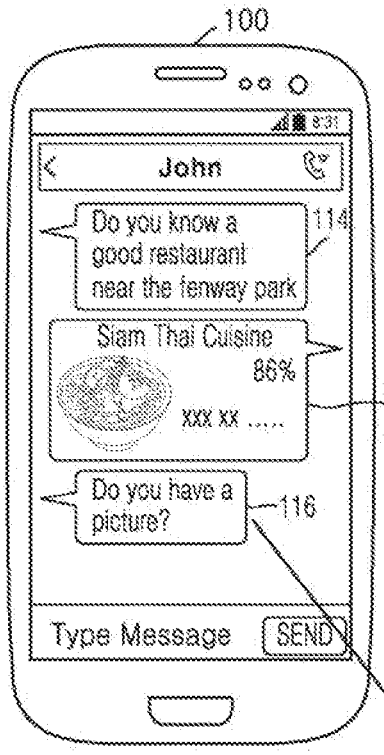
Figure 51B:
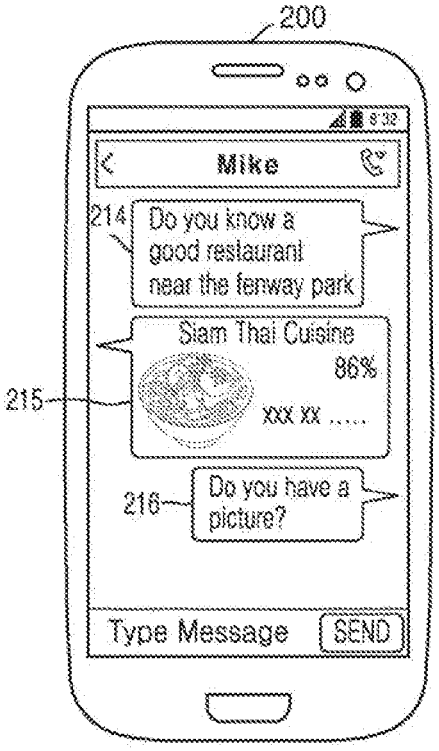

Referring to FIGS. 51A and 51B, John, the user of the electronic device 100 may transmit a message 116 "Do you have a picture?" to Mike, the user of the device of another user 200. The device of another user 200 may display a message 216 received from John.

Figure 51C:
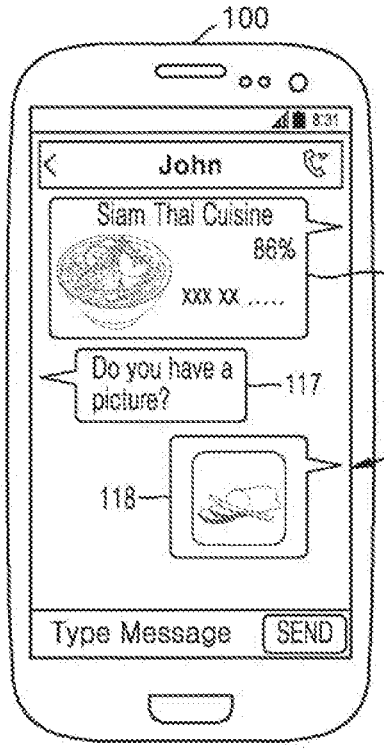
Figure 51D:
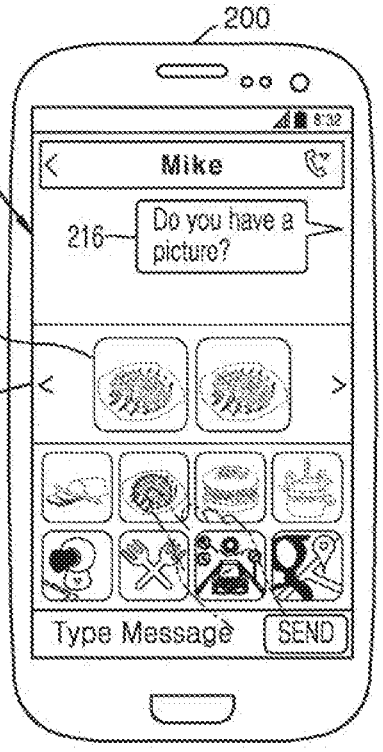

Referring to FIGS. 51C and 51D, the device of another user 200 may recommend an image 216a in correspondence to the received message. Mike may touch the recommended food image to transmit a message 118 including the menu content, to John.

6.4. Transmission of its Own Location Via a Map Application

Figure 52A:
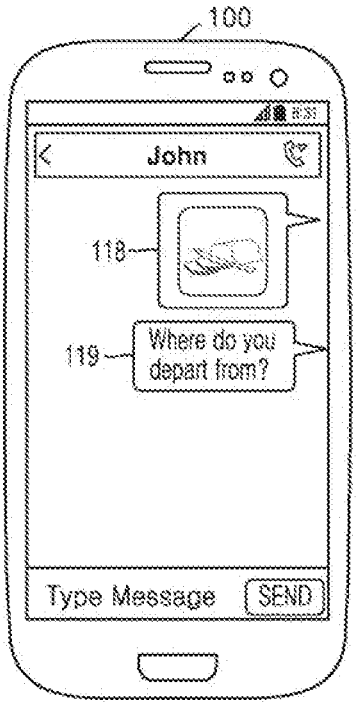
Figure 52B:
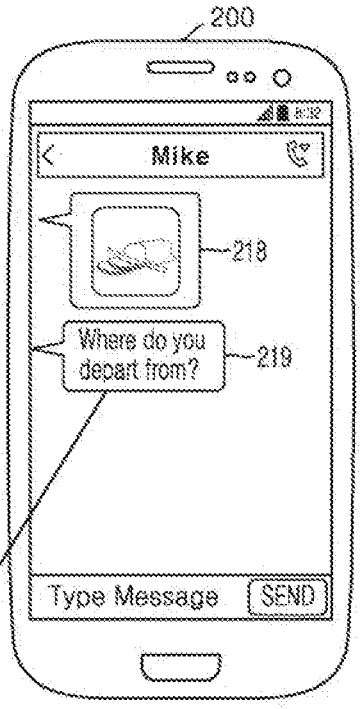

Referring to FIGS. 52A and 52B, Mike may transmit a message 219 "Where do you depart from?" to John. The electronic device 100 may display a message 119 received from Mike.

Figure 52C:
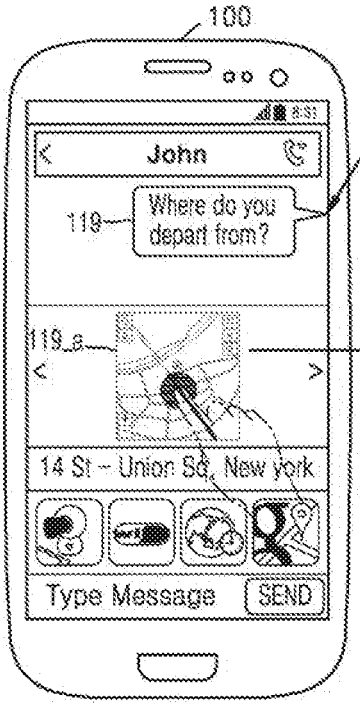
Figure 52D:
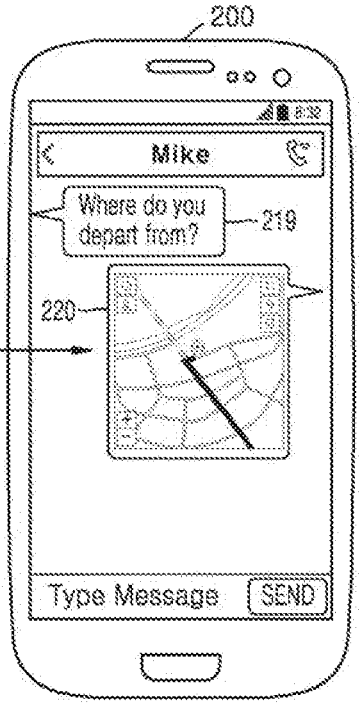

Referring to FIGS. 52C and 52D, the electronic device 100 may recommend a map application 119_a in correspondence to the received message 119. John may transmit his location via the recommended map application, to Mike, via a message 220.

6.5. Transmission of an Article Via a News Application

Referring to FIGS. 53A and 53B, John may transmit a message 121 "Is there a hot issue in Boston?" to Mike.

Referring to FIGS. 53C, 53D1, and 53D2, the device of another user 200 may display a message 221 received from John. The device of another user 200 may recommend a news application 221_a in correspondence to the received message 221. When Mike selects the recommended news application 221_a, the device of another user 200 may display a news article via a screen transformation as illustrated in FIG. 53D2, and Mike may select the news article to transmit the related article to the electronic device 100 of John. The electronic device 100 may display a message 122 including a link of the related article and an article summary screen.

7. Scenario 6

FIGS. 54A through 54D are views for describing a method of providing content according to an exemplary embodiment. FIGS. 54A through 54D are a view of a user interface according to operations of a scenario in which the electronic device 100 and the device of another user 200 provide a text message service during a voice call, and recommend to the users a response via a map application, as the response related content.

Figure 54A:
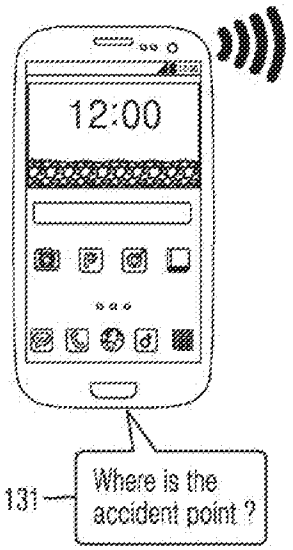
FIGS. 54A through 54D are views for describing a method of providing content according to an exemplary embodiment.
Figure 54B:
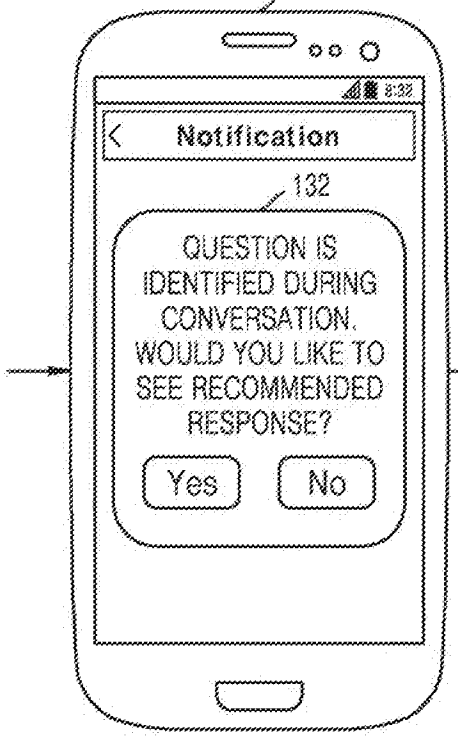
Figure 54C:
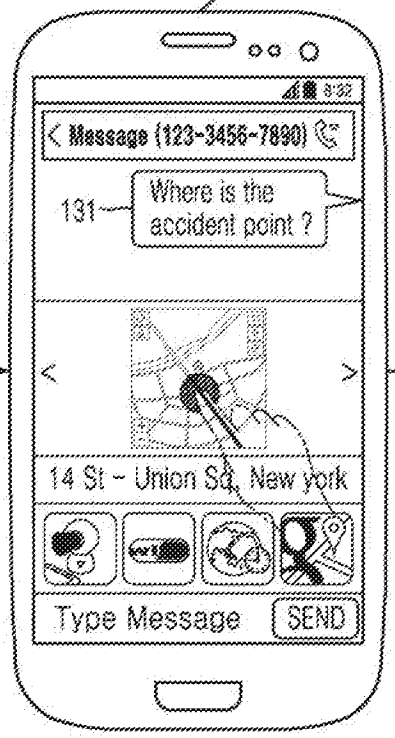
Figure 54D:
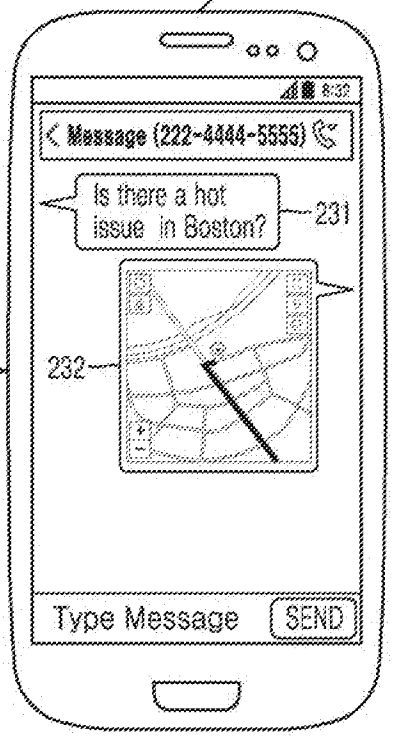

Referring to FIG. 54A, the electronic device 100 may receive a voice message 131 "Where is the accident point?" during the voice call. Referring to FIG. 54B, the electronic device may identify whether the user wants a recommended response via a pop-up screen 132. Referring to FIG. 54C, the user of the electronic device 100 may select a map application by a touch input. Referring to FIG. 54D, the device of another user 200 may receive a message 232 indicating a location of the user of the electronic device 100 from the electronic device 100.

8. Scenario 7

FIGS. 55A through 55D are views for describing a method of providing content according to an exemplary embodiment. FIGS. 55A through 55D are a view of a user interface according to operations of a scenario in which the electronic device 100 and the device of another user 200 recommend to the users different response candidates as the response related content, while the electronic device 100 and the device of another user 200 provide a text message service.

Figure 55A:
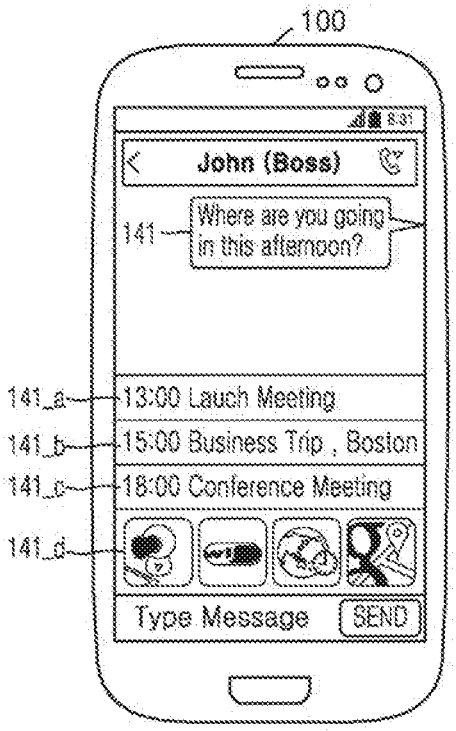
FIGS. 55A through 55D are views for describing a method of providing content according to an exemplary embodiment.

Referring to FIG. 55A, John may receive a message 141 "Where are you going in this afternoon?" from his boss. In response to this, the electronic device 100 may propose direct responses, such as "13:00 Lunch meeting" 141_a, "15:00 Business trip" 141_b, or "18:00 conference meeting" 141_c, and a related application 141_d.

Figure 55B:
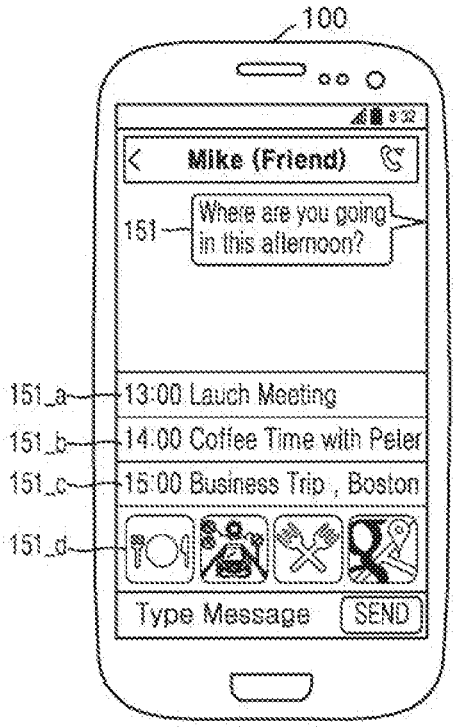

Referring to FIG. 55B, John may receive a message 151 "Where are you going in this afternoon?" from a friend. In response to this, the electronic device 100 may propose direct responses, such as "13:00 Lunch meeting" 151_a, "14:00 Coffee time with Peter" 151_b, or "18:00 Conference meeting" 151_c, and a related application 151_d.

Referring to FIGS. 55A and 55B, in response to the same question, the electronic device 100 or the device of another user 200 may recommend different responses according to the relationship between the user of the electronic device 100 or the user of the device of another user 200, and the conversation partner. For example, when the electronic device 100 receives the message 141 from the boss, the response "15:00 Business trip" 141_b may be recommended, and when the electronic device receives the message 151 from the friend, the response "14:00 Coffee time with Peter" 151_b may be recommended rather than the response "15:00 business trip" 141_b.

Figure 55C:
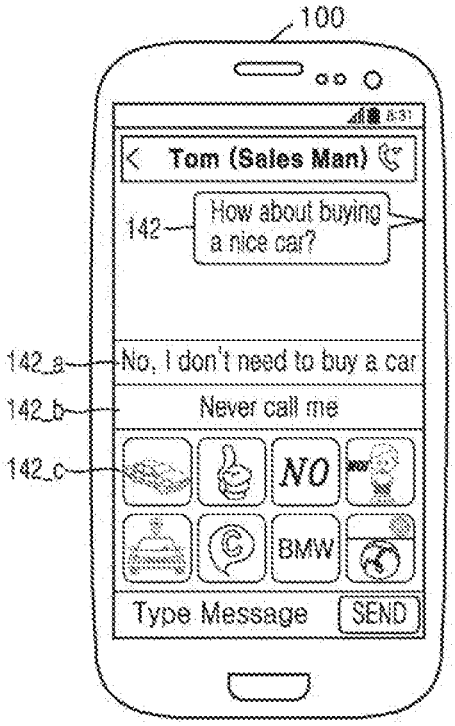

Referring to FIG. 55C, John may receive a message 142 "How about buying a nice car?" from a salesperson. In response to this, the electronic device 100 may recommend direct responses, such as "No, I don't need to buy a car" 142_a or "Never call me" 142_b, and a related application 142_c.

Figure 55D:
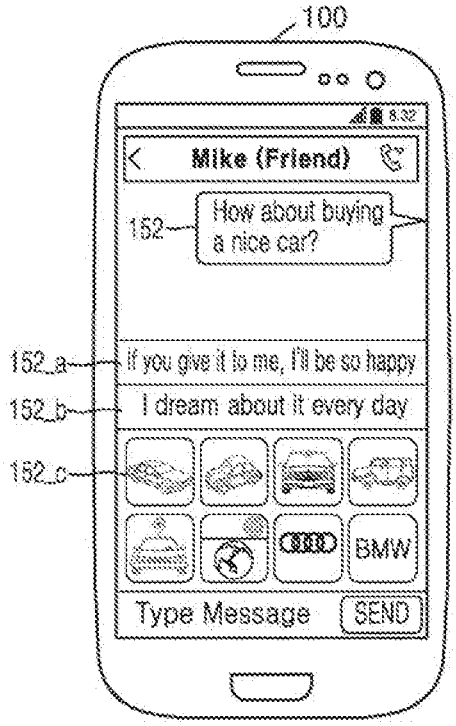

Referring to FIG. 55D, John may receive a message 152 "How about buying a nice car?" from a friend. In response to this, the electronic device 100 may propose direct responses, such as "If you give it to me, I'll be so happy" 151_a or "I dream about it every day" 152_b, and a related application 151_c.

Referring to FIGS. 55C and 55D, in response to the same question, the electronic device 100 or the device of another user 200 may recommend different responses according to the relationship between the user of the electronic device 100 or the user of the device of another user 200, and the conversation partner. For example, when the electronic device 100 receives the message 142 from the salesperson, the electronic device 100 may recommend the direct response "Never call me" 142_b, and when the electronic device 100 receives the message 152 from the friend, the electronic device 100 may recommend the direct response "I dream about it every day" 152_b.

9. Components of the Electronic Device

Figure 56:
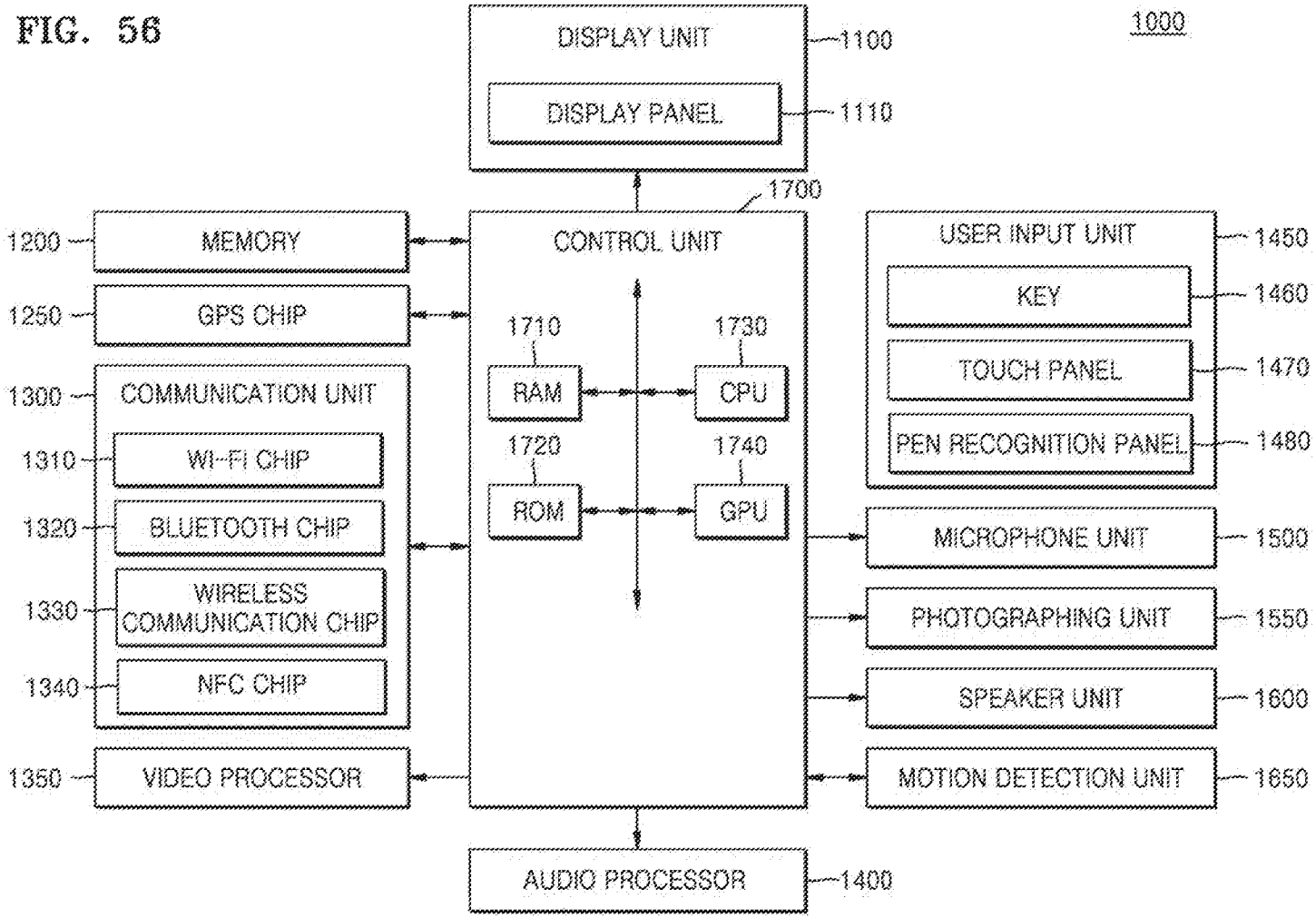
FIG. 56 is a block diagram of software components of a user's terminal according to an exemplary embodiment.

FIG. 56 is a block diagram illustrating a structure of a user terminal device 1000 according to an exemplary embodiment. The user terminal device 1000 illustrated in FIG. 56 may be the electronic device 100 of FIG. 1.

Referring to FIG. 56, the user terminal device 1000 may include at least one selected from a display unit 1100, a control unit (e.g., controller) 1700, a memory 1200, a global positioning system (GPS) chip 1250, a communication unit 1300, a video processor 1350, an audio processor 1400, a user input unit 1450, a microphone unit 1500, a photographing unit (e.g., camera) 1550, a speaker unit 1600, and a motion detection unit (e.g., motion detector) 1650.

The display unit 1100 may include a display panel 1110 and a controller for controlling the display panel 1110. The display panel 1110 may be realized as various types of displays, such as liquid crystal displays (LCD), organic light-emitting diodes (OLED), active-matrix organic light-emitting diodes (AM-OLED), and plasma display panels (PDP). The display panel 1110 may be realized to be flexible, transparent, and wearable. The display unit 1100 may be combined with a touch panel 1470 of the user input unit 1450 to be provided as a touch screen. For example, the touch screen may include an integral module in which the display panel 1110 and the touch panel 1470 are stacked. The memory 1200 may include at least one of an internal memory and an external memory.

The internal memory may include at least one selected from, for example, volatile memories (for example, dynamic RAM (DRAM), static RAM (SRAM), and synchronous dynamic RMA (SDRAM), non-volatile memories (for example, one time programmable ROM (OTPROM), programmable ROM (PROM), erasable and programmable ROM (EPROM), electrically erasable and programmable ROM (EEPROM), mask ROM, and flash ROM), hard disk drive (HDD), and solid state drive (SSD). According to an exemplary embodiment, the control unit 1700 may process a command or data received from the non-volatile memory or from at least one of other components by loading the command or the data in the volatile memory. Also, the control unit 1700 may retain the data received or generated from other components in the non-volatile memory.

The external memories may include at least one selected from, for example, compact flash (CF), secure digital (SD), micro secure digital (Micro-SD), mini secure digital (Mini-SD), extreme digital (xD), and memory stick.

The memory 1200 may store various programs and data used for an operation of the user terminal device 1000. For example, the memory 1200 may temporarily or semi-permanently store at least a portion of content that is to be displayed on a lock screen.

The control unit 1700 may control the display unit 1100 such that a portion of the content stored in the memory 1200 is displayed in the display unit 1100. In other words, the control unit 1700 may display a portion of the content stored in the memory 1200 in the display unit 1100. Alternatively, the control unit 1700 may perform a control operation corresponding to a user's gesture, when the user's gesture is generated in a portion of the display unit 1100.

The control unit 1700 may include at least one of the natural language processing unit (NLU) 121, the session manager 122, the profiler 123, the context analyzer 124, the response generator 125, the content metadata storage 126, and the App register 127 of the knowledge framework 120 as illustrated in FIG. 9A. For example, the control unit 170 of the user terminal device 1000 may include the natural language processing unit (NLU) 121, the session manager 122, the profiler 123, the context analyzer 124, and the response generator 125, and the server 300 may include the App register 327 and the content metadata storage 326 as shown in FIG. 12B. According to another exemplary embodiment, the control unit 1700 may include the profiler 123 and the context analyzer 124, and the server 300 may include the natural language processing unit (NLU) 321, the session manager 322, the response generator 325, the content metadata storage 326, and the App register 327 with reference to FIG. 13B. Alternatively, the control unit 1700 of the user terminal device 1000 may include the profiler 123, the App register 127, and the content metadata storage 126, and the server 300 may include the natural language processing unit (NLU) 321, the session manager 322, the response generator 325, the context analyzer 324 and a profiler 323 as shown in FIG. 14B.

The control unit 1700 may include at least one selected from random access memory (RAM) 1710, read-only memory (ROM) 1720, a central processing unit (CPU) 1730, a graphic processing unit (GPU) 1740, and a bus 1750. The RAM 1710, the ROM 1720, the CPU 1730, and the GPU 1740 may be connected with one another via the bus 1750.

The CPU 1730 accesses the memory 1200 and performs a boot operation by using O/S stored in the memory 1200. Also, the CPU 1730 performs various operations by using various programs, content, and data stored in the memory 1200.

A set of command languages for a system boot operation is stored in the ROM 1720. For example, when a turn-on command is input in a portable terminal 1000 and a power is supplied, the CPU 1730 may copy the O/S stored in the memory 1200 in the RAM 1710, according to the command language stored in the ROM 1720, and may execute the O/S to boot the system. When the booting is completed, the CPU 1730 may copy various programs stored in the memory 1200 in the RAM 1710 and execute the programs copied in the RAM 1710 to perform various operations. The GPU 1740 displays a UI screen on a portion of the display unit 1100, when the booting of the user terminal device 1000 is completed. In detail, the GPU 1740 may generate a screen in which electronic files including various objects, such as content, icons, and menus are displayed. The GPU 1740 may calculate feature values, such as coordinate values, shapes, sizes, and colors of displayed objects in correspondence to a layout of the screen. Also, the GPU 1740 may generate screens of various layouts including objects, based on the calculated feature values. The screens generated by the GPU 1740 may be provided to the display unit 1100 and may be each displayed in each portion of the display unit 1100.

The GPS chip 1250 may receive a global positioning system (GPS) signal from a GPS satellite to calculate a current location of the user terminal device 1000. The control unit 1700 may calculate a user location by using the GPS chip 1250, when a navigation program is used or on other occasions when a current user location is needed.

The communication unit 1300 may perform communication with various types of devices of another user, according to various types of communication methods. The communication unit 1300 may include at least one selected from a WiFi chip 1310, a bluetooth chip 1320, a wireless communication chip 1330, and an NFC chip 1340. The control unit 1700 may perform communication with various types of devices of another user by using the communication unit 1300.

The WiFi chip 1310 and the bluetooth chip 1320 may perform communication by respectively using a WiFi method and a bluetooth method. When the WiFi chip 1310 or the bluetooth chip 1320 is used, various connection content such as SSID and a session key is firstly transmitted and received, and then, communication is connected by using the various connection content, to transmit and receive various information. The wireless communication chip 1330 refers to a chip performing communication according to various communication standards, such as IEEE, Zigbee, $3^{rd}$ generation (3G), $3^{rd}$ generation partnership project (3GPP), and long term evolution (LTE). The NFC chip 1340 refers to a chip operating in a near field communication (NFC) method using 13.56 MHz zone from among various RF-ID frequency zones, including 135 kHz, 13.56 MHz, 433 MHz, 860-960 MHz, and 2.45 GHz.

The video processor 1350 may process content received via the communication unit 1300 or video data included in content stored in the memory 1200. The video processor 1350 may perform various image processing with respect to the video data, such as decoding, scaling, noise filtering, frame rate conversion, and resolution conversion.

The audio processor 1400 may process content received via the communication unit 1300 or audio data included in the content stored in the memory 1200. The audio processor 1400 may perform various processing with respect to the audio data, such as decoding, amplification, and noise filtering.

The control unit 1700 may drive the video processor 1350 and the audio processor 1400 when a reproducing program with respect to multimedia content is executed, to reproduce corresponding content. The speaker unit 1600 may output audio data generated by the audio processor 1400.

The user input unit 1450 may receive an input of various command languages from a user. The user input unit 1450 may include at least one selected from a key 1460, a touch panel 1470, and a pen recognition panel 1480.

The key 1460 may include various types of keys, such as a mechanical button and a wheel, formed in various portions of an external body of the user terminal device 1000, such as a front portion, a side portion, and a rear portion.

The touch panel 1470 may sense a touch input of a user and may output a touch event value corresponding to the sensed touch signal. When the touch panel 1470 is formed as the touch screen by being combined with the display panel 1110, the touch screen may be realized as various types of touch sensors, such as a capacitive type, a decompression type, and a piezoelectric type. The capacitive type uses a method of calculating a touch coordinate by sensing fine electricity caused by a human body of a user when a part of the human body of the user touches a surface of the touch screen, by using a dielectric coated on the surface of the touch screen. The decompression type uses a method of including two electrode plates equipped in the touch screen and calculating a touch coordinate by sensing a current flow due to the upper and bottom plates contacting each other at a touched point, when a user touches a screen. The touch event occurring in the touch screen may be generated mainly by a finger of a human being, but may also be generated by an object of a conductive material which may cause a change in a capacitance.

The pen recognition panel 1480 may sense a proximate input of a pen or a touch input of a pen according to an operation of a touch pen (for example, a stylus pen) or a digitizer pen by a user, and may output a pen proximate event or a pen touch event that is sensed. The pen recognition panel 1480 may be realized for example as an EMR method and may sense a touch or proximate input, according to a change in a strength of an electromagnetic field due to approaching or a touch of a pen. In detail, the pen recognition panel 1480 may be formed by including an electronic induction coil sensor having a grid structure, and an electronic signal processing unit sequentially providing indirect signals having pre-determined frequencies in each loop coil of the electronic induction coil sensor. If there is a pen in which a resonator circuit is equipped, around the loop coil of the pen recognition panel 1480, the magnetic field transmitted from the corresponding loop coil may generate a current based on mutual electromagnetic induction, in the resonator circuit in the pen. Based on the current, an inductive magnetic field is generated from a coil forming the resonator circuit in the pen, and the pen recognition panel 1480 may detect the inductive magnetic field in the loop coil in a state of signal reception, so that an approaching or a touch location of the pen may be sensed. The pen recognition panel 1480 may be provided below the display panel 1110, by having a pre-determined area, for example, an area which may cover a display portion of the display panel 1110.

The microphone unit 1500 may receive an input of a user's voice or other noises and convert the input into audio data. The control unit 1700 may use the user's voice input through the microphone unit 1500 in a calling operation or may convert the user's voice into audio data to store the audio data in the memory 1200.

The photographing unit 1550 may photograph a still image or a video according to a control of a user. The photographing unit 1550 may be realized in a multiple number, for example including a front camera and a rear camera.

When the photographing unit 1550 and the microphone unit 1500 are provided, the control unit 1700 may perform a control operation according to a user's voice input through the microphone unit 1500 or a user's motion recognized by the photographing unit 1550. For example, the user terminal device 1000 may operate in a motion control mode or a sound control mode. When the user terminal device 1000 operates in the motion control mode, the control unit 1700 may active the photographing unit 1550 to photograph the user and may track the motion change of the user to perform a control operation corresponding to the motion change of the user. When the user terminal device 1000 operates in the sound control mode, the control unit 1700 may analyze the user's voice input through the microphone unit 1500 and may operate in a sound recognition mode that performs a control operation according to the analyzed user's voice.

The motion detection unit 1650 may sense a motion of a body of the user terminal device 1000. The user terminal device 1000 may rotate or may tilt in various directions. Here, the motion detection unit 1650 may detect characteristics of the motion, such as a direction and angle of the rotation, and a tilting degree, by using at least one of various sensors, such as an earth magnetic sensor, a gyro sensor, and an acceleration sensor.

In addition, the user terminal device 1000 may further include a USB port to which a USB connector may be connected, various external input ports for connections with various external terminals, such as a headset, a mouse, and LAN, a DMB chip receiving and processing a digital multimedia broadcasting (DMB) signal, and various sensors.

Names of the above-described components of the user terminal device 1000 may vary. Also, the user terminal device 1000 may be formed by including one of the above-described components, by omitting some of the above-described components, or by further including additional components.

Figure 57:
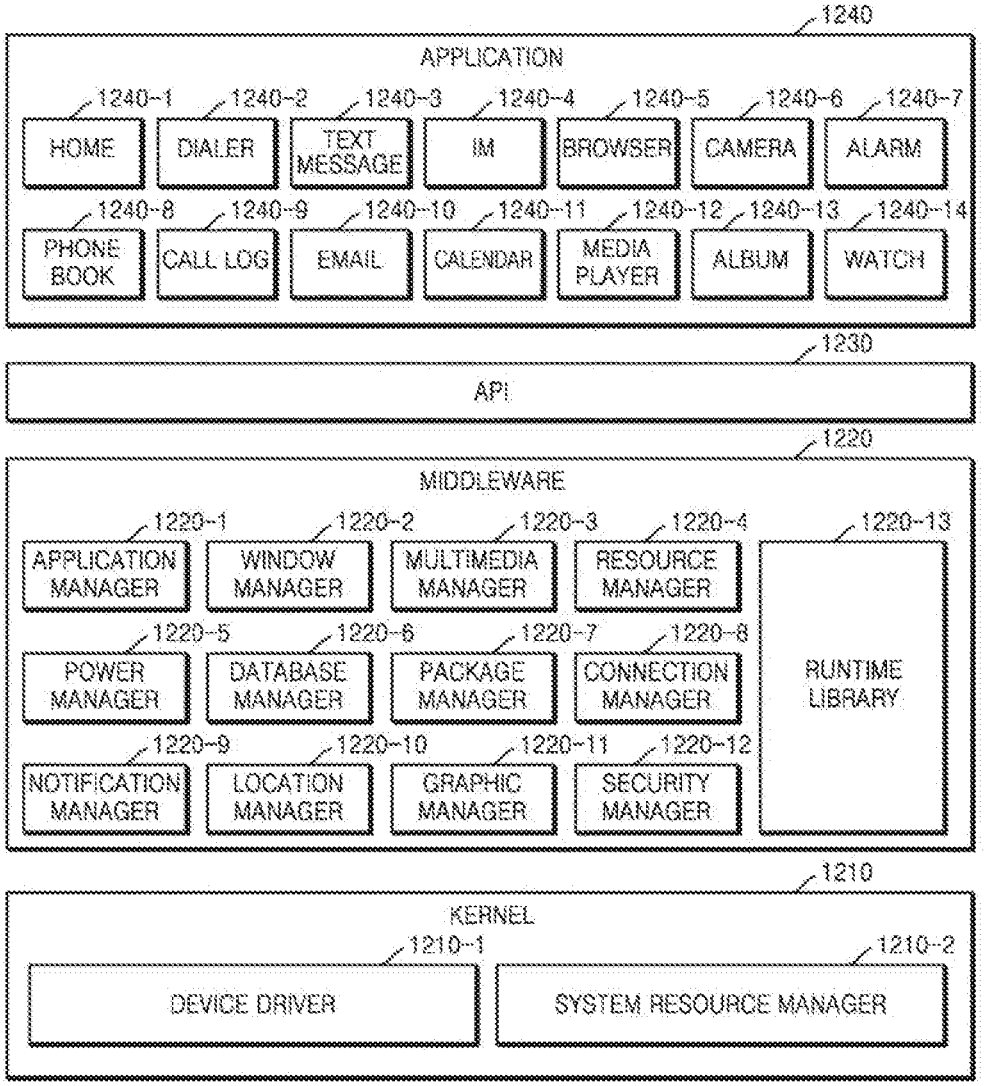
FIG. 57 is a view of a user interface (UI) of an electronic device according to an exemplary embodiment.

FIG. 57 is a block diagram of a software structure of the user terminal device 1000.

Referring to FIG. 57, the memory 1200 may store an operating system for controlling a resource of the user terminal device 1000, and an application program for operating an application. The operating system may include a kernel 1210, middleware, an application program interface (API), etc. The operating system may include, for example, Android, iOS, Windows, Symbian, Tizen, Bada, etc.

The kernel 1210 may include at least one of a device driver 1210-1 for managing the resource and a system resource manager 1210-2. The device driver 1210-1 may access and control hardware of the user terminal device 1000 like the software. To this end, the device driver 1201-1 may divided into an interface and a separate driver module provided by each hardware company. The device driver 1210-1 may include, for example, at least one selected from a display driver, a camera driver, a Bluetooth driver, a shared memory driver, a USB driver, a keypad driver, a Wi-Fi driver, an audio driver, and an inter-process communication (IPC) driver. The system resource manager 1210-2 may include at least one of a process managing unit, a memory managing unit, and a file system managing unit. The system resource manager 1210-2 may control, allocate, and retrieve the system resource.

The middleware 1220 may include a plurality of modules which are realized in advance to provide common features of various applications. The middleware 1220 may provide the function via the API 1230 so that an application 1240 may efficiently use the resource in the user terminal device 1000. The middleware 1220 may include at least one selected from a plurality of modules including, for example, an application manager 1220-1, a windows manager 1220-2, a multimedia manager 1220-3, a resource manager 1220-4, a power manager 1220-5, a database manager 1220-6, a package manager 1220-7, a connection manager 1220-8, a notification manager 1220-9, a location manager 1220-10, a graphic manager 1220-11, and a security manager 1220-12.

The application manager 1220-1 may manage a life cycle of at least one application of the applications 1240. The windows manager 1220-2 may manage a graphic user interface (GUI) resource used in a screen. The multimedia manager 1220-3 may check a format for reproducing various media files, and may encode or decode the media files by using a codec corresponding to a corresponding format. The resource manager 1220-4 may manage a resource of at least one application of the applications 1240, such as a source code, memory, and a storage space. The power manager 1220-5 may manage a battery or power by operating together with BIOS, and provide power information for operation. The database manager 1220-6 may generate, search, and change a database to be used in at least one application of the applications 1240. The package manger 1220-7 may install or update an application distributed in a package file format. The connection manager 1220-8 may manage wireless connection, such as Wifi or Bluetooth. The inform manager 1220-9 may display to the user or inform user of events, such as a message arrival, an appointment, and a proximity inform, by a method which is not disturbing to the user. The location manager 1220-10 may manage location information of the user terminal device 1000. The graphics manager 1220-11 may manage graphics effects which are provided to the user and a user interface related thereto. The security manager 1220-12 may provide various security functions required for a system security or a user authentication. When the user terminal device 1000 includes a call function, the middleware 1220 may further include a call manager for managing a voice or a video call function of the user.

The middleware 1220 may further include a runtime library 1220-13 or other library modules. The runtime library 1220-13 is a library module which is used by a compiler for adding a new function via a programming language while an application is executed. For example, the runtime library 1220-13 may perform a function related to an input and output, a memory management, or an arithmetic function. The middleware 1220 may generate a new middleware module by combining various functions of the above described internal modules. The middleware 1220 may provide a specialized module according to a type of an operating system, to provide differentiated functions. The middleware 1220 may partially omit previous components dynamically or add new components. The middleware 1220 may be formed by partially omitting the components in the present exemplary embodiment, by further adding other components, or by replacing the components with other components performing substantially the same functions with different names.

The API 1230 is a set of API programming functions, and may be formed of different components, according to operating systems. In the case of Android or iOS, for example, one API set may be provided per platform, and in the case of Tizen, for example, two or more API sets may be provided.

The application 1240 may include a preloaded application which is installed as default or a third party application which a user may install and use during a process of using. The application 1240 may include, for example, at least one selected from a home application 1240-1 for going back to a home screen, a dialer application 1240-2 for making a call with a partner, a text message application 1240-3 for receiving a message from a partner identified by a telephone number, an instant message (IM) application 1240-4, a browser application 1240-5, a camera application 1240-6, an alarm application 1240-7, a phone book application 1240-8 for managing a telephone number or an address of a partner, a call log application 1240-9 for managing a call log of a user, a text message receiving or sending log, or an absence call log, an email application 1240-10 for receiving a message from a partner identified by an email, a calendar application 1240-11, a medical player application 1240-12, an album application 1240-13, and a watch application 1240-14. Names of the described components of the software in the present exemplary embodiment may vary according to types of operating systems. Also, the software according to the present exemplary embodiment may include at least one of the above-described components, omit some of the above-described components, or may further include other additional components.

Figure 58:
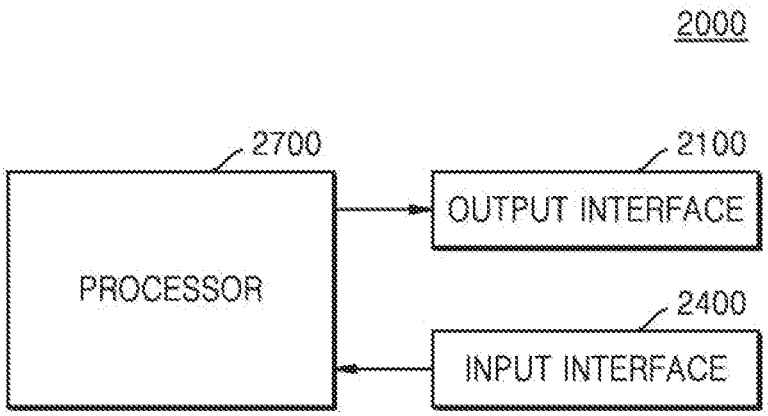
FIG. 58 is a view of a user interface (UI) of an electronic device according to an exemplary embodiment.

FIG. 58 is a view of a user interface (UI) of an electronic device 2000 according to an exemplary embodiment. The electronic device 2000 may be the electronic device 100 of FIG. 1.

The electronic device 2000 may include a processor 2700, an input interface 2400, and an output interface 2100.

The processor 2700 may include a mobile application processor or a central processing unit. The processor 2700 may be referred to as a controller and a control unit. The term "processor" may be used to denote a core, a display controller, and an image signal processor (ISP). The processor 2700 may include at least one of the components 121-126, 1710, 1720, 1730, and 1740, of the control unit 1700 with reference to FIG. 56.

The processor 2700 according to an exemplary embodiment may extract at least one keyword from a message displayed on a screen via a message service. Also, the processor 2700 according to an exemplary embodiment may newly generate a keyword related to the keyword. Also, the processor 2700 according to an exemplary embodiment may obtain content based on the newly generated keyword and location information of the electronic device 2000.

The input interface 2400 may denote a device used by a user to input data to control the electronic device 1000. For example, the input interface 2400 may be a key pad, a dome switch, a touch pad (using a touch-type capacitance method, a pressure-type resistive method, an infrared sensing method, a surface ultrasonic conductive method, an integral tension measuring method, a piezo effect method, etc.), a jog wheel, or a jog switch. Also, the input interface 2400 may include a touch screen, a touch panel, a microphone, and a keyboard.

Also, the input interface 2400 may include at least one module for receiving data from the user. For example, the input interface 2400 may include a motion recognition module, a touch recognition module, a voice recognition module, etc.

The touch recognition module sense a touch gesture on a touch screen of the user and transmit content related to the touch gesture to the processor. The sound recognition module may recognize a voice of the user by using a voice recognition engine and transmit the recognized voice to the processor. The motion recognition module may recognize motion of an object and transmit content related to the motion of the object to the processor.

Throughout the specification, an "input" made by the user via the input interface 2400 of the electronic device 2000 may include at least one selected from a touch input, a bending input, a voice input, a key input, and a multimodal input. However, it is not limited thereto.

A "touch input" may signify a gesture performed by a user on a touch screen to control the electronic device 100. The touch gesture stated in the present specification may include tapping, touching & holding, double tapping, dragging, panning, flicking, dragging & dropping, etc.

"Tapping" is a user's motion of touching a screen by using a finger or a touch tool such as an electronic pen (e.g., stylus) and then instantly lifting the finger or touch tool from the screen without moving.

"Touching & holding" is a user's motion of touching a screen by using a finger or a touch tool such as an electronic pen and then maintaining the above touching motion over a critical time, for example, 2 seconds, after touching the screen. In other words, a time difference between a touch-in time and a touch-out time is greater than or equal to the critical time, for example, 2 seconds. When a touch input lasts over the critical time, to remind the user whether the touch input is tapping or touching & holding, a feedback signal may be provided in a visual, acoustic, or tactile manner. The critical time may vary according to an exemplary embodiment.

"Double tapping" is a user's motion of touching the screen twice by using the finger or touch tool.

"Dragging" is a user's motion of touching the screen by using the finger or touch tool and moving the finger or touch tool to another position on the screen while keeping the touching motion. The dragging motion may enable the moving or panning motion of an object.

"Panning" is a user's motion of performing a dragging motion without selecting an object. Since no object is selected in the panning motion, no object is moved in a page but the page itself is moved on the screen or a group of objects may be moved within a page.

"Flicking" is a user's motion of performing a dragging motion over a critical speed, for example, 100 pixel/s, by using the finger or touch tool. The dragging (panning) motion or the flicking motion may be distinguished based on whether the moving speed of the finger or touch tool is over the critical speed, for example, 100 pixel/s, or not.

"Dragging & Dropping" is a user's motion of dragging an object to a predetermine position on the screen by using the finger or touch tool and then dropping the object at that position.

"Pinching" is a user's motion of moving two fingers touching on the screen in opposite directions. The pinching motion is a gesture to magnify (open pinch) or contract (close pinch) an object or a page. A magnification value or a contraction value is determined according to the distance between the two fingers.

"Swiping" is a user's motion of touching an object on the screen by using the finger or touch tool and simultaneously moving the object horizontally or vertically by a predetermine distance. A swiping motion in a diagonal direction may not be recognized as a swiping event.

"A motion input" refers to motion that a user applies to the electronic device 100 to control the electronic device 100. For example, the motion input may include the user's rotating the electronic device 100, the user's titling the electronic device 100, and the user's moving the electronic device 2000 in up, down, left, and right directions. The electronic device 2000 may detect a motion which is predetermined by the user, by using an acceleration sensor, a tilt sensor, a gyro sensor, and a 3-axis magnetic sensor.

Throughout the specification, the "bending input" refers to a user input of bending the entire electronic device 2000 or a portion of the electronic device 2000 to control the electronic device 2000, when the electronic device 100 is a flexible display device. According to an exemplary embodiment, the electronic device 2000 may sense a bending location (a coordinate value), a bending direction, a bending angle, a bending speed, the number of times of bending, an occurrence point in time of a bending operation, a period of time for which the bending operation retains, etc. by using a bending sensor.

Throughout the specification, the term "key input" refers to a user input of controlling the electronic device 2000 by using a physical key attached to the electronic device 2000 or a virtual key provided by the electronic device 2000.

An output interface is configured to output an audio signal, a video signal, or an alarm signal, and may include a display module, a sound input module, etc. Also, the output interface may include a flat display device which may display a two-dimensional image, and a flat display device which may display a three-dimensional image. The output interface may include a device which may output a three-dimensional hologram.

The electronic device 2000 may exchange information with a search server via communication. For example, the electronic device 2000 may communicate with the search server via at least one protocol. For example, the electronic device 2000 may communicate with the search server via at least one protocol selected from a trivial file transfer protocol (TFTP), a simple network management protocol (SNMP), a simple mail transfer protocol (SMTP), a post office protocol (POP), an internet control message protocol (ICMP), a serial line interface protocol (SLIP), a point to point protocol (PPP), a dynamic host control protocol (DHCP), a network basic input output system (NETBIOS), an internetwork packet excharge (IPX/SPX), an internet control manage protocol (ICMP), an Internet protocol (IP), an address resolution protocol (ARP), a transmission control protocol (TCP), a user datagram protocol (UDP), winsock, a dynamic host configuration protocol (DHCP), and a routing information protocol (RIP). However, it is not limited thereto.

The electronic device 2000 may perform near field communication via a near field communication module. The near field communication technology may include wireless LAN (WiFi), Bluetooth, Zigbee, WiFi Direct (WFD), ultra wideband (UWB), infrared data association (IrDA), etc. However, it is not limited thereto.

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An electronic device providing a message service, the electronic device comprising:

a communicator configured to exchange a message with another electronic device;

a display configured to display a message service screen; and a processor configured to:

control the display to display a message received from the another electronic device, a message input by the electronic device, and at least one response message generated by the electronic device, all together on the message service screen, determine whether the received message includes an inquiry, in response to the received message being determined as including the inquiry, control the display based on the inquiry to display a plurality of recommended application icons, which enable execution of corresponding application programs that have different categories from each other, together with a plurality of recommended images stored on the electronic device, and transmit the at least one response message comprising a content corresponding to at least one of the application programs to the [other] *another* electronic device.

2. The electronic device of claim 1, wherein the processor is further configured to mark the received message in response to the received message being determined as including the inquiry, and provide the application programs through the plurality of recommended application icons in response *to* the marked received message being selected.

3. The electronic device of claim 1, wherein the processor is further configured to obtain the application programs based on relational data between a user of the [other] *another electronic* device and a user of the electronic device.

4. The electronic device of claim 3, wherein the relational data comprises at least one of data stored in the electronic device, data stored in a server communicating with the electronic device, and data stored in the [other] *another electronic* device.

5. The electronic device of claim 1, wherein the [controller] *processor* is further configured to control the display to display the plurality of recommended application icons based on a user input requesting the application programs in response to a settings menu being set to manually recommend the application programs, display the plurality of recommended application icons based on a user input indicated in the received message in response to the settings menu being set to semi-automatically recommend the application programs, and display the plurality of recommended application icons without a user input when the electronic device obtains the application programs by recognizing the received message in response to the settings menu being set to automatically recommend the application programs.

6. The electronic device of claim 1, wherein the processor is further configured to obtain the application programs based on types of words included in the message, relations among the words, and meanings of the words.

7. The electronic device of claim 1, wherein the processor is further configured to obtain the application programs based on a relation between a user of the electronic device and a user of the [other] *another electronic* device, which is set based on a user input.

8. The electronic device of claim 1, wherein the different categories comprise a first category of a map application and a second category of a messenger application.

9. The electronic device of claim 1, wherein the processor is further configured to extract keywords from the received message and obtain content related to each of the keywords in order of descending priority of the keywords.

10. A method of providing a message service of an electronic device, the method comprising:

receiving a message from another electronic device;

displaying the received message on a message service screen of the electronic device;

determining whether the received message includes an inquiry;

in response to the received message being determined as including the inquiry, controlling based on the received message to display a plurality of recommended application icons, which enable execution of corresponding application programs that have different categories from each other, together with a plurality of recommended images stored on the electronic device based on the received message; and transmitting a response message comprising a content corresponding to at least one of the application programs to the [other] *another* electronic device.

11. The method of claim 10, further comprising marking the received message in response to the received message being determined as including the inquiry, wherein the controlling to display the plurality of recommended application icons comprises providing the recommended programs in response the marked received message being selected.

12. The method of claim 10, wherein the controlling to display the plurality of recommended application icons comprises obtaining the recommended programs based on relational data between a user of the electronic device and a user of the [other] *another electronic* device.

13. The method of claim 12, wherein the relational data comprises at least one of data stored in the electronic device, data stored in a server communicating with the electronic device, and data stored in the [other] *another electronic* device.

14. The method of claim 10, wherein the controlling to display the plurality of recommended application icons comprises:

controlling to display the plurality of recommended application icons based on a user input requesting the application programs in response to a settings menu being set to manually recommend the application programs;

controlling to display the plurality of recommended application icons based on a user input indicated in the received message in response to the settings menu being set to semi-automatically recommend the application programs; and controlling to display the plurality of recommended application icons without a user input when the electronic device obtains the application programs by recognizing the received message in response to the settings menu being set to automatically recommend the application programs.

15. The method of claim 10, wherein the controlling to display the plurality of recommended application icons comprises obtaining the recommended programs based on types of words included in the message, relations among the words, and meanings of the words.

16. The method of claim 10, wherein the controlling to display the plurality of recommended application icons comprises obtaining the recommended programs based on a degree of closeness in relationship between a user of the electronic device and a user of the [other] *another electronic* device, which is set based on a user input.

17. The method of claim 10, wherein the different categories comprise a first category of a map application and a second category of a messenger application.

18. The method of claim 10, wherein the controlling to display the plurality of recommended application icons comprises:

extracting keywords from the received message; and obtaining content related to each of the keywords in order of descending priority of the keywords.

19. A non-transitory computer-readable recording medium having recorded thereon a computer program for performing the method of claim 10.

*20. A server for providing message-related content to an electronic device, the server comprising:*

*a memory storing instructions; and*

*at least one processor configured to execute the instructions to:*

*obtain information for messages between an electronic device and another electronic device, the messages being exchanged between the electronic device and the another electronic device through a message application installed in the electronic device,*

*analyze a meaning of the messages based on the obtained information for the messages,*

*identify information for location in association with the messages by analyzing the meaning of the messages,*

*receive, based on the identified information for the location, information for at least one recommended content related to the messages from an external server for providing search service, and*

*in response to receiving the information for the at least one recommended content, control to provide, through the message application installed in the electronic device, the information for the at least one recommended content for sharing the at least one recommended content with the another electronic device.*

*21. The server of claim 20, wherein the at least one processor is further configured to execute the instructions to perform the natural language interpretation of the message between the electronic device and the another electronic device for analyzing the meaning of the messages.*

*22. The server of claim 21, wherein the at least one processor is further configured to execute the instructions to determine, based on the analyzed meaning of the messages, that the messages include a location-based inquiry.*

*23. The server of claim 22, wherein the at least one processor is further configured to execute the instructions to determine, as the identified information, a location for the location-based inquiry.*

*24. The server of claim 20, wherein the at least one processor is further configured to execute the instructions to control to receive, from the electronic device, the identified information for the location in association with the messages.*

*25. The server of claim 20, wherein the at least one processor is further configured to execute the instructions to control to receive, from the electronic device, the meaning of the messages.*

*26. The server of claim 20, wherein the message are received by the electronic device from the another electronic device, and the at least one recommended content is at least one recommended content for responding to the message.*

*27. The server of claim 20, wherein, based on the analyzed meaning of the messages indicating that the messages include a weather-related inquiry, the at least one recommended content comprises weather information corresponding to the identified information for the location in association with the messages.*

*28. The server of claim 27, wherein, based on the analyzed meaning of the messages indicating that the messages include the weather-related inquiry, the at least one processor is further configured to execute the instructions to control to obtain, from an external weather service, the weather information corresponding to the identified information for the location in association with the messages.*

*29. The server of claim 27, wherein the at least one processor is further configured to execute the instructions to:*

*perform the natural language interpretation of the messages between the electronic device and the another electronic device, and*

*determine, based on the natural language interpretation, that the message includes the weather-related inquiry.*

*30. The server of claim 20, wherein the at least one processor is further configured to execute the instructions to determine, based on the analyzed meaning of the messages, the at least one recommended content to include restaurant information corresponding to the identified information for the location in association with the messages.*

*31. The server of claim 30, wherein the at least one processor is further configured to execute the instructions to obtain, from an external service, the restaurant information corresponding to the identified information for the location in association with the messages.*

*32. The server of claim 31, wherein the restaurant information includes information on a plurality of restaurants corresponding to the identified information for the location in association with the messages.*

*33. The server of claim 30, wherein the at least one processor is further configured to execute the instructions to perform the natural language interpretation of the messages between the electronic device and the another electronic device.*

*34. The server of claim 20, wherein the messages are exchanged between the electronic device and the another electronic device via a text chatting service.*

*35. An electronic device comprising:*

*a display;*

*a memory storing instructions; and*

*at least one processor configured to execute the instructions to:*

*control to output, via the display, a screen of a messaging application, the screen including one or more messages exchanged between the electronic device and another electronic device via the messaging application, and an input portion to receive an input message input by a user for sending to the another electronic device,*

*control to transmit, to a server distinct from the electronic device and the another electronic device, information on messages displayed on the screen,*

*control to receive, from the server, at least one recommended content determined to be related to the messages,*

*control to output, via the display, the at least one recommended content so as to be selectable by the user, on the input portion of the screen, and*

*based on a selection of a recommended content, from among the at least one recommended content output via the display, control to transmit, toward the another electronic device, a message including the selected recommended content.*

*36. The electronic device of claim 35, wherein the at least one recommended content is information on at least one restaurant determined to be related to the messages according to an analyzed meaning of the messages, or weather information determined to be related to the messages according to the analyzed meaning of the messages.*

*37. The electronic device of claim 35, wherein the at least one recommended content output via the display comprises a displayed list of a plurality of restaurants determined to be related to the messages, and the selected recommended content is information on one of the plurality of restaurants.*

*38. The electronic device of claim 35, wherein the information on the at least one recommended content is deter-*

*mined by the server to be related to the messages according to an analyzation performed by the server with respect to the messages.*

*39. The electronic device of claim 35, wherein the at least one processor is further configured to execute the instructions to:*

*perform an analyzation of a meaning of the messages,*

*control to transmit, to the server, the information on the messages comprising the analyzed meaning of the messages, and*

*control to receive, from the server, the at least one recommended content based on the transmitted information comprising the analyzed meaning of the messages, and*

*wherein the transmitted information comprising the analyzed meaning of the messages comprises at least one of a determined keyword and a determined context corresponding to the messages.*

*40. The electronic device of claim 35, wherein the control to transmit, the control to receive, and the control to output the at least one recommended content are performed automatically by the at least one processor without a user input.*

*41. The electronic device of claim 35, wherein the at least one processor is further configured to execute the instructions to control to output, via the display, a notification that at least one recommended content is displayable in relation to the message text, and*

*the control to output the at least one recommended content is performed based on a user input received within a predetermined time relative to the output of the notification.*

*42. The electronic device of claim 35, wherein the at least one processor is further configured to execute the instructions to control to output, via the display, a notification that at least one recommended content is displayable in relation to the messages, and*

*wherein the notification is not displayed when a predetermined time is exceeded.*

* * * * *